United States Patent
Saito et al.

(10) Patent No.: US 8,948,506 B2
(45) Date of Patent: Feb. 3, 2015

(54) IMAGE PROCESSING DEVICE, IMAGE PROCESSING METHOD, AND PROGRAM

(75) Inventors: Yasushi Saito, Saitama (JP); Isao Hirota, Kanagawa (JP)

(73) Assignee: Sony Corporation, Tokyo (JP)

( * ) Notice: Subject to any disclaimer, the term of this patent is extended or adjusted under 35 U.S.C. 154(b) by 319 days.

(21) Appl. No.: 13/581,784

(22) PCT Filed: Jan. 5, 2011

(86) PCT No.: PCT/JP2011/050043
§ 371 (c)(1),
(2), (4) Date: Oct. 22, 2012

(87) PCT Pub. No.: WO2011/108290
PCT Pub. Date: Sep. 9, 2011

(65) Prior Publication Data
US 2013/0216130 A1 Aug. 22, 2013

(30) Foreign Application Priority Data
Mar. 4, 2010 (JP) .............................. P2010-047369

(51) Int. Cl.
G06K 9/00 (2006.01)
G06T 5/00 (2006.01)
H04N 9/04 (2006.01)
G06K 9/46 (2006.01)

(52) U.S. Cl.
CPC ................ G06T 5/007 (2013.01); H04N 9/045 (2013.01); G06K 9/4671 (2013.01)
USPC .......................................... 382/165; 382/162

(58) Field of Classification Search
None
See application file for complete search history.

(56) References Cited

U.S. PATENT DOCUMENTS

| | | | |
|---|---|---|---|
| 7,548,264 B2* | 6/2009 | Mitsunaga et al. | 348/272 |
| 2003/0117507 A1* | 6/2003 | Kehtarnavaz et al. | 348/242 |
| 2007/0024879 A1 | 2/2007 | Hamilton, Jr. et al. | |
| 2007/0024934 A1 | 2/2007 | Andams, Jr. et al. | |
| 2008/0012969 A1* | 1/2008 | Kasai et al. | 348/266 |
| 2008/0030603 A1* | 2/2008 | Masuno et al. | 348/273 |
| 2010/0119148 A1* | 5/2010 | Adams et al. | 382/167 |
| 2010/0150440 A1* | 6/2010 | Kwak et al. | 382/167 |
| 2011/0050918 A1* | 3/2011 | Tachi | 348/208.4 |
| 2012/0257821 A1* | 10/2012 | Saito et al. | 382/162 |

FOREIGN PATENT DOCUMENTS

| | | |
|---|---|---|
| JP | 2008-172289 | 7/2008 |
| JP | 2009-017544 | 1/2009 |

* cited by examiner

Primary Examiner — Stephen R Koziol
Assistant Examiner — Jonathan S Lee
(74) Attorney, Agent, or Firm — Finnegan, Henderson, Farabow, Garrett & Dunner, L.L.P.

(57) ABSTRACT

A device and method for generating RGB arrangement data from an imaging signal by a photograph imaging device having an RGBW arrangement are provided. An edge detection unit analyzes an output signal in the RGBW arrangement from the imaging device, and thus obtains edge information corresponding to each pixel, and a texture detection unit generates texture information. Furthermore, a parameter calculation unit performs an interpolation process of converting an application pixel position according to the edge direction corresponding to a conversion pixel. A blend process unit inputs a parameter which the parameter calculation unit generates, edge information and texture information, and determines a conversion pixel value by performing a blend process by changing a blend ratio of the parameter which the parameter calculation unit calculates, according to the edge information corresponding to the conversion pixel and the texture information.

17 Claims, 33 Drawing Sheets

FIG. 1

(a) RGB ARRANGEMENT (BAYER ARRANGEMENT)

| G | B | G | B | G | B | G | B |
|---|---|---|---|---|---|---|---|
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |

(b) RGBW ARRANGEMENT

| W | R | W | G | W | R | W | G |
|---|---|---|---|---|---|---|---|
| B | W | G | W | B | W | G | W |
| W | G | W | R | W | G | W | R |
| G | W | B | W | G | W | B | W |
| W | R | W | G | W | R | W | G |
| B | W | G | W | B | W | G | W |
| W | G | W | R | W | G | W | R |
| G | W | B | W | G | W | B | W |

FIG. 4
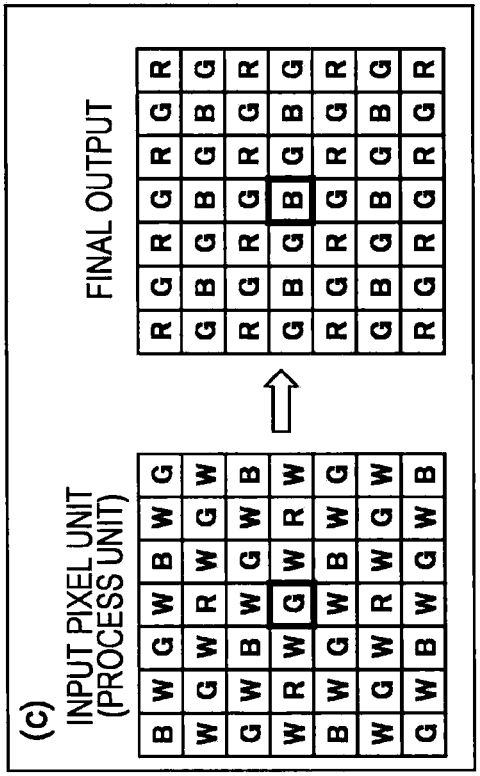
(b)
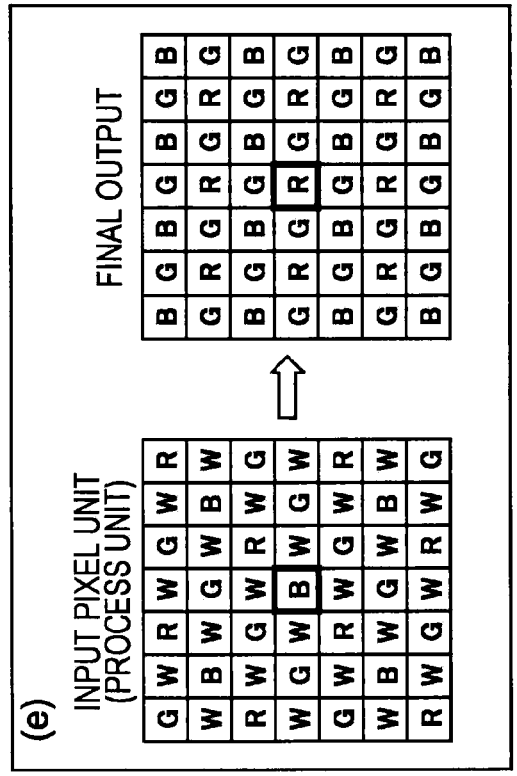
(c)
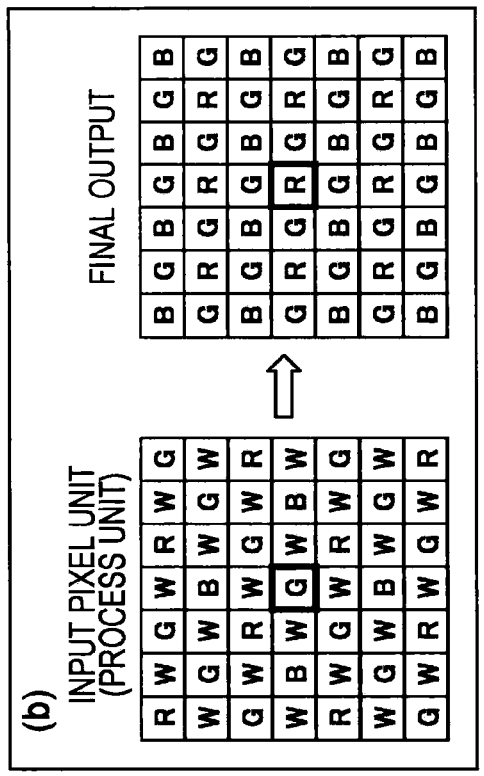
(d)
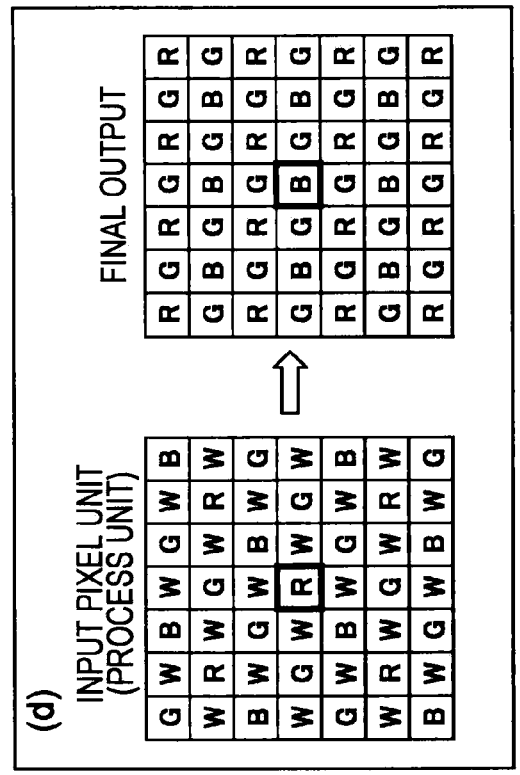
(e)

FIG. 7
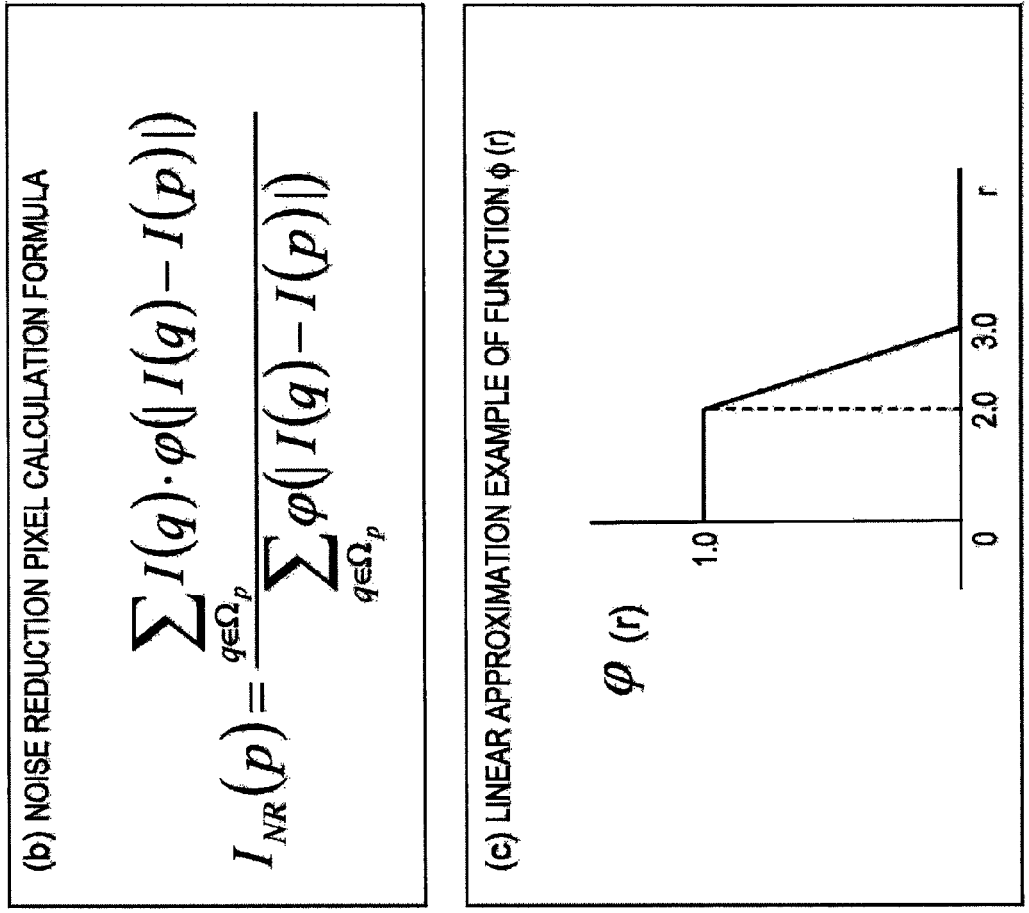
(b) NOISE REDUCTION PIXEL CALCULATION FORMULA
$$I_{NR}(p) = \frac{\sum_{q \in \Omega_p} I(q) \cdot \varphi(|I(q) - I(p)|)}{\sum_{q \in \Omega_p} \varphi(|I(q) - I(p)|)}$$
(c) LINEAR APPROXIMATION EXAMPLE OF FUNCTION $\varphi(r)$
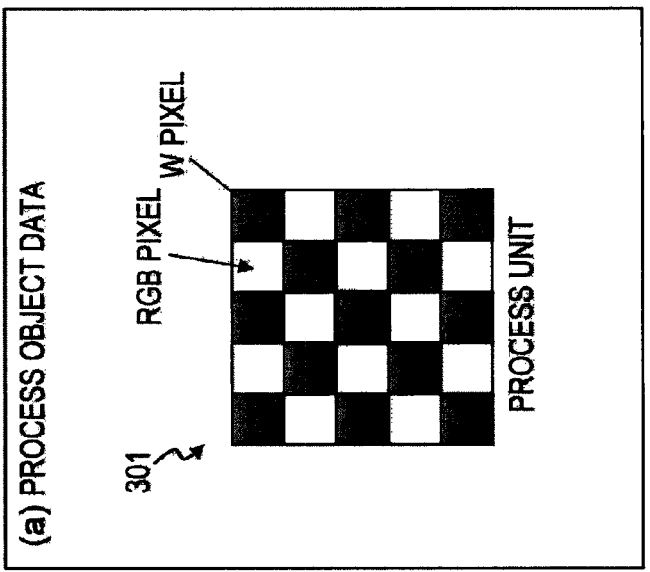
(a) PROCESS OBJECT DATA FIG. 8
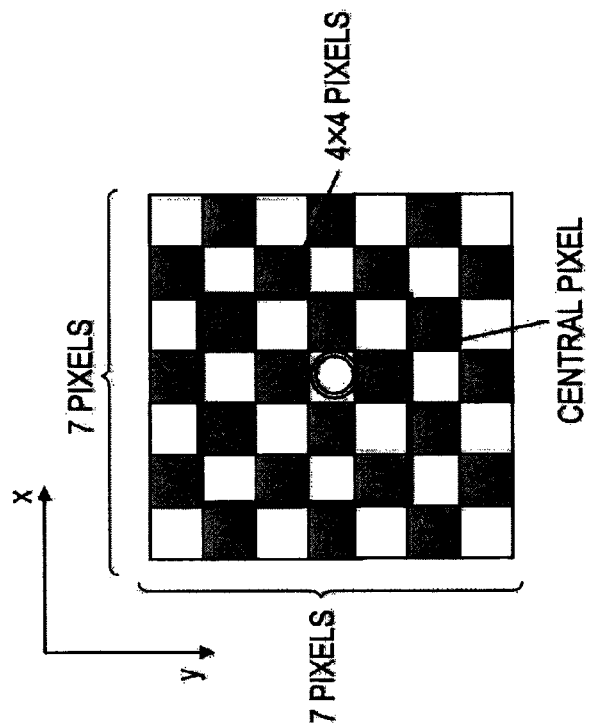
(b) IN CASE WHERE CENTRAL PIXEL IS PIXEL OTHER THAN W
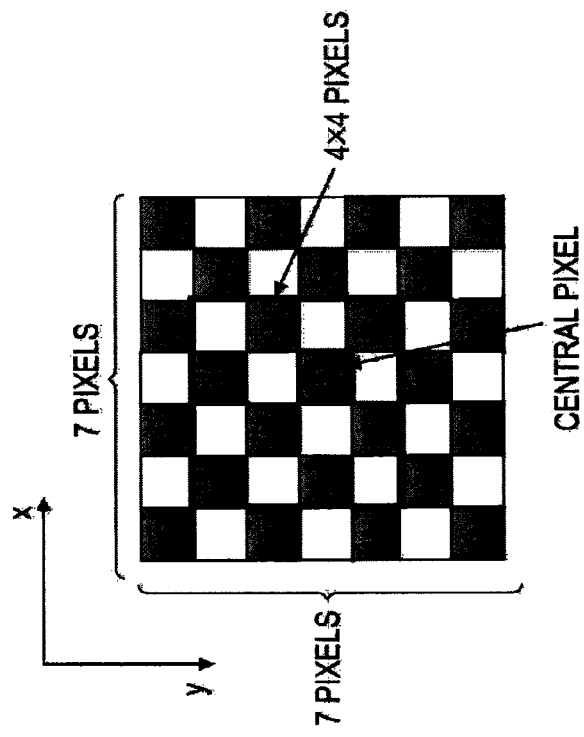
(a) IN CASE WHERE CENTRAL PIXEL IS W

1

IMAGE PROCESSING DEVICE, IMAGE PROCESSING METHOD, AND PROGRAM

TECHNICAL FIELD

The present invention relates to an image processing device, an image processing method, and a program. The present invention relates particularly to an image processing device, a method and a program for performing a signal process on the output of an imaging device having an RGBW arrangement.

BACKGROUND ART

For example, an imaging device (image sensor) used in an imaging device has a configuration in which a color filter permitting a specific wavelength component of light (R, G, B) to penetrate a pixel unit is attached to the surface of the device. For example, a filter having an RGB arrangement, as shown in FIG. 1(a), is used. In a process of generating a color image using an output signal of the imaging device, the process of restoring a necessary color component using a set of a plurality of pixels. The color arrangement of the color filter comes in many types, and a Bayer arrangement, configured by 3 kinds of filters, which permit only a specific wavelength light, red (R), green (G), and blue (B) shown in FIG. 1(a), to penetrate, is frequently used.

In recent years, the pixels of the imaging device (image sensor) have become increasingly smaller in size, and accordingly a problem has occurred in that the amount of light incident to each pixel has decreased, and thus the S/N ratio has deteriorated. To solve this problem, as shown in FIG. 1(b), in addition to a filter permitting, for example, only a specific wavelength light of RGB, or the like to penetrate, an image sensor (imaging device) having a white filter (W: White) which additionally permits light in a visible light range to penetrate widely, has been proposed. In FIG. 1(b), one example of a filter having an RGBW arrangement is illustrated. A W pixel in the RGBW arrangement shown in FIG. 1(b) is a filter which permits light in a visible light range to penetrate widely.

In this way, an imaging device equipped with a color filter having white (W: White) pixels is disclosed in, for example, PTL 1 (U.S Unexamined Patent Application Publication No. 2007/24879) and PTL 2 (U.S Unexamined Patent Application Publication No. 2007/0024934).

As shown in FIG. 1(b), an imaging device (image sensor) having the color filter having the white (W: White) pixel is used, and thus the penetration light rate of the filter is increased and high sensitivity may be accomplished.

However, the problems with an RGBW type device are as follows.

Both the RGB arrangement shown in FIG. 1(a) and the RGBW arrangement as shown in FIG. 1(b) are single elements in which a filter of R, G, B or W is arranged in a mosaic state, that is, a single plate type image sensor. Therefore, when generating a color image, it is necessary to perform a de-mosaicing process as a color coding that generates an RGB pixel value corresponding to each pixel.

In the RGBW arrangement shown in FIG. 1(b), the sampling rates of R, G, and B components are decreased, compared with the RGB arrangement shown in FIG. 1(a). As a result, in a case where obtainment data obtained by an element with the RGBW arrangement shown in FIG. 1(b) is used when performing a process of generating the color image, there is a problem in that false color may easily occur, compared with the RGB arrangement shown in FIG. 1(a). Furthermore, because a wavelength component of the white (W) includes all of the wavelength components of R, G and B, there is a problem in that the concentration rate of an RGB wavelength component is decreased and resolution is decreased compared with that of a single color component when an optical lens, having a large amount of chromatic aberration, is used. As the pixels are smaller in size, this problem is more remarkable.

As a technique to prevent a deterioration in resolution resulting from chromatic aberration in the optical lens, it is effective to suppress an occurrence of chromatic aberration by combining lenses which are different in refractive index, but in this case, there is another problem in that costs are increased because an increase in the number of optical lenses. Furthermore, in this configuration, a problem also occurs in that the above-described problem of false color resulting from a decrease in the sampling rate of the RGB component is more remarkable.

Furthermore, because each pixel of a single plate type image sensor only has information for a single color component, a de-mosaicing process of obtaining the RGB pixel values corresponding to all of the pixels is performed to obtain the color image from the R, G, B, and W signals which are discretely obtained. When performing the de-mosaic process, an interpolation process is performed based on the assumption that a color rate is almost uniformly retained and there is a strong color correlation in the local region. Specifically, when calculating the pixel value of a specific color of a pixel, a method of interpolating using the pixel values of the neighboring pixels is widely used. This method is disclosed in, for example, PTL 3 (Japanese Unexamined Patent Application Publication No. 2009-17544). However, the above-described assumption that the color rate is almost uniformly retained and color correlation exists in the local region is not true for the neighborhood of the edge. As a result, there is a problem in that the false color easily occurs in the neighborhood of the edge.

CITATION LIST

Patent Literature

PTL 1: US Unexamined Patent Application Publication No. 2007/0024879

PTL 2: US Unexamined Patent Application Publication No. 2007/0024934

PTL 3: Japanese Unexamined Patent Application Publication No. 2009-17544

SUMMARY OF INVENTION

Technical Problem

An object of the present invention is to provide an image processing device for, an image processing method of, and a program for accomplishing generation of a high-quality color image with little false colors in a color image generation process to which obtainment data obtained by an imaging device (image sensor) having, for example, an RGBW type color filter including white (W: White) is applied.

According to a first aspect of the present invention, there is provided an image processing device, including a data conversion process unit performing pixel conversion by interpreting a two-dimensional pixel arrangement signal in which pixel which is main components of a brightness signal are in a checkered state, and pixels of a plurality of colors which are color information components are arranged in the remaining region, the data conversion process unit including a parameter calculation process unit calculating a parameter which are applied to a pixel conversion process, by interpreting the two-dimensional pixel arrangement signal, and the parameter calculation process unit performing a calculation process of calculating the parameter using at least any of a first correlation information and a second correlation information, the first correlation information on a correlation between the pixel which is the main component of the brightness signal included in the two-dimensional pixel arrangement signal and the color information component of the pixel after conversion, and the second correlation information on a correlation between one selection color information component selected from among the color information components and the color information component of the pixel after the conversion, in the calculation of calculating the parameter which are applied to the pixel conversion process.

Furthermore, in one embodiment according to the image processing device according to the present invention, the parameter calculation unit uses the correlation information on a correlation between the color information component of which a distribution rate is the highest among the color information components and the color information component of the pixel after the conversion, as the second correlation information.

Furthermore, in one embodiment of the image processing device according to the present invention, the data conversion process unit includes an edge detection unit generating edge information by interpreting the two-dimensional pixel arrangement signal, and the parameter calculation unit performs the calculation process of calculating the parameter by selectively using any of the first correlation information and the second correlation information, according to an edge direction which the edge detection unit detects.

Furthermore, in one embodiment of the image processing device according to the present invention, a color of the main component of the brightness signal is white, and a color of the color information component of which the distribution rate is the highest is green, and the parameter calculation unit performs the calculation process of calculating the parameter using any of the first correlation information on a correlation between white and the color information component of the pixel after the conversion and the second correlation information on a correlation between green and the color information component of the pixel after the conversion, according to the edge direction which the edge detection unit detects, in the calculation process of calculating the parameter which is applied to the pixel conversion process.

Furthermore, in one embodiment of the image processing device according to the present invention, the data conversion process unit includes a texture detection unit generating texture information by interpreting the two-dimensional pixel arrangement signal, and a blend process unit inputting the parameter which the parameter calculation unit calculates and the edge information and the texture information, and determining a conversion pixel value by performing a blend process by changing a blend ratio of the parameter which the parameter calculation unit, according to the edge information and the texture information corresponding to the conversion pixel.

Furthermore, in one embodiment of the image processing device according to the present invention, the edge detection unit generates the edge information including edge direction and strength information corresponding to each pixel by interpreting an RGB arrangement signal which is generated from an RGB pixel and a white (W) pixel, the texture detection unit generates texture information indicating texture extent corresponding to each pixel by interpreting the RGBW arrangement signal, the parameter calculation unit is the parameter calculation unit which calculates a parameter for converting the RGBW arrangement to the RGB arrangement, and generates the parameter corresponding to an interpolation pixel value calculated by an interpolation process of changing an application pixel position according to the edge direction corresponding to the conversion pixel, and the blend process unit inputs the parameter which the parameter calculation unit calculates and the edge information and the texture information and performs the process of determining the conversion pixel value by performing the blend process by changing the blend ratio of the parameter which the parameter calculation unit calculates, according to the edge information and the texture information corresponding to the conversion pixel.

Furthermore, in one embodiment of the image processing device according to the present invention, the parameter calculation unit has a configuration which generates the parameter by the interpolation process of defining the pixel position which is applied to the interpolation process as the pixel position which is along the edge direction.

Furthermore, in one embodiment of the image processing device according to the present invention, the parameter calculation unit has a configuration which generates the parameter by the interpolation process of using any of a correlation in a local region between the W pixel configuring the RGBW arrangement and the other RGB pixel or a correlation in the local region between the G pixel configuring the RGBW arrangement and the other RGB pixel.

Furthermore, in one embodiment of the image processing device according to the present invention, the image processing device further includes a temporary pixel setting unit setting the pixel value of the pixel of any of RGB to a W pixel position by the interpolation process of using the correlation in the local region between the W pixel configuring the RGBW arrangement and the other RGB pixel, and the parameter calculation unit has a configuration which generates the parameter by the interpolation process of applying temporary pixel setting data.

Furthermore, in one embodiment of the image processing device according to the present invention, the parameter calculation unit selects which one of the first correlation information on a correlation between the W pixel configuring the RGBW arrangement and the color information component of the pixel after the conversion and the second correlation information on a correlation between the G pixel configuring the RGBW arrangement and the color information component of the pixel after the conversion is used, according to 4 kinds of the edge directions, longitudinal, traverse, left gradient upward, and right gradient upward, which the edge detection unit detects.

Furthermore, in one embodiment of the image processing device according to the present invention, the parameter calculation unit generates a plurality of parameters by setting a reference pixel position to the pixel position along the edge direction and using the first correlation information and the second correlation information, and the blend process unit performs the blend process of changing the blend ratios of the plurality of parameters according to the comparison result, by performing a strength comparison of the 4 kinds of the edge directions, longitudinal, traverse, left gradient upward, and right gradient upward.

Furthermore, in one embodiment of the image processing device according to the present invention, the blend process unit performs a blend process of calculating an edge direction ratio (ratioFlat) of the longitudinal and traverse direction edge and the gradient direction edge corresponding to the conversion pixel, additionally calculating longitudinal and traverse direction edge direction weight (weightHV) indicating that the greater the value is, the stronger the longitudinal and traverse direction edge is than the gradient direction edge, and the smaller the value is, the stronger the gradient direction edge is than the longitudinal and traverse direction edge, based on the edge direction ratio (ratioFlat), increasing a blend ratio of the parameter calculated by setting the edge direction to the longitudinal or traverse direction in a case where the longitudinal and traverse direction edge corresponding to the conversion pixel is stronger than the gradient direction edge, and increasing the blend ratio of the parameter calculated by setting the edge direction to the gradient direction edge in a case where the longitudinal and traverse direction edge corresponding to the conversion pixel is weaker than the gradient direction edge.

Furthermore, in one embodiment of the image processing device according to the present invention, the texture detection unit calculates a flatness weight (weightFlat) corresponding to each pixel, indicating a high value for a pixel area of which textures are small in number and of which the flatness is high and a low value for a pixel area of which textures are large in number and of which the flatness is low, as the texture information, and the parameter calculation unit calculates a contrast enhancement process application parameter for performing a contrast enhancement process on the interpolation pixel value, and a contrast enhancement process non-application parameter for not performing the contrast enhancement process on the interpolation pixel value, and the blend process unit performs the blend process of setting the blend ratio of the contrast enhancement process non-application parameter to be high for the pixel of which the flatness weight is great, and setting the blend ratio of the contrast enhancement process application parameter to be high for the pixel of which the flatness weight is small.

Furthermore, in one embodiment of the image processing device according to the present invention, the edge detection unit has a configuration which generates the edge information corresponding to each pixel, by an interpretation process using only the white (W) pixel of the RGBW arrangement signal, and generates the edge information including the edge direction and the strength information corresponding to each pixel by calculating a signal value gradient of the W pixel in the neighborhood of the process object pixel.

Furthermore, in one embodiment of the image processing device according to the present invention, the texture detection unit generates texture information indicating a texture extent corresponding to each pixel, by the interpretation process using only the white (W) pixel of the RGBW arrangement signal.

Furthermore, according to a second aspect of the invention, there is provided an image processing method of performing an image signal process in the image processing device, performing an edge detection step of enabling an edge detection unit to generate an edge information including an edge direction and a strength information corresponding to each pixel by interpreting an RGBW arrangement signal which is generated from an RGB pixel and a white (W) pixel, a texture detection step of enabling a texture detection unit to generate texture information indicating texture extent corresponding to each pixel by interpreting the RGBW arrangement signal, a parameter calculation step of enabling a parameter calculation unit to be the parameter calculation step of calculating the parameter for converting the RGBW arrangement to the RGB arrangement, and to generate the parameter corresponding to an interpolation pixel value calculated by an interpolation process of changing an application pixel position according to the edge direction corresponding to the conversion pixel, and a blend process step of enabling a blend process unit to input the parameter which the parameter calculation unit calculates and the edge information and the texture information and determine the conversion pixel value by performing the blend process by changing the blend ratio of the parameter which the parameter calculation unit calculates, according to the edge information and the texture information corresponding to the conversion pixel, wherein the parameter calculation step performs the calculation process of calculating the parameter using at least any of a first correlation information and a second correlation information, the first correlation information on a correlation between the pixel which is the main component of the brightness signal included in the two-dimensional pixel arrangement signal and the color information component of the pixel after conversion, and the second correlation information on a correlation between the color information component of which a distribution rate is the highest among the color information components and the color information component of the pixel after the conversion, in the calculation of calculating the parameter which are applied to the pixel conversion process.

Furthermore, according to a third aspect of the present invention, there is provided a program for causing the performing of an image signal process in the image processing device, the image signal process including an edge detection step of enabling an edge detection unit to generate an edge information including an edge direction and a strength information corresponding to each pixel by interpreting an RGBW arrangement signal which is generated from an RGB pixel and a white (W) pixel, a texture detection step of enabling a texture detection unit to generate texture information indicating texture extent corresponding to each pixel by interpreting the RGBW arrangement signal, a parameter calculation step of enabling a parameter calculation unit to be the parameter calculation step of calculating the parameter for converting the RGBW arrangement to the RGB arrangement, and to generate the parameter corresponding to an interpolation pixel value calculated by an interpolation process of changing an application pixel position according to the edge direction corresponding to the conversion pixel, and a blend process step of enabling a blend process unit to input the parameter which the parameter calculation unit calculates and the edge information and the texture information and determine the conversion pixel value by performing the blend process by changing the blend ratio of the parameter which the parameter calculation unit calculates, according to the edge information and the texture information corresponding to the conversion pixel, wherein the parameter calculation step is caused to perform the calculation process of calculating the parameter using at least any of a first correlation information and a second correlation information, the first correlation information on a correlation between the pixel which is the main component of the brightness signal included in the two-dimensional pixel arrangement signal and the color information component of the pixel after conversion, and the second correlation information on a correlation between the color information component of which the distribution rate is the highest among the color information components and the color information component of the pixel after the conversion, in the calculation of calculating the parameter which are applied to the pixel conversion process.

Furthermore, the program according to the present invention is, for example, a program which may be provided by a memory media provided in a computer-readable format and over the communication media, for an image processing device and a computer system which are capable of running various program codes. This program is provided in a computer-readable form, and thus the process according to the program is accomplished on the image processing device and the computer system.

Other object, characteristics and advantages of the present invention will be clarified by embodiments of the present invention, described below, and the description of the present invention based on the accompanying drawings. Furthermore, the system in the present specification is a logical set configuration of a plurality of apparatuses, and the apparatus in each configuration is not limited to one within the same housing.

Advantageous Effects of Invention

According to the configuration of one embodiment according to the present invention, the RGB arrangement data for generating a high-quality color image with few false colors by inputting obtainment data obtained by the imaging device (image sensor) having, for example, the RGBW-type color filter, including white (W: White) may be generated. Specifically, the edge detection unit interprets the output signal of the imaging device with the RGBW arrangement, and thus obtains the edge information corresponding to each pixel, and the texture detection unit generates the texture information. Furthermore, the parameter calculation unit generates the parameter corresponding to the interpolation pixel value, by performing the interpolation process of changing the application pixel position corresponding to the edge direction corresponding to the conversion pixel. The blend process unit inputs the parameter which the parameter calculation unit generates, the edge information and the texture information, and determines a conversion pixel value, by performing a blend process by changing the blend ratio of the parameter which the parameter calculation unit calculates, according to the edge information and the texture information corresponding to the conversion pixel. By this process, the RGB arrangement data with which the high-quality color image with few false colors can be generated may be generated.

BRIEF DESCRIPTION OF DRAWINGS

FIG. 1 is a view explaining examples of a Bayer arrangement as a color arrangement used in a general color filter and an RGBW arrangement applied to the present invention.

FIG. 4 is a view explaining an individual process of the re-mosaic process performed as the conversion process of converting the RGBW arrangement to the RGB arrangement, which is the process of the present invention.

FIG. 7 is a view explaining a process which a noise removal unit 201 shown in FIG. 6 performs.

FIG. 8 is a view explaining an edge detection process which an edge detection unit 209 shown in FIG. 6 performs.

DESCRIPTION OF EMBODIMENTS

Figure 2:
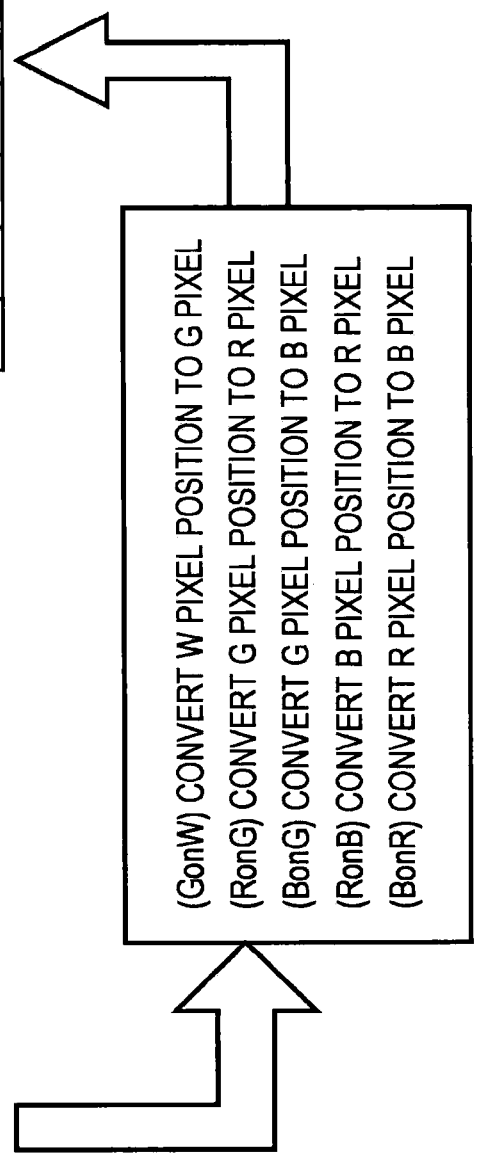
FIG. 2 is a view explaining a re-mosaicing process performed as a conversion process of converting an RGBW arrangement to an RGB arrangement, which is a process in one embodiment according to the present invention.

Referring to the drawings, an image processing device, an image processing method, and a program according to the present invention are described below. The order of the description is as follows.
1. Outline of Processes according to the Present Invention
2. Configuration Examples and Process Examples of an Imaging Device and an Image Processing Device
3. Description of a Process of a Data Conversion Unit
3-1. Process of Noise Removal Unit
3-2. Process of Edge Detection Unit
3-3. Process by a Texture Detection Unit
3-4. Process by a Pixel Interpolation Parameter Calculation Unit
3-5. Process by a Blend Process unit
4. Sequence of Mosaic Processes which a Data Conversion Process Unit of the Image Processing Device Performs
[1. Outline of Processes According to the Present Invention]

First, referring to FIG. 2, the outline of the processes which an image processing device according to the present invention, such as an imaging device, performs, is described. The image processing device according to the present invention performs the process of obtainment data obtained by an imaging device having an RGBW-type color filter permitting all of each wavelength light of RGB, including white (W: White), to penetrate in addition to an RGB filter selectively to permit wavelength light of each color of RGB to penetrate. Specifically, a pixel conversion is performed by analyzing a two-dimensional pixel arrangement signal in which pixels which are main components of a brightness signal are arranged in a checkered state and pixels with a plurality of colors which are color information components are arranged in the remaining region. Furthermore, a color which is the main component of the brightness signal is white or green.

The image processing device according to the present invention performs the parameter calculation process, which is applied to the process in which the obtainment data obtained by the imaging device (image sensor) having, for example, the RGBW-type color filter, including the white (W: White), as shown in FIG. 2(1), is converted to an RGB arrangement (for example, Bayer arrangement) shown in FIG. 2(2). Furthermore, in this conversion process, the process is concurrently performed for decreasing an occurrence of a false color.

The obtainment data obtained by the imaging device (image sensor) having, for example, the RGBW-type color filter, including the white (W: White), as shown in FIG. 2(1) is the two-dimensional pixel arrangement signal in which W pixels which are the main components of the brightness signal are arranged in a checkered state and the pixels with the plurality of colors which are color information components are arranged in the remaining region.

The image processing device according to the present invention includes a data conversion process unit analyzing this image signal and thus performing the pixel conversion. The data conversion process unit performs, for example, the calculation of the conversion parameter, using a correlation information on a correlation between the pixel (for example, the W pixels) which are the main components of the brightness signal included in the two-dimensional pixel arrangement signal, and the color information component of the pixel after conversion, or a correlation between one selection color information component selected from among the color information components, for example, a color information component (for example, G) of which the distribution rate is the highest and the color information component of the pixel after conversion, as the parameter which is applied to the pixel conversion process, by analyzing the input image signal, and performs the setting process of setting the conversion pixel value to which the calculated parameter is applied.

The image processing device according to the present invention, as shown in FIG. 2, performs the process of converting at least a part of each pixel of RGBW which are set to the RGBW color arrangement to the other color (any of RGB), or compensating at least the part of each pixel of RGBW. Specifically, in the conversion process of converting the RGBW arrangement to the RGB Bayer arrangement, five of the following conversion or compensation processes are performed.
(a) Convert a W pixel position to a G pixel (Estimate a G pixel value)=(GonW)
(b) Convert a G pixel position to an R pixel (Estimate an R pixel value)=(RonG)
(c) Convert a G pixel position to a B pixel (Estimate a B pixel value)=(BonG)
(d) Convert a B pixel position to an R pixel (Estimate an R pixel value)=(RonB)
(e) Convert an R pixel position to a B pixel (Estimate a B pixel value)=(BonR)

Each of the above-described conversion processes (a) to (e) is performed as a pixel value estimation or a compensation process for converting each pixel of RGBW in the RGBW arrangement to an RGB pixel in the RGB arrangement. By performing this process, the RGB arrangement shown in FIG. 2(2) is generated from the RGBW color arrangement shown in FIG. 2(1).

This conversion process of converting the color arrangement is hereinafter referred to "re-mosaic."

In the following embodiments, the configuration is described which performs the re-mosaic process of converting the RGBW-type color arrangement having the white (W) to the RGB-type color arrangement (Bayer arrangement) and further performs the process of decreasing an occurrence of a false color at the time of this re-mosaic process.

In the pixel conversion process by the image processing device according to the present invention, the conversion process in which a rectangular pixel region with n×n pixels is input as an input pixel unit is performed. That is, the pixel information on the rectangular pixel region with the n×n pixels is used to determine the conversion pixel value of one pixel in the center of the n×n pixels. Specifically, for example, the processing is performed by a unit of 7×7 pixels in an image (7 pixels in width and 7 pixels in height). For example, in a case where the processing is performed by a process unit of 7×7 pixels, the image processing device inputs the pixel information by a unit of 7×7 pixels and determines the conversion pixel value of the central pixel using the pixel information on the 7×7 pixels. The central pixel of the 7×7 pixels is a pixel of any of RGBW and the RGBW are converted according to the conversion patterns (a) to (e) described above.

Rectangular pixels with n×n pixels which is a unit of the pixel conversion process is hereinafter referred to as "an input pixel unit." In a case where the process) of one pattern (a) of the conversion patterns (a) to (e) described above, that is, the conversion process which is "(a) Convert a W pixel position to a G pixel (Estimate a G pixel value)=(GonW)", is performed, four different patterns (a1) to (a4) shown in FIG. 3 exist in the pixel pattern of 7×7 pixels which is the input pixel unit.

Figure 3:
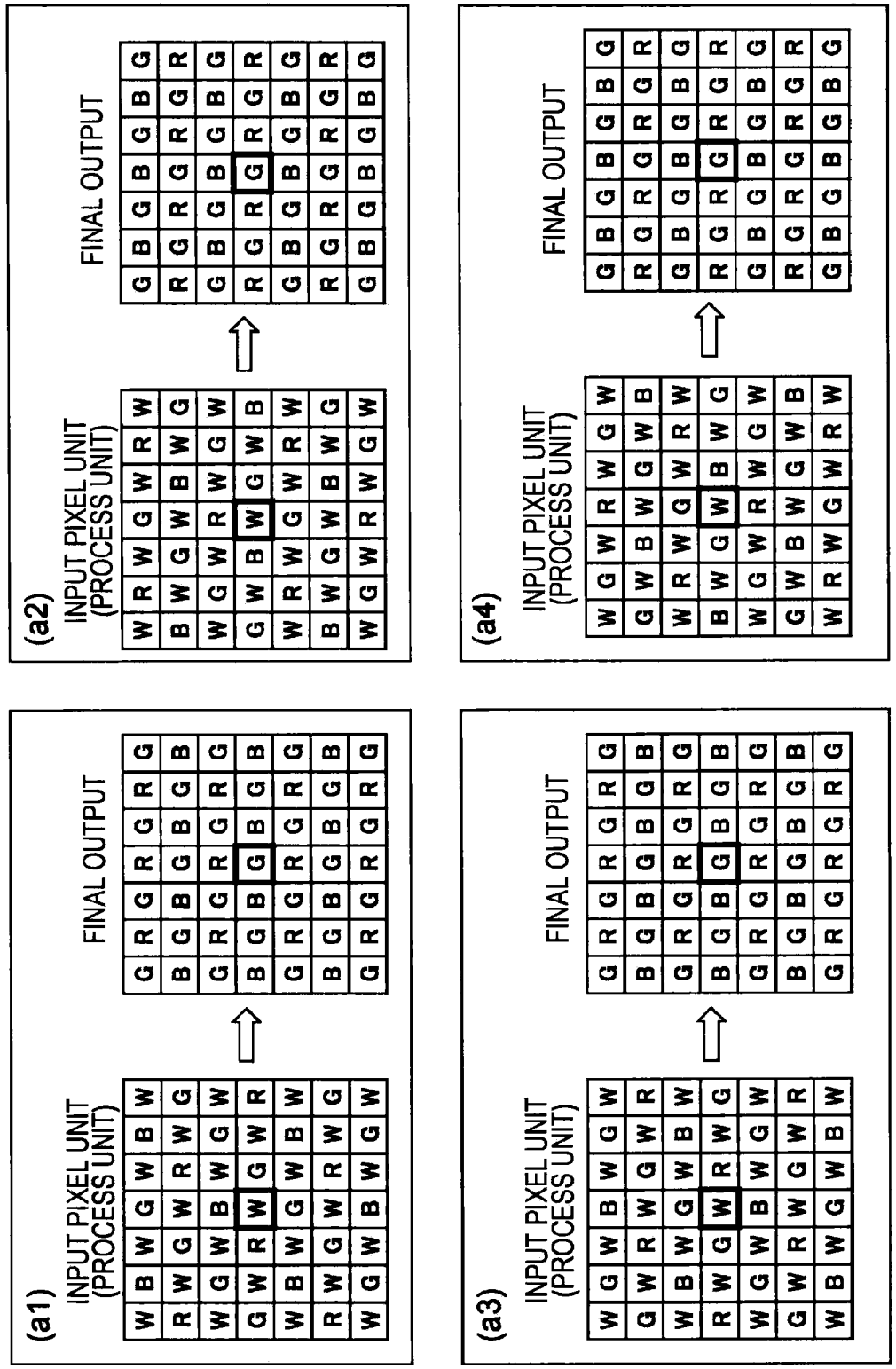
FIG. 3 is a view explaining an individual process of the re-mosaic process performed as the conversion process of converting the RGBW arrangement to the RGB arrangement, which is a process of the present invention.

In FIG. 3 (a1) to (a4), the input pixel unit (process unit) in which a W pixel is the central position of the 7×7 pixels is illustrated. On the left side of FIG. 3, is the input pixel unit, and on the right side is RGB arrangement data which is a final processing result.

In the input with the W pixel being the central position of the 7×7 pixels, there are four different patterns shown in FIG. 3 (a1) to (a4). In a case where the 7×7 pixels with any of these patterns is input, the process which is "(a) Convert a W pixel position to a G pixel (Estimate a G pixel value)=(GonW)" is performed.

Furthermore, the result of the final change is shown on the right side of FIG. 3 (a1) to (a4), and only the process of converting the central pixel W to the G pixel is performed on the input pixel unit is shown on the left side of FIG. 3 (a1) to (a4). Thereafter, the process units are moved one by one and the conversion process (any of the conversion processes (a) to (e) is performed, and thus the final change results shown on the right side of FIG. 3 (a1) to (a4) is obtained.

Furthermore, in a case where the process (b) to (e) among the conversion patterns (a) to (e) described above, that is, (b) Convert a G pixel position to an R pixel (Estimate an R pixel value)=(RonG), (c) Convert a G pixel position to a B pixel (Estimate a B pixel value)=(BonG), (d) Convert an R pixel position to a B pixel (Estimate a B pixel value)=(BonR), and (e) Convert a B pixel position to an R pixel (Estimate an R pixel value)=(BonB) are performed, a relationship between the input pixel unit (process unit) and a final output of the conversion process is shown in FIGS. 4(b) to (e).

FIG. 4(b) illustrates a process example of "Convert a G pixel position to an R pixel (estimate an R pixel value)=(RonG)".

FIG. 4(c) illustrates a process example of "Convert a G pixel position to a B pixel (Estimate a B pixel value)=(BonG)".

FIG. 4(d) illustrates a process example of "Convert an R pixel position to a B pixel (Estimate a B pixel value)=(BonR)".

FIG. 4(e) illustrates a process example of "Convert a B pixel position to an R pixel (Estimate an R pixel value)=(RonB)".

[2. Configuration Examples and Process Examples of the Imaging Device and the Image Processing Device]

Figure 5:
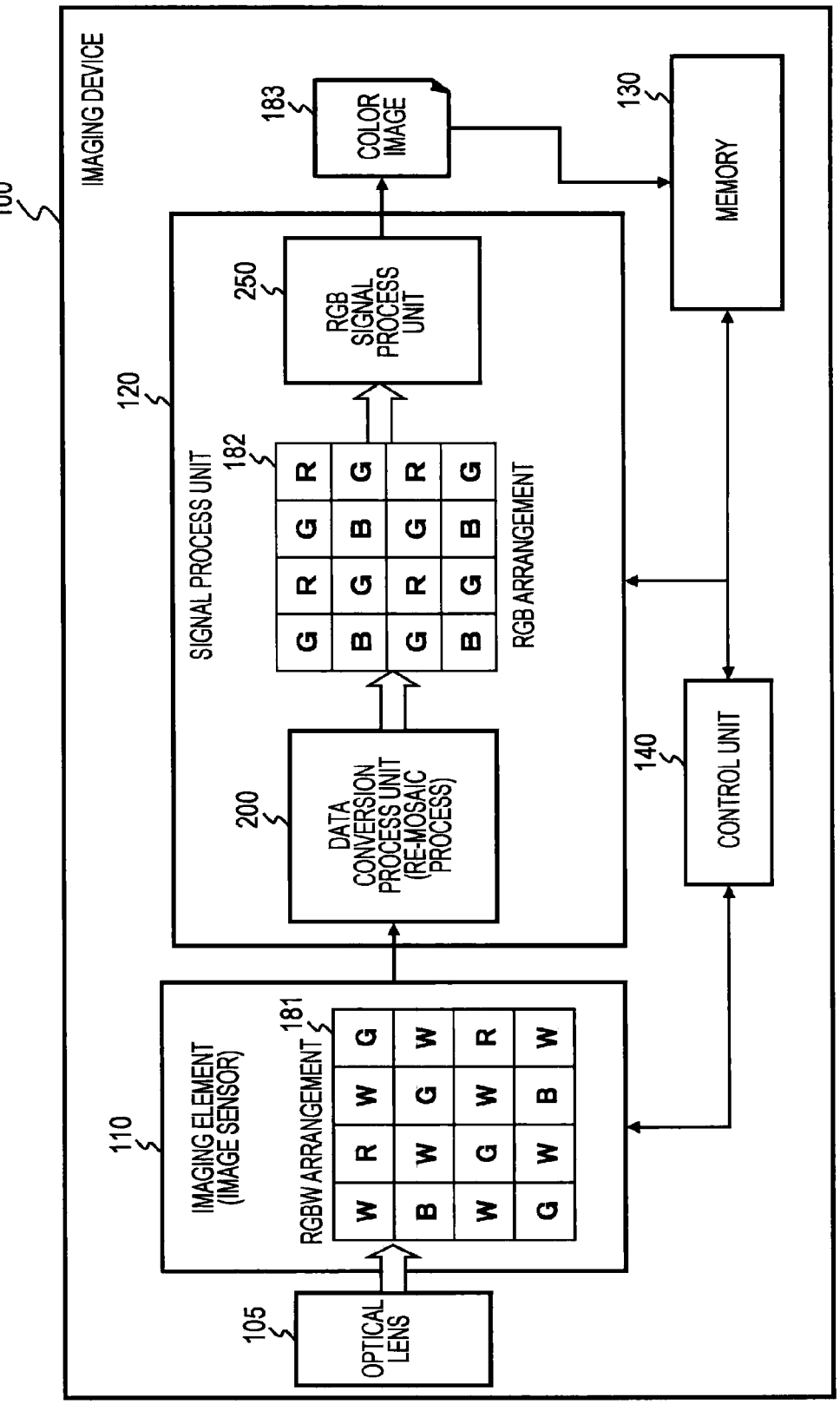
FIG. 5 is a view explaining a configuration example of an imaging apparatus relating to one example of the image processing device of the present invention.
Figure 6:
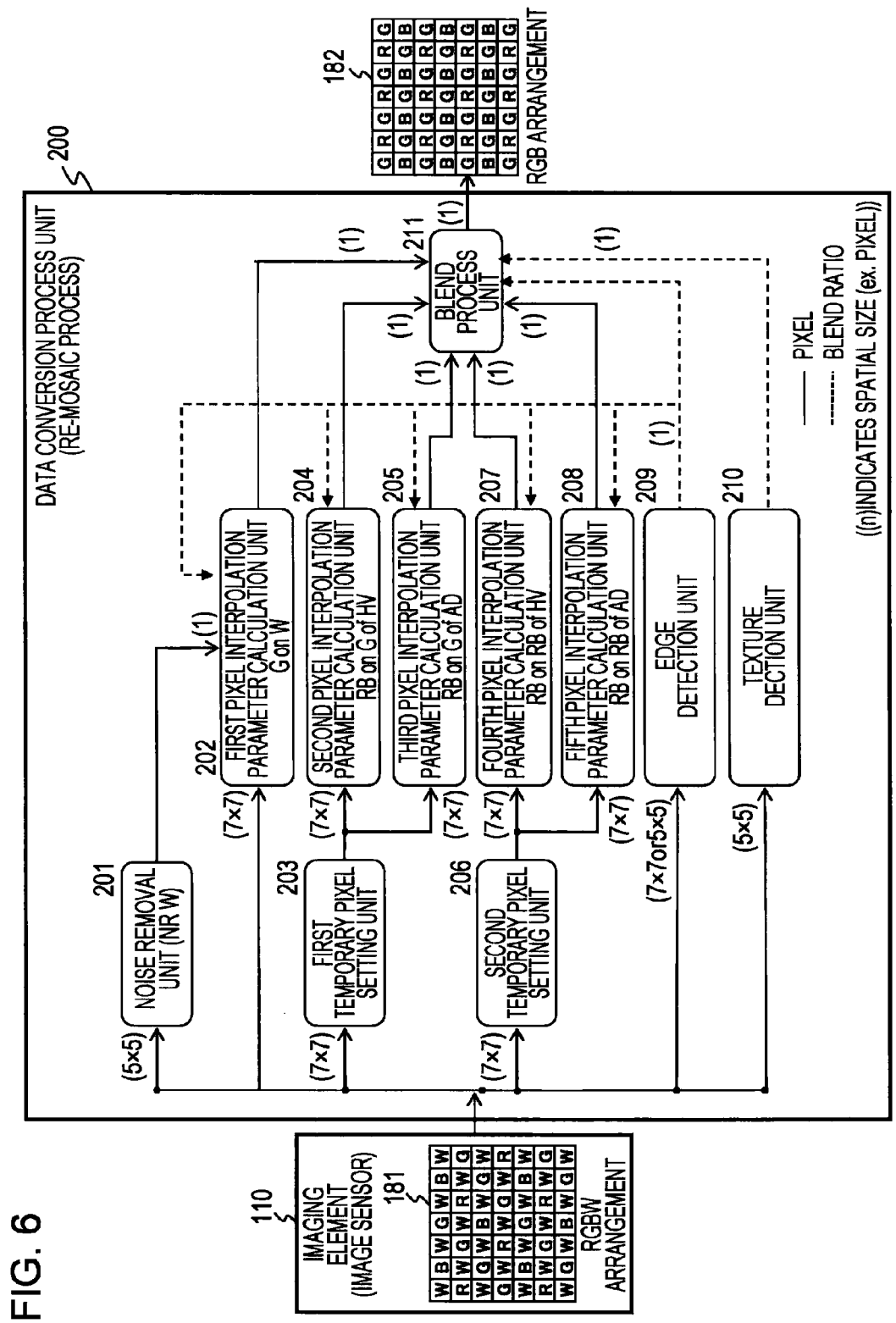
FIG. 6 is a view explaining a configuration and a process of a data conversion process unit.

Referring to FIGS. 5 and 6, the configuration example and the process example of the imaging device and the image processing device relating to one embodiment according to the present invention.

FIG. 5 is a view illustrating a configuration example of an imaging device 100 relating to one embodiment according to the present invention. The imaging device 100 includes an optical lens 105, an imaging device (image sensor) 110, a signal process unit 120, memory 130, and a control unit 140. Furthermore, the imaging device is one embodiment of the image processing device. The image processing device includes a device such as a PC. The image processing device, such as a PC, has a configuration which includes other components, without the optical lens 105 of the imaging device 100 shown in FIG. 3 and the imaging device 110, and includes an input unit of inputting obtainment data obtained by the imaging device 100, or a memory unit. Specifically, the imaging device 100 is a still camera, a video camera, and the likes. The imaging device 100 includes an information process device capable of processing an image, such as a PC.

The imaging device 100, which is a typical example of the image processing device according to the present invention, is described below. The imaging device (image sensor) 110 of the imaging device 100 shown in FIG. 5 has a configuration which includes a filter with an RGBW arrangement 181 having white (W), described referring to FIG. 1(b) and FIG. 2(1). Specifically, the imaging device (image sensor) 110 analyzes a two-dimensional pixel arrangement signal in which pixels which are main components of a brightness signal are arranged in a checkered state and pixels with a plurality of colors which are color information components are arranged in the remaining region, and thus performs a pixel conversion. Furthermore, a color which is the main component of the brightness signal is white or green.

The imaging device (image sensor) 110 is an imaging device which includes the filter having four kinds of spectral characteristic, red (R) penetrating a wavelength near red, green (G) penetrating a wavelength near green, blue (B) penetrating a wavelength near blue, and in addition white (W) penetrating all of RGB.

The imaging device 110 including this RGBW arrangement 181 filter receives any light of RGBW by the pixel unit through the optical lens 105, and generates an electric signal corresponding to a light receiving signal strength, by photoelectric conversion, thereby outputting the result. A mosaic image, which is made from light analysis of four kinds of RGBW, may be obtained by the imaging device 110.

An output signal of the imaging device (image sensor) 110 is input to a data conversion process unit 200 of the signal process unit 120.

The data conversion process unit 200, as described above referring to FIG. 2, performs the conversion process of converting the RGBW arrangement 181 to an RGB arrangement 182. When performing this conversion process, as described above, the five conversion or compensation processes, "Convert a W pixel position to a G pixel (Estimate a G pixel value)=(GonW)"

"Convert a G pixel position to an R pixel (Estimate an R pixel value)=(RonG)"

"Convert a G pixel position to a B pixel (Estimate a B pixel value)=(BonG)"

"Convert a B pixel position to an R pixel (Estimate an R pixel value)=(RonB)", and "Convert an R pixel position to a B pixel (Estimate a B pixel value)=(BonR), are performed.

In this conversion/compensation process, a process for suppressing a false color is concurrently performed.

The RGB arrangement 182 generated by the data conversion process unit 200, that is, data in the Bayer arrangement, is data in the color arrangement obtainable by the imaging device such as a conventional camera. This color arrangement data are input to an RGB signal process unit 250.

The RGB signal process unit 250 performs the same process as the signal process unit provided in, for example, the conventional camera does. Specifically, a color image 183 is generated by performing a de-mosaic process, a white balance adjustment process, a γ compensation process, and the like. The generated color image 183 is stored in the memory 130.

The control unit 140 performs a sequence of these processes. For example, a program causing the sequence of processes to be performed is stored in the memory 130, and the control unit 140 reads the program from the memory 130, and thus controls the sequence of the processes.

Referring to FIG. 6, a detailed configuration of the data conversion process unit 200 is described. The data conversion process unit 200 performs the conversion process of converting the RGBW color arrangement to the RGB arrangement 182. Furthermore, in this process, the process for suppressing the false color is concurrently performed.

The data conversion process unit 200, as shown in FIG. 6, a noise removal unit 201, first to fifth pixel interpolation parameter calculation units 202 to 208, an edge detection unit 209, a texture detection unit 210, and a blend process unit 211. The data conversion process unit 200 sequentially inputs the pixel values by the process unit of n×n pixels from the RGBW arrangement 181 which is a process image, and determines the conversion pixel value of the central pixel of n×n pixels, thereby outputting the result. When completing the conversion process on all of the pixels, the RGB arrangement 182 is accomplished and is provided to the RGB signal process unit 250 shown in FIG. 5.

A noise removal unit 201 performs a noise removal on the W pixel in the center of the input pixel unit.

A first pixel interpolation parameter calculation unit (GonW) 202 performs the parameter calculation process which is applied to the process of converting the W pixel to the G pixels.

A first temporary pixel setting unit (RBonWaroundG) 203 performs the process of converting the W pixel in the neighborhood of the G pixel to a temporary pixel (R') (B') of an R or B pixel, as a preparatory process prior to the process of converting the position of the W pixel adjacent to the G pixel to the R or B pixel.

A second pixel interpolation parameter calculation unit (RBonGofHV) 204 calculates, for example, a parameter corresponding to a longitudinal or traverse edge, as a parameter which is applied to the process of converting the G pixel to the R pixel or the B pixel.

A third pixel interpolation parameter calculation unit (RBonGofAD) 205 calculates, for example, a parameter corresponding to a gradient edge, as a parameter which is applied to the process of converting the G pixel to the R pixel or the B pixel.

A second temporary pixel setting unit (RBonWaroundRB) 206 performs the process of converting the W pixel in the neighborhood of the R or B pixel to the temporary pixel (R') (B') of the R or B pixel, as a preparatory process prior to the process of converting the position of the W pixel adjacent to the R pixel or the B pixel to the R pixel or the B pixel.

A fourth pixel interpolation parameter calculation unit (RBonRBofHV) 207 calculates, for example, the parameter corresponding to the longitudinal or traverse edge, as a parameter which is applied to the process of converting the R pixel to the B pixel, or the B pixel to the R pixel.

A fifth pixel interpolation parameter calculation unit (RBonRBofAD) 208 calculates, for example, the parameter corresponding to the gradient edge, as a parameter which is applied to the process of converting the R pixel to the B pixel, or the B pixel to the R pixel.

An edge detection unit 209 performs an edge direction detection process, using the W pixel.

A texture detection unit 210 performs a texture detection process, using the W pixel.

A blend process unit 211 performs a process of blending the pixel output in each of the processes described above.

[3. Description of the Process of the Data Conversion Unit]

Next, the process is described below, which each of the process units configuring the data conversion process unit 200 shown in FIG. 6 performs.

Furthermore, as described above referring to FIG. 6, the data conversion process unit 200 sequentially inputs the pixel values by a process unit of n×n pixels from the RGBW arrangement 181 and determines the conversion pixel value of the central pixel of n×n pixels, thereby outputting the result. In the embodiments described below, a configuration is described which performs the process by inputting the pixel region with 7×7 pixels as one process unit in the data conversion process unit 200, on the basis of n=7.

However, the noise removal unit 201, the edge detection unit 209, and the texture detection unit 210, among the process units shown in FIG. 6, may be set to perform the process, by any of the 7×7 pixel region unit, or the 5×5 pixel region unit in the center part of the pixel region with 7×7 pixels. The first pixel interpolation calculation unit 202 to the fifth pixel interpolation parameter calculation unit 208 which are the other process units performs the process by the 7×7 pixel region unit.

The processes of the edge detection, the noise removal, or the texture detection generates information which is used as supplementary information in the pixel value conversion. The pixel region for this information generation may be variously set. The smaller the process unit is, the more efficient the process unit is in terms of the process load. However, in a case where the process capability is sufficient, the larger pixel region may be set as the process unit. For example, the configuration may be possible which performs the process by the 7×7 pixel unit.

In this way, the process unit for the processes of the edge detection, the noise removal, and the texture detection may be variously set. In the following embodiments, a process example at the following setting described as one example.

The first pixel interpolation calculation unit 202 to the fifth pixel interpolation parameter calculation unit 208 perform the process on the RGBW arrangement 181, which are input to the data conversion process unit 200, by a 7×7 pixel region unit.

The edge detection unit 209 performs also the edge detection process by the same process unit as the 7×7 process unit for the RGBW arrangement 181 which is input to the data conversion process unit 200.

In the noise removal unit 201 and the texture detection unit 210, the 5×5 pixel region is extracted from the center part of the pixel region with 7×7 pixels, and the process is formed on the extracted 5×5 pixel region as the process unit.

In each of the process units, the process unit is set in this manner and the process is performed. A process by each of the process units is sequentially described below.

(3-1. Process by a Noise Removal Unit)

First, a process by the noise removal unit 201 is described referring to FIG. 7. The noise removal unit 201 performs the noise removal process on data in which the central pixel of the input pixel unit (7×7 pixels) to the data conversion process unit 200 is the W pixel. As described above, the noise removal unit 201 extracts the 5×5 pixel region from the center part of the pixel region with 7×7 pixels which the data conversion process unit 200 inputs, and the process is performed on the extracted 5×5 pixel region as the process unit. The noise removal is performed as the calculation process of calculating the noise reduction pixel value for the W pixel which is the center of the input pixel unit.

A variety of techniques for noise removal are applicable. Here, a noise reduction process example using a bilateral filter is described referring to FIG. 7.

FIG. 7(a) illustrates that the 5×5 pixel region which is set in the center part of the 7×7 pixels which is the input pixel unit is defined as a process object data 301 on which the noise removal process is performed. FIG. 7 is a view explaining an example in which the noise removal is applied to the W pixel (pixel p) in the center of the process object data 301.

FIG. 7 illustrates (a) process object data, (b) a noise reduction pixel calculation formula, and (c) a linear approximation example of a function φ(r).

As shown in (a) process object data, the noise removal unit 201 performs the process in a case where the central pixel (p) of the noise removal process object data 301 with the 5×5 pixels in the center part of the input pixel unit (7×7 pixels) having the RGBW arrangement is the W pixel. A gray region shown in 7(a) is the W pixel, and the other white region is any of the RGB pixels. Furthermore, in the other drawings which are referred to in the following description, the gray region is also defined as the W pixel, and the other white region as any of the RGB pixels.

The noise removal unit 201 uses a pixel value I (p) of the W pixel which is the central pixel (p) of the process object data 301 and a pixel value I (q) of the pixel which is included in the process object data 301 (5×5 pixels), and thus calculates a noise reduction pixel value $I_{NR}$ (p) according to a noise reduction pixel calculation formula shown in FIG. 7(2). That is, the noise reduction pixel value $I_{NR}$ (p) is calculated according to the following formula (Formula 1).

[Math 1]

$$I_{NR}(p) = \frac{\sum_{q \in \Omega_p} I(q) \cdot \varphi(|I(q) - I(p)|)}{\sum_{q \in \Omega_p} \varphi(|I(q) - I(p)|)}$$ Formula 1

In the above-described formula, Ωp is a set of pixels included in (5×5 pixels) which is the process object data 301, I(q) is its pixel value, and I (p) is a pixel value of the central pixel p (=W pixel).

The function φ(r) generally uses an exponential function. However, to suppress an amount of operation, as shown in FIG. 7(3), the function φ(r) may be a function to which the linear approximation is applied.

The linear approximation shown in FIG. 7(3) is a linear approximation example, where, r=0 to Th1(2.0)→φ(r)=1.0, r=Th1 (2.0) to Th2 (3.0)→φ(r)=1.0 to 0 (linear change), and r=equal to or more than Th2→φ(r)=0, with Th1=2.0 and Th2=3.0 being set as threshold values.

In this way, the noise removal unit 201 applies the bilateral filter, and thus calculates the noise reduction pixel value $I_{NR}$ (p) of the W pixel in the center of the noise removal process unit (5×5 pixels) according to the above-described formula (Formula 1). The calculated noise reduction W pixel ($I_{NR}$(p)) is output to the first pixel interpolation parameter calculation unit (GonW) 202 as shown in FIG. 6.

Furthermore, the process to which the bilateral filter is applied, described referring to FIG. 7, is one example of the noise removal process, and the noise removal unit 201 is not limited to the process to which the bilateral filter is applied, described referring to FIG. 7 and may have a configuration which uses other noise removal methods.

(3-2. Process by an Edge Detection Unit)

Next, a process by an edge detection unit 209 is described. The edge detection unit 209 verifies a discrete white (W) signal included in the RGBW arrangement which is an input signal, and generates edge information included in the image, for example, edge information including the edge direction and the edge strength, thereby outputting the result to the blend process unit 211 and additionally to the plurality of pixel interpolation parameter calculation units.

A judgment method of judging the edge direction and the edge direction using the W pixel, which the edge detection unit 209 performs, is described referring to FIG. 8 and the subsequent figures.

The edge detection unit 209 judges the edge direction and the edge strength using only the white (W) signal, among signals of the RGBW arrangement 181, which are input. In the present embodiment, the edge detection unit 209, as described above, performs the edge detection process by the same process unit as the 7×7 process unit for the RGBW arrangement 181 which is input to the data conversion process unit 200. The edge detection unit 209 sequentially performs the edge detection process on the 7×7 pixel region while moving the 7×7 pixel region one by one. The edge information (edge direction and edge strength) is obtained which corresponds to the central pixel of the 7×7 pixel regions, by performing the process on one 7×7 pixel region. The edge information corresponding to each pixel is output to the blend process unit 211, and the first to fifth pixel interpolation parameter calculation units.

A variety of techniques are applicable to the edge detection process. One such technique is described referring to FIGS. 8 and 9. In the method described below, 4×4 pixels in the neighborhood of the center of the 7×7 pixel region are used.

As shown in FIG. 8, the central pixel of the 7×7 pixels which is the process object comes in two cases. One is (a) the W pixel and the other is (b) a pixel other than the W pixel.

Furthermore, in FIG. 8, the pixel marked with gray is the W pixel and the other corresponds to any of the RGB.

The edge judgment process is performed on these two (a) and (b) cases, to estimate whether which of the four directions including horizontal, vertical, right gradient, and left gradient directions is the edge direction, or to estimate its strength, using the different calculation formulas.

Figure 9:
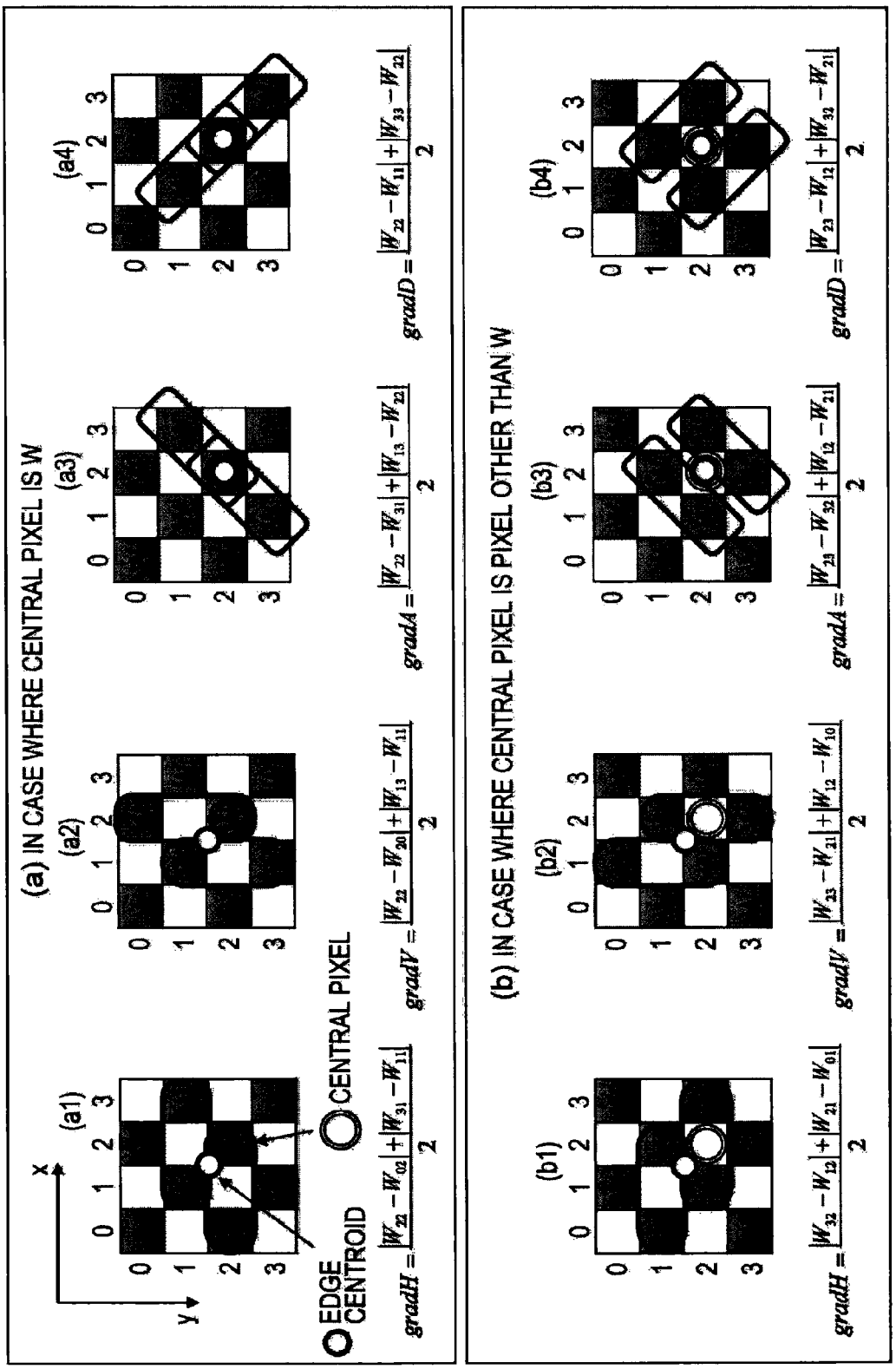
FIG. 9 is a view explaining the edge detection process which the edge detection unit 209 as shown in FIG. 6 performs.

The specific process is described referring to FIG. 9.

In FIG. 9, the calculation formulae are shown which are applied to the judgment process of judging the edge direction and the edge strength in the following two cases (a) and (b): (a) the case where the central pixel is the W pixel and (b) the case where the central pixel is a pixel other than the W pixel. The formula which is applied is a formula for calculating the gradient of the pixel in the specific direction in the image and is a formula for calculating each of the following values.

gradH: gradient absolute value average in the horizontal direction, gradV: gradient absolute value average in the vertical direction, gradA: gradient absolute value average in the right gradient upward direction, and gradD: gradient absolute value average left gradient upward direction.

The gradH, gradV, gradA, and gradD correspond to the absolute values of gradient (difference) of the pixel values in the different directions. The specific calculation process is described below.

(a) Process in a Case where a Central Pixel is a W Pixel

First, referring to FIG. 9(a), the process performed in a case where the central pixel is the W pixel is described. In FIG. 9(a), (a1) to (a4) illustrate calculation process examples of calculating gradH, gradV, gradA, and gradD in the case where the central pixel is the W pixel.

A position marked with a double circle "◉" is a position of the central pixel of the 7×7 pixels.

Furthermore, a position marked with a single circle "○" is a position of an edge centroid.

In a case where the central pixel is the W pixel, gradH, gradV, gradA, and gradD are calculated using the following calculation formula (Formula 2).

[Math 2]

$$gradH = \frac{|W_{22} - W_{02}| + |W_{31} - W_{11}|}{2}$$
$$gradV = \frac{|W_{22} - W_{20}| + |W_{13} - W_{11}|}{2}$$
$$gradA = \frac{|W_{22} - W_{31}| + |W_{13} - W_{22}|}{2}$$
$$gradD = \frac{|W_{22} - W_{11}| + |W_{33} - W_{22}|}{2}$$

Formula 2

Furthermore, Wxy indicates a W pixel value in the x-y coordinate position, in the coordinate system in which coordinates of the uppermost leftmost pixel of the 4×4 pixels shown in FIG. 9 is set to (0,0), and coordinates of the lowermost rightmost pixel is set to (3,3), with the horizontal direction being defined as (x) and the vertical direction as (y).

gradH is a gradient absolute value average in the horizontal direction, and corresponds to an average value of difference absolute values of the W pixels close to the horizontal direction.

As shown in FIG. 9 (a1), the average value of the difference absolute values of two of the W pixels close to the horizontal direction of two horizontal lines in the central part of the 4×4 pixel region is calculated as gradH.

gradV is the gradient absolute value average in the vertical direction, and corresponds to the average value of the difference absolute values of the W pixels close to the vertical direction.

As shown in FIG. 9 (a2), the average value of the difference absolute values of two of the W pixels close to the vertical direction of two vertical lines in the central part of the 4×4 pixel region is calculated as gradV.

gradA is the gradient absolute value average in the right gradient upward direction, and corresponds to the average value of the difference absolute values of the W pixels close to the right gradient upward direction.

As shown in FIG. 9 (a3), the average value of the difference absolute values of two of the W pixels close to the right gradient upward direction of one line in the right gradient upward direction, which is in the central part of the 4×4 pixel region is calculated as gradA.

gradD is the gradient absolute value average in the left gradient upward direction, and corresponds to the average value of the difference absolute values of the W pixels close to the left gradient upward direction.

As shown in FIG. 9(a4), the average value of the difference absolute values of two of the W pixels close to the left gradient upward direction of one line in the left gradient upward direction, which is in the central part of the 4×4 pixel region is calculated as gradD.

The greater the value of the gradient absolute value average gradH in the horizontal direction, the more likely the edge strength in the vertical direction is to be great.

The greater the value of the gradient absolute value average gradV in the vertical direction, the more likely the edge strength in the horizontal direction is to be great.

The greater the value of the gradient absolute value average gradA in the right gradient upward direction, the more likely the edge strength in the left gradient upward direction is to be great.

The greater the value of the gradient absolute value average gradD in the left gradient upward direction, the more likely the edge strength in the right gradient upward direction is to be great.

In this way, the edge direction and the edge strength may be judged based on each value of the calculated values, gradH, gradV, gradA, and gradD.

(b) Process in a Case where the Central Pixel is a Pixel Other than the W Pixel

Next, the process in a case where the central pixel is a pixel other than the W pixel is described referring to FIG. 9(b). In FIG. 9(b), (b1) to (b4), illustrate calculation process examples of calculating gradH, gradV, gradA, and gradD in the case where the central pixel is a pixel other than the W pixel.

A position marked with "●" is a position of the central pixel of the 7×7 pixels.

Furthermore, a position marked with "○" is an edge centroid position.

In a case where the central pixel is a pixel other than the W pixel, gradH, gradV, gradA, and gradD are calculated using the following calculation formula (Formula 3).

[Math 3]

$$gradH = \frac{|W_{32} - W_{12}| + |W_{21} - W_{01}|}{2}$$
$$gradV = \frac{|W_{23} - W_{21}| + |W_{12} - W_{10}|}{2}$$
$$gradA = \frac{|W_{23} - W_{32}| + |W_{12} - W_{21}|}{2}$$
$$gradD = \frac{|W_{23} - W_{12}| + |W_{32} - W_{21}|}{2}$$

Formula 3

Furthermore, Wxy indicates a W pixel value in the x-y coordinate position, in the coordinate system in which coordinates of the uppermost leftmost pixel of the 4×4 pixels shown in FIG. 9 is set to (0,0), and coordinates of the lowermost rightmost pixel is set to (3,3), with the horizontal direction being defined as (x) and the vertical direction as (y).

gradH is the gradient absolute value average in the horizontal direction, and corresponds to the average value of difference absolute values of the W pixels close to the horizontal direction.

As shown in FIG. 9 (b1), the average value of the difference absolute values of two of the W pixels close to the horizontal direction of two of the horizontal lines in the central part of the 4×4 pixel region is calculated as gradH.

gradV is the gradient absolute value average in the vertical direction, and corresponds to the average value of the difference absolute values of the W pixels close to the vertical direction.

As shown in FIG. 9 (b2), the average value of the difference absolute values of two of the W pixels close to the vertical direction of two vertical lines in the central part of the 4×4 pixel region is calculated as gradV.

gradA is the gradient absolute value average in the right gradient upward direction, and corresponds to the average value of the difference absolute values of the W pixels close to the right gradient upward direction.

As shown in FIG. 9 (b3), the average value of the difference absolute values of two of the W pixels close to the right gradient upward direction of two lines in the right gradient upward direction, which are in the central part of the 4×4 pixel region is calculated as gradA.

gradD is the gradient absolute value average in the left gradient upward direction, and corresponds to the average value of the difference absolute values of the W pixels close to the left gradient upward direction.

As shown in FIG. 9 (b4), the average value of the difference absolute values of two of the W pixels close to the left gradient upward direction of two lines in the left gradient upward direction, which are in the central part of the 4×4 pixel region is calculated as gradD.

The greater the value of the gradient absolute value average gradH in the horizontal direction, the more likely the edge strength in the vertical direction is to be great.

The greater the value of the gradient absolute value average gradV in the vertical direction, the more likely the edge strength in the horizontal direction is to be great.

The greater the value of the gradient absolute value average gradA in the right gradient upward direction, the more likely the edge strength in the left gradient upward direction is to be great.

The greater the value of the gradient absolute value average gradD in the left gradient upward direction, the more likely the edge strength in the right gradient upward direction is to be great.

In this way, the edge direction and the edge strength may be estimated based on each of the calculated values, gradH, gradV, gradA, and gradD.

In this way, the edge detection unit 209 obtains the edge information (edge direction and edge strength) corresponding to each pixel, based on each of gradH, gradV, gradA, and gradD. The obtained edge information is output to the blend process unit 211.

Furthermore, the edge direction•strength detection method described above is one example, and a configuration which uses other edge detection methods may be possible. For example, since the edge detection method described above referring to FIG. 9 uses the specific pixel value information in an extremely narrow range, the misjudgment is expected to occur when the noise is high. An obtainment process example of obtaining the edge information to prevent this misjudgment is described referring to FIG. 10.

Figure 10:
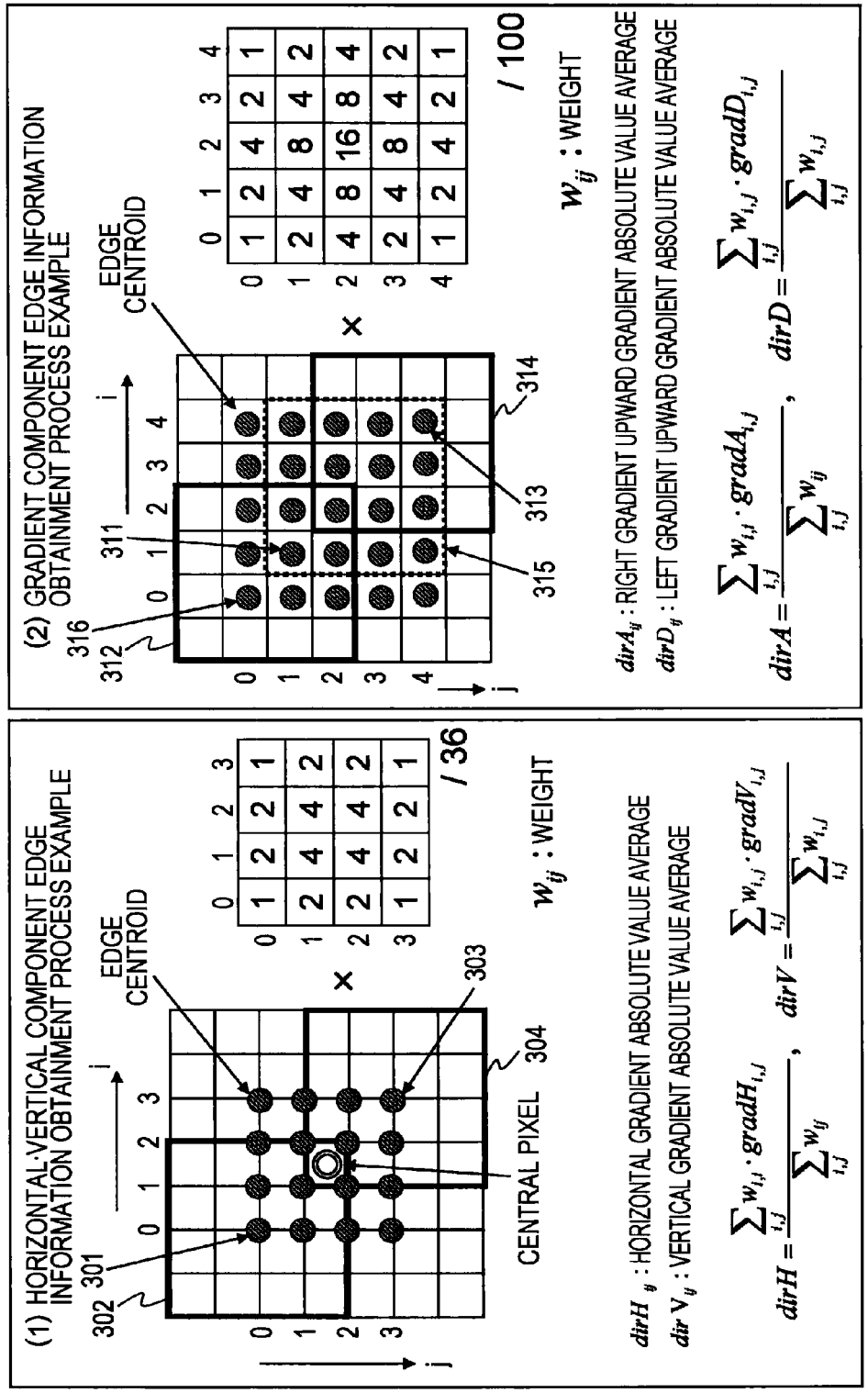
FIG. 10 is a view explaining the edge detection process which the edge detection unit 209 as shown in FIG. 6 performs.

The obtainment process example of obtaining the edge information shown in FIG. 10 is a technique which uses a process in which a weighting addition is performed on the gradient absolute value average, which is the calculation value described referring to FIG. 9. In FIG. 10, (1) an obtainment process example of obtaining the edge information on the horizontal•vertical component, and (2) an obtainment process example of obtaining the edge information on the gradient component are shown.

In FIGS. 10(1) and 10(2), image data on the 7×7 pixels are illustrated. This data are data which the edge detection unit 209 defines as the process object and in which only the W pixel values are discretely arranged in the same manner as shown in FIG. 9. The edge information (edge direction and edge strength) corresponding to the central pixel positioned in the center of the 7×7 pixels is obtained.

The obtainment process of obtaining the edge information on the horizontal•vertical component shown in FIG. 10(1) is described. In FIG. 10(1), 16 edge centroids are illustrated. These correspond to the edge centroids shown in FIG. 9 (a1), (a2), (b1), and (b2). That is, the edge centroids correspond to edge centroids at the time of calculating the values, gradH: the gradient absolute value average in the horizontal direction, and gradV: the gradient absolute value average in the vertical direction.

The 4×4 pixel region shown in FIG. 9 (a1), (a2), (b1), and (b2) is set in the 7×7 pixel region shown in FIG. 10(1). The setting-possible 4×4 pixel regions are 16, from the uppermost leftmost 4×4 pixel region 302 to the lowermost rightmost 4×4 pixel region 304 shown in the figure. The 16 edge centroids shown in FIG. 10 (1) are edge centroids which correspond to 16 of the 4×4 pixel regions, that is, edge centroids which have the same positions as 16 of the 4×4 pixel regions shown in FIG. 9($a$1), (a2), (b1), and (b2).

In a case where the coordinate position of the edge centroid is expressed as (i,j), with the horizontal axis being defined as i and the vertical axis as j on a scale of 0, 1, 2, and 3 as shown in the figure, the edge centroid (0, 0) 301 is an edge centroid which corresponds to the 4×4 pixel region 302. In a case where the 4×4 pixel region 302 is defined as the 4×4 pixel region shown in FIG. 9 (a1), (a2), (b1), and (b2), the edge centroid (0,0) 301 corresponds to the centroid shown in FIG. 9($a$1), (a2), (b1), and (b2).

Furthermore, the edge centroid (3,3) 303 is an edge centroid which is set by corresponding to the 4×4 pixel region 304. In a case where the 4×4 pixel region 304 is defined as the 4×4 pixel region shown in FIG. 9 (a1), (a2), (b1), and (b2), the edge centroid (3,3) 303 corresponds to the centroid shown in FIG. 9($a$1), (a2), (b1), and (b2).

In the 7×7 pixel region shown in FIG. 10(1), 16 sets, each set consisting of the 4×4 pixel region and the edge centroid, are set. Furthermore, the calculation formulae described referring to FIG. 9($a$1), (a2), (b1), and (b2) are used, and thus the values of gradH: the gradient absolute value average in the horizontal direction, and gradV: the gradient absolute value average in the vertical direction may be calculated by 16 for each, for these 16 sets.

The gradient absolute value averages (gradH) and (gradV) which are calculated using the 4×4 pixel region corresponding to the edge centroid (i, j) are expressed as $gradH_{i,j}$, and $gradV_{i,j}$, respectively. In addition to using these, the weighting addition value of the gradient absolute value average, that is, dirH: horizontal gradient information and dirV: vertical gradient information is calculated using the following calculation formula (Formula 4).

[Math 4]

$$dirH = \frac{\sum_{i,j} w_{i,j} \cdot gradH_{i,j}}{\sum_{i,j} w_{ij}}, \quad dirV = \frac{\sum_{i,j} w_{i,j} \cdot gradV_{i,j}}{\sum_{i,j} w_{ij}} \quad \text{Formula 4}$$

In the above-described formula, $w_{ij}$ is a weighting coefficient corresponding to the edge centroid at a (i,j) position. For example, the weighting coefficient, as shown in FIG. 10(1), is set as a weighting coefficient which is great in the center part and is small in the peripheral part. In FIG. 10(1), an example which maps the weighting coefficients in the range of (4/36) to (1/36) to 16 of the edge centroids is illustrated as one example of the weighting coefficient.

Next, the obtainment process example of obtaining the edge information on the gradient component shown in FIG. 10(2) is described. In FIG. 10 (2), 25 of the edge centroids are shown. These correspond to the edge centroids shown in FIG. 9(a3), (a4), (b3), and (b4). That is, these correspond to the edge centroids at the time of calculating gradA: gradient absolute value average of the right gradient upward direction and gradD: gradient absolute value average of the left gradient upward direction.

The 4×4 pixel region shown in FIG. 9(a3), (a4), (b3), and (b4) is set in the 7×7 pixel region. The setting-possible 4×4 pixel regions are 16, from the uppermost leftmost 4×4 pixel region 312 to the lowermost rightmost 4×4 pixel region 314 shown in the figure. Among 25 of the edge centroids shown in FIG. 10(2), 16 of the edge centroids within a dotted line rectangular frame 315 shown in FIG. 10(2) are edge centroids which correspond to 16 of the 4×4 pixel regions, that is, edge centroids which have the same positions as 16 of the 4×4 pixel regions shown in FIG. 9 (a3), (a4), (b3), and (b4).

In a case where the coordinate position of the edge centroid is expressed as (i,j), with the horizontal axis being defined as i and the vertical axis as j on a scale of 0, 1, 2, 3 and 4 shown in the figure, the edge centroid (1,1) 311 is an edge centroid which corresponds to the 4×4 pixel region 312. In a case where the 4×4 pixel region 312 is defined as the 4×4 pixel region shown in FIG. 9 (a3), (a4), (b3), and (b4), the edge centroid (1,1) 311 corresponds to the centroid shown in FIG. 9(a3), (a4), (b3), and (b4).

Furthermore, the edge centroid (4,4) 313 is an edge centroid is set by corresponding to the 4×4 pixel region 314. In a case where the 4×4 pixel region 314 is defined as the 4×4 pixel region shown in FIG. 9 (a3), (a4), (b3), and (b4), the edge centroid (4,4) 313 corresponds to the centroid shown in FIG. 9(a3), (a4), (b3), and (b4).

In FIG. 10(2), the edge centroid is illustrated also outside of the dotted line rectangular frame 315.

When the position i=0, or j=0, and (i, j)=(0,0) to (0,4), (1, 0) to (4,0) are the edge centroids.

As shown in FIG. 9(a3), (a4), (b3), and (b4), the pixel positions at the time of calculating gradA: the gradient absolute value average in the right gradient upward direction and gradD: the gradient absolute value average in the left gradient upward direction are only 8 pixels in the neighborhood of the edge centroid. Therefore, even though the edge centroid is set to the i=0, or j=0 positions shown in FIG. 10(2), gradA and gradV may be calculated.

Therefore, using the 7×7 pixel region, gradA and gradD which are calculable by setting the edge centroid to different positions are 25 data pieces corresponding to 25 of the edge centroid positions shown in FIG. 10 (2).

The formulae described referring to FIG. 9(a3), (a4), (b3), and (b4) are used, and thus gradA: the gradient absolute value average in the right gradient upward direction and gradD: the gradient absolute value average in the left gradient upward direction may be calculated by 25 for each, from the 7×7 pixel region shown in FIG. 10(2).

The gradient absolute value averages (gradA) and (gradD) calculated using the 4×4 pixel region which corresponds to the edge centroid (i,j) are expressed as $gradA_{i,j}$ and $igradD_{i,j}$, respectively. In addition to using these, the weighting addition value of the gradient absolute value average, that is, dirA: gradient information on the right gradient upward direction, and dirD: gradient information on the left gradient upward direction, are calculated using the calculation formula (Formula 5).

[Math 5]

$$dirA = \frac{\sum_{i,j} w_{i,i} \cdot gradA_{i,j}}{\sum_{i,j} w_{ij}}, \; dirD = \frac{\sum_{i,j} w_{i,j} \cdot gradD_{i,j}}{\sum_{i,j} w_{ij}} \quad \text{Formula 5}$$

In the above-described formula, $w_{ij}$ is the weighting coefficient corresponding to the edge centroid at a (i,j) position. For example, the weighting coefficient, as shown in FIG. 10(2), is set as the weighting coefficient which is great in the center part and is small in the peripheral part. In FIG. 10(2), an example which maps the weighting coefficients in the range of ($16/100$) to ($1/100$) to 25 of the edge centroids is illustrated as one example of the weighting coefficient.

The edge information calculated by performing the process described referring to FIG. 10, that is, dirH: horizontal gradient information, dirV: vertical gradient information, dirA: gradient information on the right gradient upward direction, and dirD; gradient information on the left gradient upward direction, are the edge information which is calculated using a plurality of pixel values (W pixel values) included in the 7×7 pixel region.

Therefore, the likelihood that the wrong result occurs due to, for example, a noise is reduced, compared with the edge information which is calculated by applying a small amount of information described referring to FIG. 9.

Furthermore, the setting example of setting the weighting coefficient $w_{ij}$ shown in the above-described formulae and FIG. 10 is one example, and therefore other averaging coefficients may be used.

Figure 11:
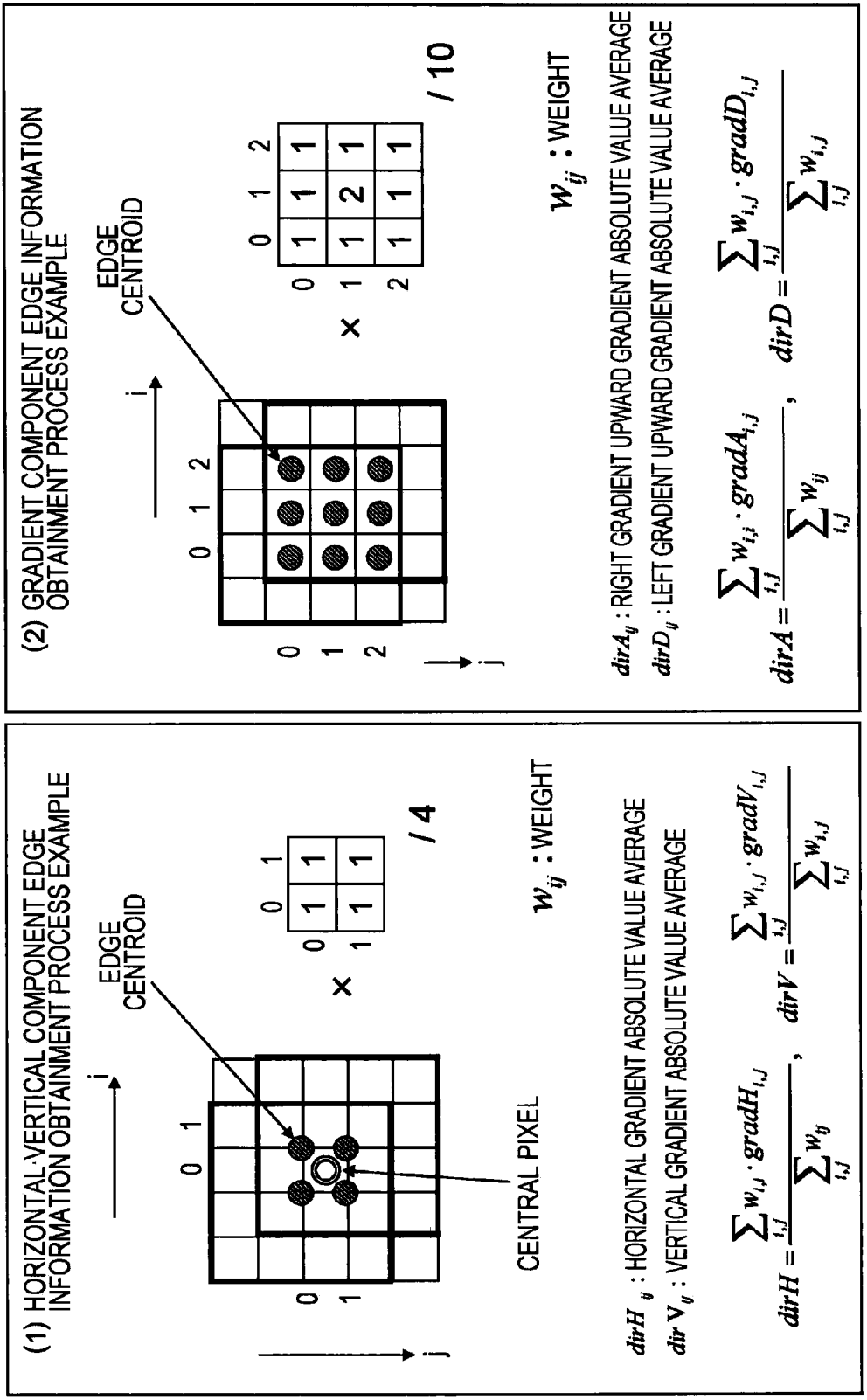
FIG. 11 is a view explaining the edge detection process which the edge detection unit 209 as shown in FIG. 6 performs.

Furthermore, the example described referring to FIG. 10 is an example in which the weighting addition values (dirH, dirV, dirA, and dirD) of the gradient absolute value average are calculated using the 7×7 pixel region, but, for example, as shown in FIG. 11, a configuration in which the weighting addition values (dirH, dirV, dirA, and dirD) of the gradient absolute value average are calculated using the 5×5 pixel region may be also employed.

That is, a configuration in which the edge detection is performed by extracting the 5×5 pixel region from the center part of the 7×7 pixel region which is input to the data conversion process unit 200 may be also employed. This process example is described referring to FIG. 11.

In FIG. 11, as in FIG. 10, each of (1) the obtainment process example of obtaining the edge information on the horizontal•vertical component, and (2) the obtainment process example of obtaining the edge information on the gradient component are illustrated.

In FIGS. 11(1) and 11(2), the 5×5 pixel image data are shown. This data are data which the edge detection unit 209 defines as the process object, and in which only the W pixel values are discretely arranged in the same manner as shown in FIG. 9. The edge information (edge direction and edge strength) corresponding to the central pixel positioned in the center of the 5×5 pixels is obtained.

(1) The obtainment process of obtaining the edge information on the horizontal•vertical component shown in FIG. 11(1) is described. In the 5×5 pixel region shown in FIG. 11(1), 4 sets, each set consisting of the 4×4 pixel region and the edge centroid, are set. Furthermore, the calculation formulae described referring to FIG. 9(a1), (a2), (b1), and (b2) are used, and thus the values of gradH: gradient absolute value average in the horizontal direction, and gradV: gradient absolute value average in the vertical direction may be calculated by 4 for each, for these 4 sets.

Gradient absolute value average (gradH) and (gradV) calculated using the 4×4 pixel region corresponding to the edge centroid (i,j) are expressed as $gradH_{i,j}$ and $gradV_{i,j}$, respectively. In addition to using these, the weighting addition value of the gradient absolute value average, that is, dirH: horizontal gradient information and dirV: vertical gradient information is calculated using the formula (Formula 4) described above.

Next, an obtainment process example of obtaining the edge information on the gradient component shown in FIG. 11(2) is described. In FIG. 11(2), 9 of the edge centroids are illustrated. These correspond to the edge centroids shown in FIG. 9 (a3), (a4), (b3), and (b4). That is, these correspond to the edge centroids at the time of calculating, gradA: gradient absolute value average of the right gradient upward direction and gradD: gradient absolute value average of the left gradient upward direction.

The formulae described referring to FIG. 9(a3), (a4), (b3), and (b4) are used, and thus gradA: gradient absolute value average in the right gradient upward direction and gradD: gradient absolute value average in the left gradient upward direction may be calculated by 9 for each, from the 5×5 pixel region shown in FIG. 11(2).

The gradient absolute value averages (gradA) and (gradD) which are calculated using the 4×4 pixel region corresponding to the edge centroid (i,j) are expressed as $gradA_{i,j}$ and $jgradD_{i,j}$, respectively. In addition to using these, the weighting addition value of the gradient absolute value average, that is, dirA: gradient information on the right gradient upward direction and dirD: gradient information on the left gradient upward direction are calculated using the above-described calculation formula (Formula 5).

In this way, in the process of calculating the weighting addition values (dirH, dirV, dirA, and dirD) of the gradient absolute value average, a variety of pixel regions including the 7×7 pixel region, and the 5×5 pixel region may be used.

The edge detection unit 209 outputs the edge information (dirH, dirV, dirA and dirD) obtained in this manner, that is, dirH: horizontal gradient information, dirV: vertical gradient information, dirA: gradient information on the right gradient upward direction, and dirD: gradient information on the left gradient upward direction to the blend process unit 211, and additionally to the plurality of pixel interpolation parameter calculation units.

(3-3. Process by a Texture Detection Unit)

Next, a process by a texture detection unit 210 is described. The texture detection unit 210 performs the texture detection process using the discrete white (W) pixel included in the RGBW arrangement which is the input signal. That is, the texture information corresponding to each pixel is detected, and the detection information is output to the blend process unit 211.

Specifically, whether the region adjacent to each pixel is an image with a large number of textures (low in flatness) or an image with a small number of textures (high in flatness) is detected and this detection information is output to the blend process unit 211 as the texture information corresponding to each pixel.

Figure 12:
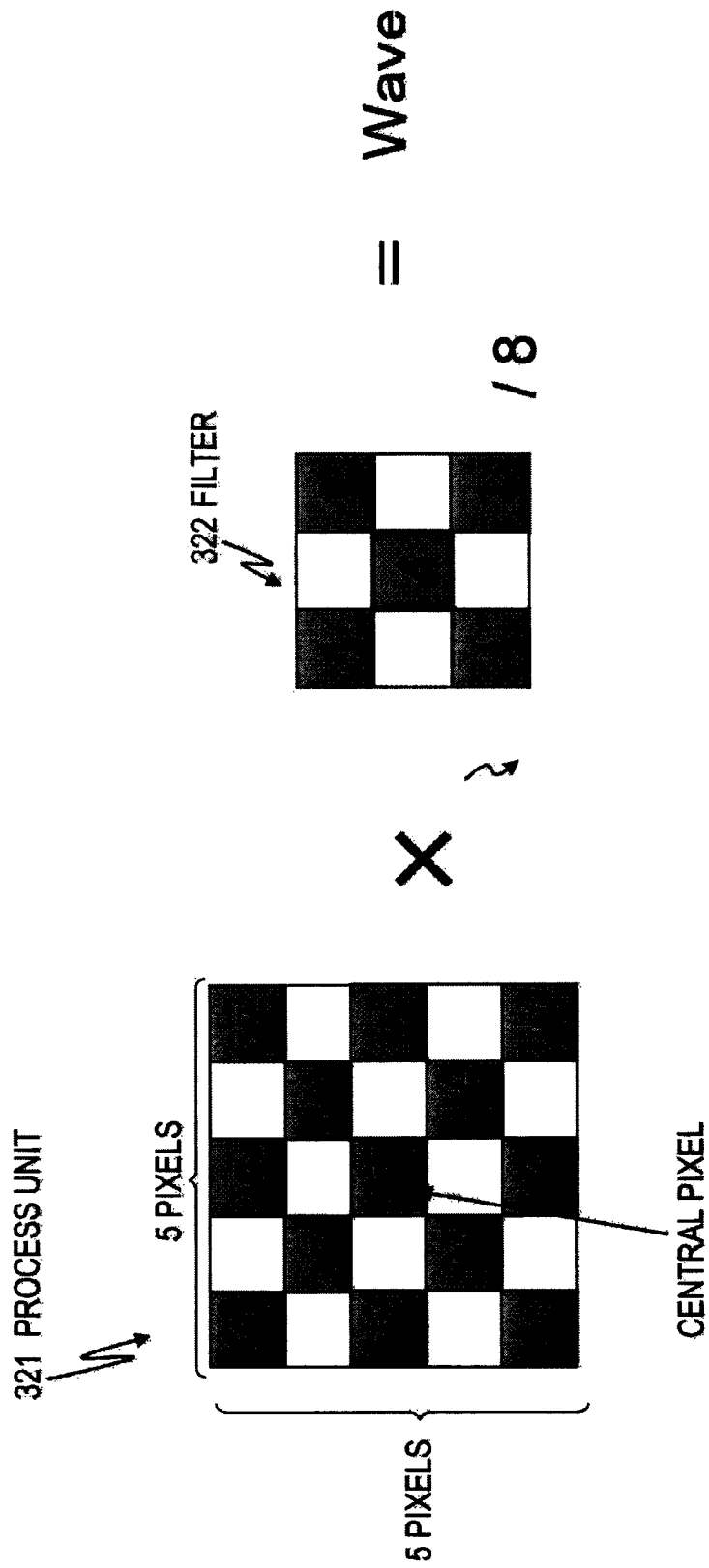
FIG. 12 is a view explaining a texture detection process which a texture detection unit 210 as shown in FIG. 6 performs.

The process by the texture detection unit 210 is described referring to FIG. 12 and the subsequent figures.

As described above, the texture detection unit 210 extracts the 5×5 pixel region from the center part of the 7×7 pixel region which is the input unit to the data conversion process unit 200, and thus performs the process on the extracted 5×5 pixel region as the process unit. The average value Wave of the W pixel is calculated for every process unit (5×5 pixels).

For example, a smoothing filter is used in the calculation process of calculating the W pixel average value Wave. In a case where the center of the input pixel unit is the W pixels, the average value Wave of the W pixel is obtained using the filter of which the filter coefficient is set as shown in FIG. 12, being set, and In a case where the center of the input pixel unit is not the W pixels, the average value Wave of the W pixel is obtained using the filter with the coefficient shown in FIG. 13, being set.

A process performed in a case where the center of the input pixel unit is the W pixel is described referring to FIG. 12. The value of the W pixel, among the 9 pixels of which the center is the W pixel position in a process unit 321 by which to process the 5×5 pixels of which the central pixel is the W pixel is multiplied by the filter coefficient for the pixel position corresponding to a filter 322 Furthermore, an addition value, a result of adding up multiplication results, is calculated. This addition result is defined as the average value Wave of a W signal. The average value Wave is calculated as an average value Wave for the central W pixel of the process unit 321. The texture detection unit 210 further uses the average value Wave corresponding to this pixel, and thus calculates a flatness weight (weightFlat) as an index of the texture extent corresponding to the central W pixel. This calculation process is described below.

Furthermore, for the filter coefficient of the filter 322 shown in FIG. 12, (4/8 to 1/8) is set to the central W pixel in the process unit 321 of the 5×5 pixels and to the neighboring W pixels. This filter coefficient is one example, and a configuration using other coefficients may be employed, and the coefficient is not given this limit in a case of a so-called low-pass filter. Furthermore, a configuration using a region larger than 9 pixels may be employed.

Figure 13:
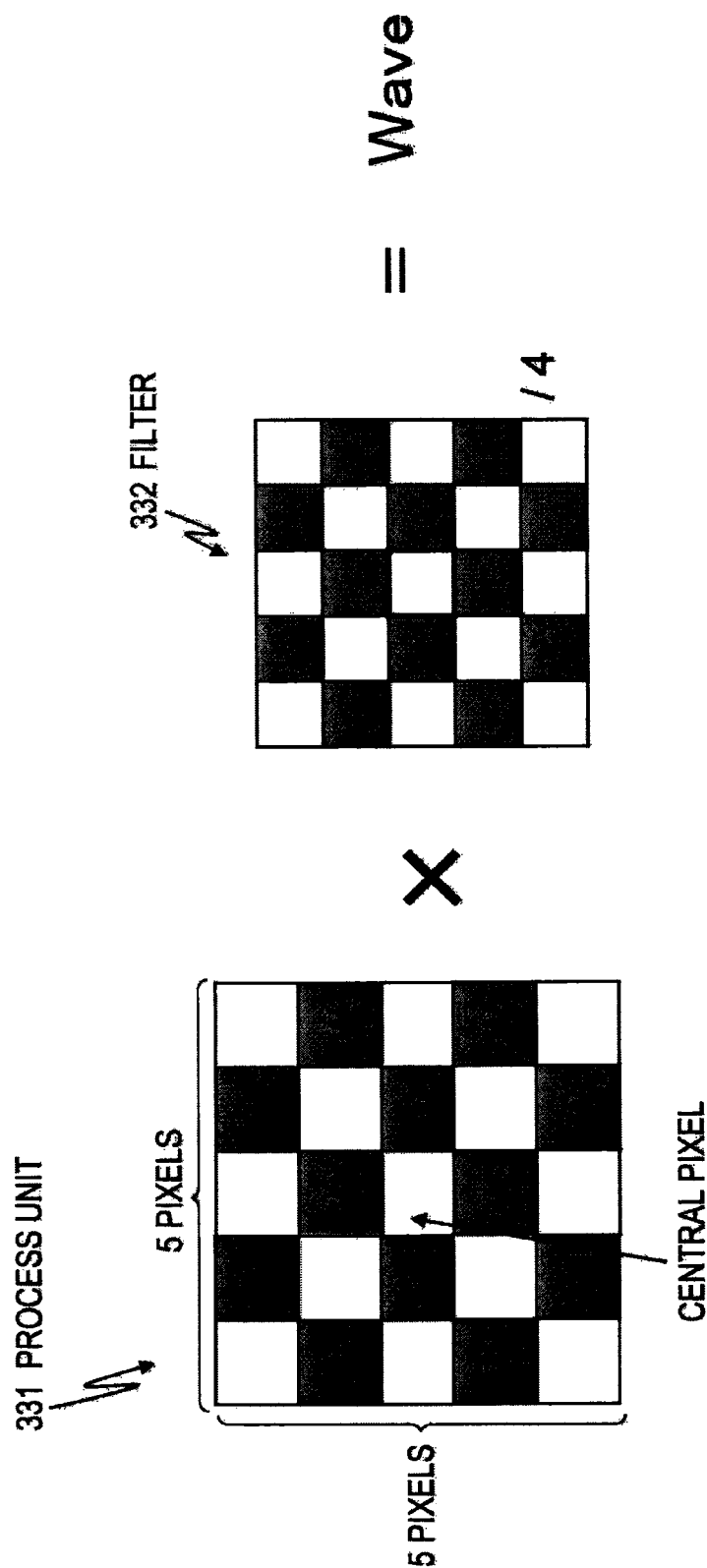
FIG. 13 is a view explaining the texture detection process which the texture detection unit 210 as shown in FIG. 6 performs.

Next, a process in a case where the center of the input pixel unit is a pixel other than the W pixel is described referring to FIG. 13. The value of the W pixel, among the 9 pixels of which the center is the central pixel position in a process unit 331 by which to process the 5×5 pixels of which the central pixel is a pixel other than the W pixel is multiplied by the filter coefficient for the pixel position corresponding to a filter 332. Furthermore, an addition value, a result of adding up multiplication results, is calculated. The addition result is defined as the average value Wave of the W signal. The calculated average value Wave is calculated as the average value Wave for the central pixel (any of RGB) of the process unit 331.

Furthermore, for the filter coefficient of a filter 332 shown in FIG. 13, each of the neighboring W pixels in the neighborhood of the central pixel of the process unit 331 of the 5×5 pixels is set to (1/4). This filter coefficient is one example, and a configuration using other coefficients may be employed, and the coefficient is not given this limit in a case of a so-called low-pass filter. Furthermore, a configuration which uses a region broader than 9 pixels may be employed.

In this way, the texture detection unit 210 applies the filter 322 shown in FIG. 12, or the filter 332 shown in FIG. 13, and thus, calculates the W pixel average value Wave corresponding to the central pixel of the input pixel unit, according to whether the central pixel of the input pixel unit is the W pixel or is an RGB pixel other than the W pixel.

The texture detection unit 210 uses the calculated W pixel average value Wave, and thus calculates a texture extent; WTX (p) according to the central pixel p=(x, y) using the following calculation formula (Formula 6).

[Math 6]

$$W_{TX}(p) = \sum_{q \in \Omega_p} \varphi(|I(q) - I_{AVE}(p)|) \qquad \text{Formula 6}$$

In the above-described formula (Formula 6), Ωp is a set of pixels included in the process unit (5×5 pixels) which is the process object data, I(q) is its pixel value, Iave(p) is the W pixel average value (the same value as Wave) calculated by applying the filter shown in FIG. 12 or FIG. 13, and φ(r) is a weighting function stipulated in advance.

Furthermore, the function φ(r) generally uses an exponential function. However, to suppress an amount of operation, a function to which the linear approximation is applied, as shown in FIG. 7(3) and described above, may be used.

The linear approximation shown in FIG. 7(3) is a linear approximation example, where r=0 to Th1(2.0)→φ(r)=1.0, r=Th1 (2.0) to Th2 (3.0)→φ(r)=1.0 to 0 (linear change), and r=equal to or more than Th2→φ(r)=0, with Th1=2.0 and Th2=3.0 being set as threshold values.

Furthermore, the texture detection unit 210 applies the texture extent; WTX (p) corresponding to the central pixel p calculated according to the above-described formula, and thus calculates the flatness weight (weightFlat) corresponding to the central pixel p=(x, y) according to the following formula (Formula 7).

$$\text{weightFlat}(x,y) = f_{flat}(WTX(p)) \qquad \text{(Formula 7)}$$

Figure 14:
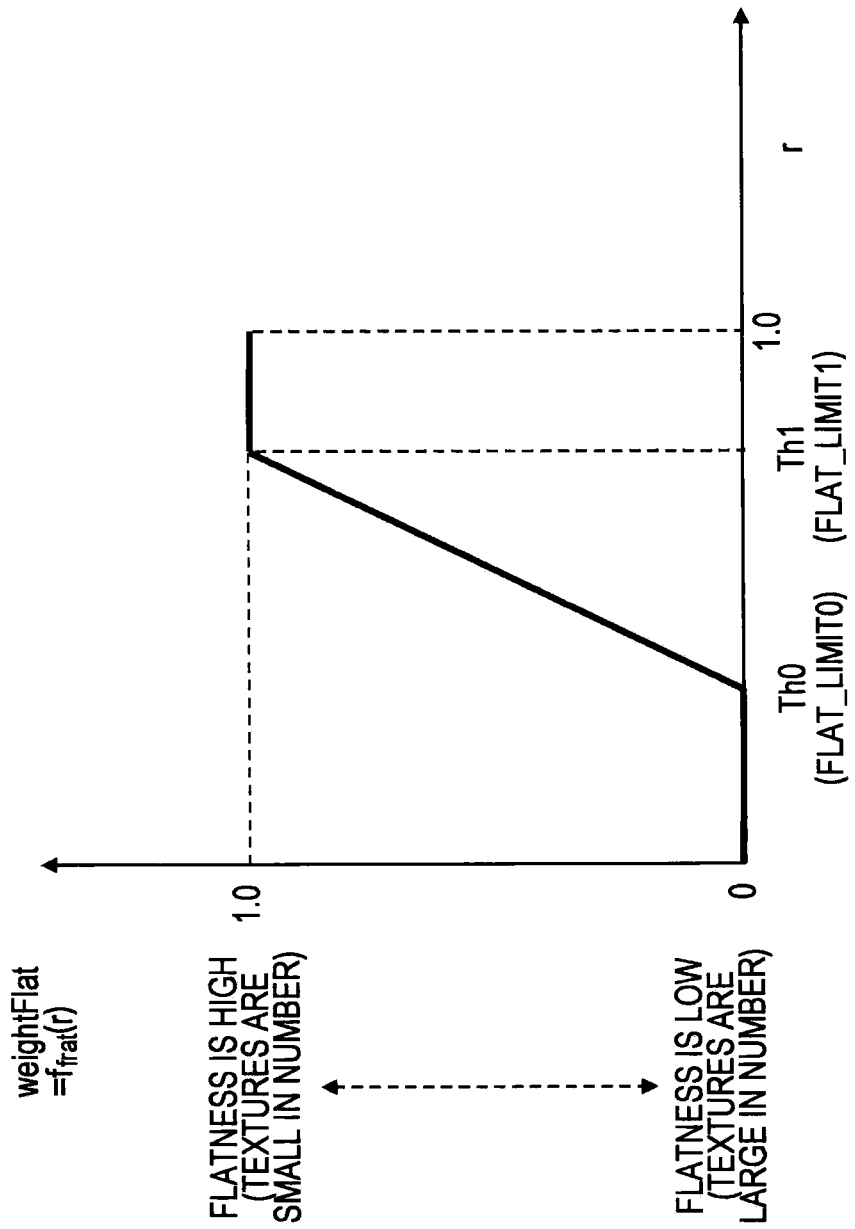
FIG. 14 is a view explaining the texture detection process which the texture detection unit 210 as shown in FIG. 6 performs.

In the formula (Formula 7) described above, for example, $f_{flat}(r)$ may use the linear approximation function as shown in FIG. 14.

The linear approximation function shown in FIG. 14 is a linear approximation example, where r=0 to Th 0→$f_{flat}(r)$=0, r=Th 0 to Th 1→$f_{flat}(r)$=0 to 1.0 (linear change), and r=equal to or more than Th 1→$f_{flat}(r)$=1 with 0<Th 0 (FLAT_LIMIT0)<Th 1 (FLAT_LIMIT 1)<1 being set as threshold values.

Furthermore, it is indicated that the smaller the value of the flatness weight (weightFlat), the lower the flatness and the larger the textures are in number in the image region, and the larger the value of the flatness weight (weightFlat), the more likely the flatness is to be high in the image region and the more likely the textures is to be large in number in the image region.

The texture detection unit 210 outputs the flatness weight (weightFlat) calculated in this manner to the blend process unit 211.

(3-4. Process by a Pixel Interpolation Parameter Calculation Unit)

Next, processes of first to fifth pixel interpolation calculation units 202, 204, 205, 207, and 208 within the data conversion process unit 200 in FIG. 6, and of the first and second temporary pixel setting units 203 and 206 are described. These units perform the following processes.

The first pixel interpolation parameter calculation unit (GonW) 202 performs the parameter calculation process which is applied to the process of converting the W pixel to the G pixel.

The first temporary pixel setting unit (RBonWaroundG) 203 performs the process of converting the W pixel in the neighborhood of the G pixel to a temporary pixel (R')(B') of the R or B pixel, as a preparatory process prior to the process of converting the position of the W pixel adjacent to the G pixel to the R or B pixel.

The second pixel interpolation parameter calculation unit (RBonGofHV) 204 calculates the parameter corresponding to the longitudinal or traverse edge, as a parameter which is applied to the process of converting the G pixel to the R pixel or the B pixel.

The third pixel interpolation parameter calculation unit (RBonGofAD) 205 calculates the parameter corresponding to a gradient edge, as a parameter which is applied to the process of converting the G pixel to the R pixel or the B pixel.

The second temporary pixel setting unit (RBonWaroundRB) 206 performs the process of converting the W pixel in the neighborhood of the R or B pixel to the temporary pixel (R')(B') of the R or B pixel, as a preparatory process prior to the process of converting the W pixel position adjacent to the R pixel or the B pixel to the R pixel or the B pixel.

The fourth pixel interpolation parameter calculation unit (RBonRBofHV) 207 calculates the parameter corresponding to the longitudinal or traverse edge, as a parameter which is applied to the process of converting the R pixel to the B pixel, or the B pixel to the R pixel.

The fifth pixel interpolation parameter calculation unit (RBonRBofAD) 208 calculates the parameter corresponding to the gradient edge, as a parameter which is applied to the process of converting the R pixel to the B pixel, or the B pixel to the R pixel.

(3-4-1. Process by a First Pixel Interpolation Parameter Calculation Unit (GonW) 202)

First, a process by a first pixel interpolation parameter calculation unit (GonW) 202 is described. The first pixel interpolation parameter calculation unit (GonW) 202 calculates an interpolation parameter which is applied to the calculation of the G pixel value which is set to the W pixel position in the RGBW arrangement 181.

Furthermore, the first pixel interpolation parameter calculation unit (GonW) 202 performs the process on the 7×7 pixel region, as the process unit (input pixel unit).

The first pixel interpolation parameter calculation unit (GonW) 202 first obtains the low frequency component mW of the W signal in the 7×7 pixel region as the process unit.

Figure 15:
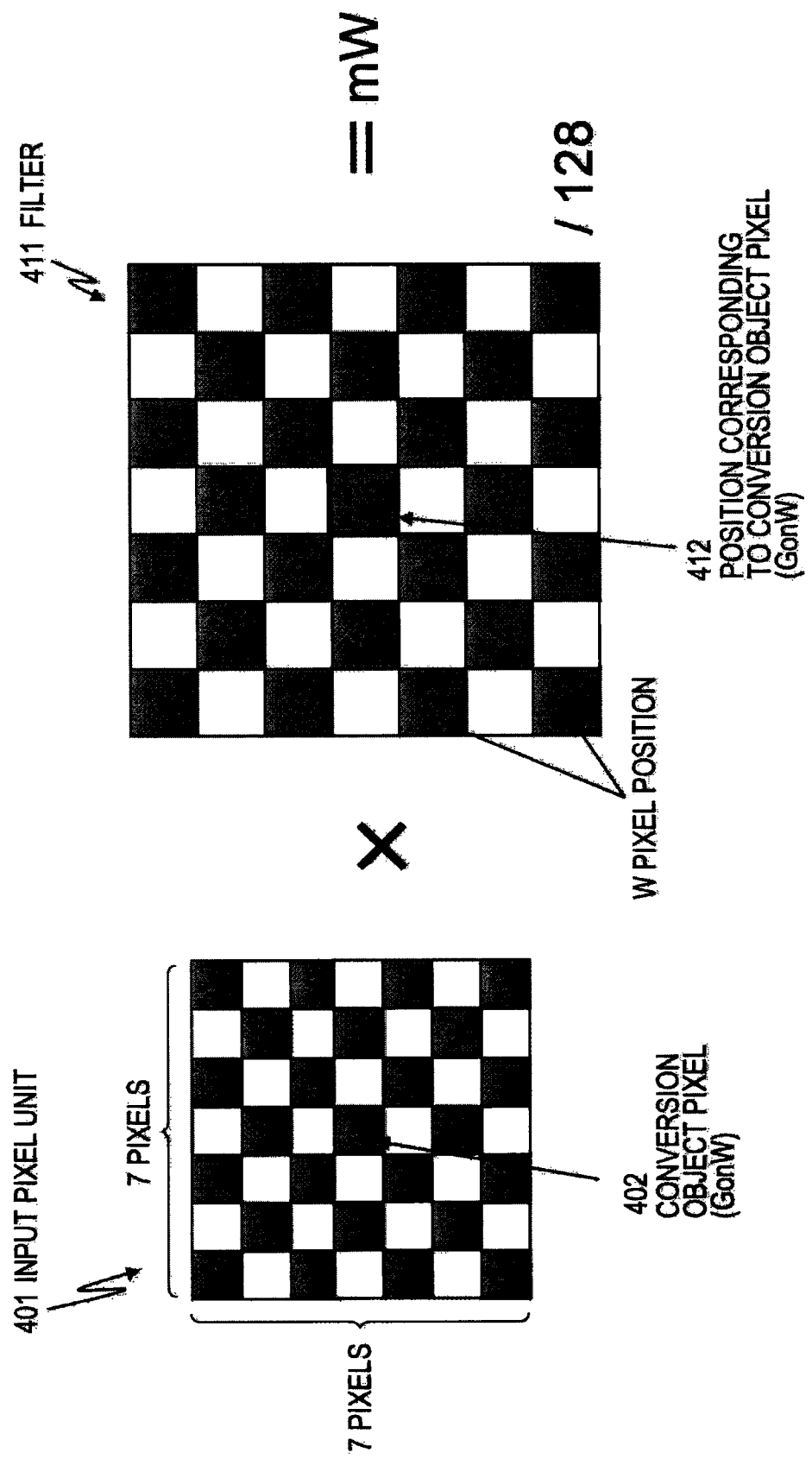
FIG. 15 is a view explaining a process which a first pixel interpolation parameter calculation unit (GonW) 202 as shown in FIG. 6 performs.

As shown in FIG. 15, a filter 411 shown in FIG. 15 is applied to an input image unit 401 of the 7×7 pixels, and thus the low frequency component mW corresponding to the input image unit 401 of the 7×7 pixels is calculated. At this point, the W pixel, which is an object to be converted to the G pixel, is a conversion object pixel 402 which is in the center of the input image unit 401 with the 7×7 pixels. In the input image unit 401 shown in FIG. 15, a pixel marked with gray is the W pixel. Other pixels are RGB pixels. filter of which the filter coefficient is set as a different filter may be applied. Other example other than the filter shown in FIG. 15, for example, other smoothing filters having low-pass characteristics may be used.

Furthermore, the first pixel interpolation parameter calculation unit (GonW) 202 obtains a high frequency component w of the W signal in the 7×7 pixel region as the process unit.

Figure 16:
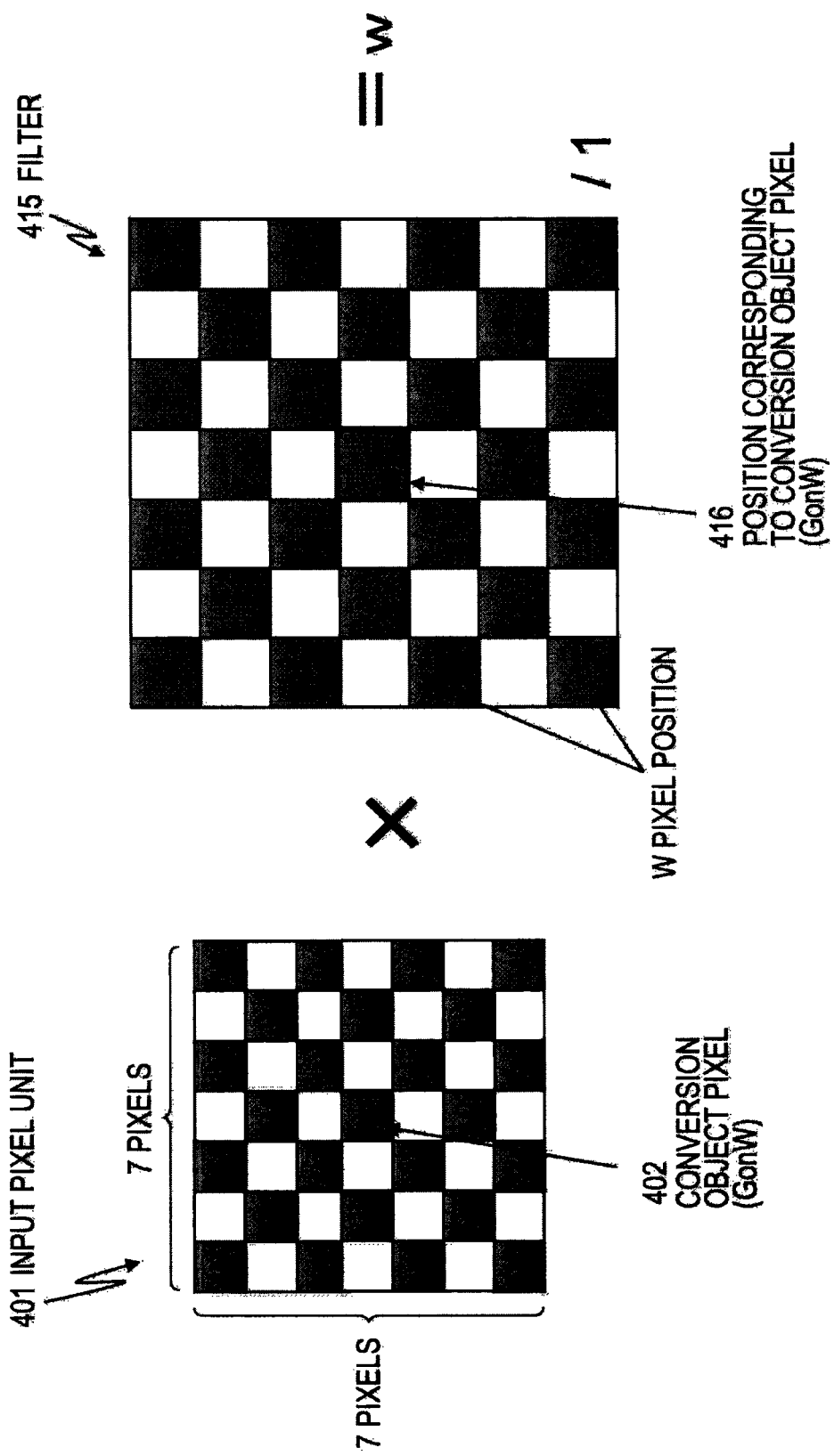
FIG. 16 is a view explaining the process which the first pixel interpolation parameter calculation unit (GonW) 202 as shown in FIG. 6 performs.

As shown in FIG. 16, a filter 415 shown in FIG. 16 is applied to the input image unit 401 of the 7×7 pixels, and thus the high frequency component w corresponding to the input image unit 401 of the 7×7 pixels is calculated. The W pixel which is an object to be converted to the G pixel is the conversion object pixel 402 in the center of the input image unit 401 of the 7×7 pixels.

The filter 415 is a filter of which only filter coefficient for a conversion object pixel correspondence position 416 is set to 1. The filter 416 is applied, and thus the high frequency component w is calculated. The pixel value for the W pixel position in the input image unit 401 of the 7×7 pixels is multiplied by the filter coefficient for the pixel position corresponding to the filter 415, and thus the high frequency component w of the W signal is calculated.

Figure 17:
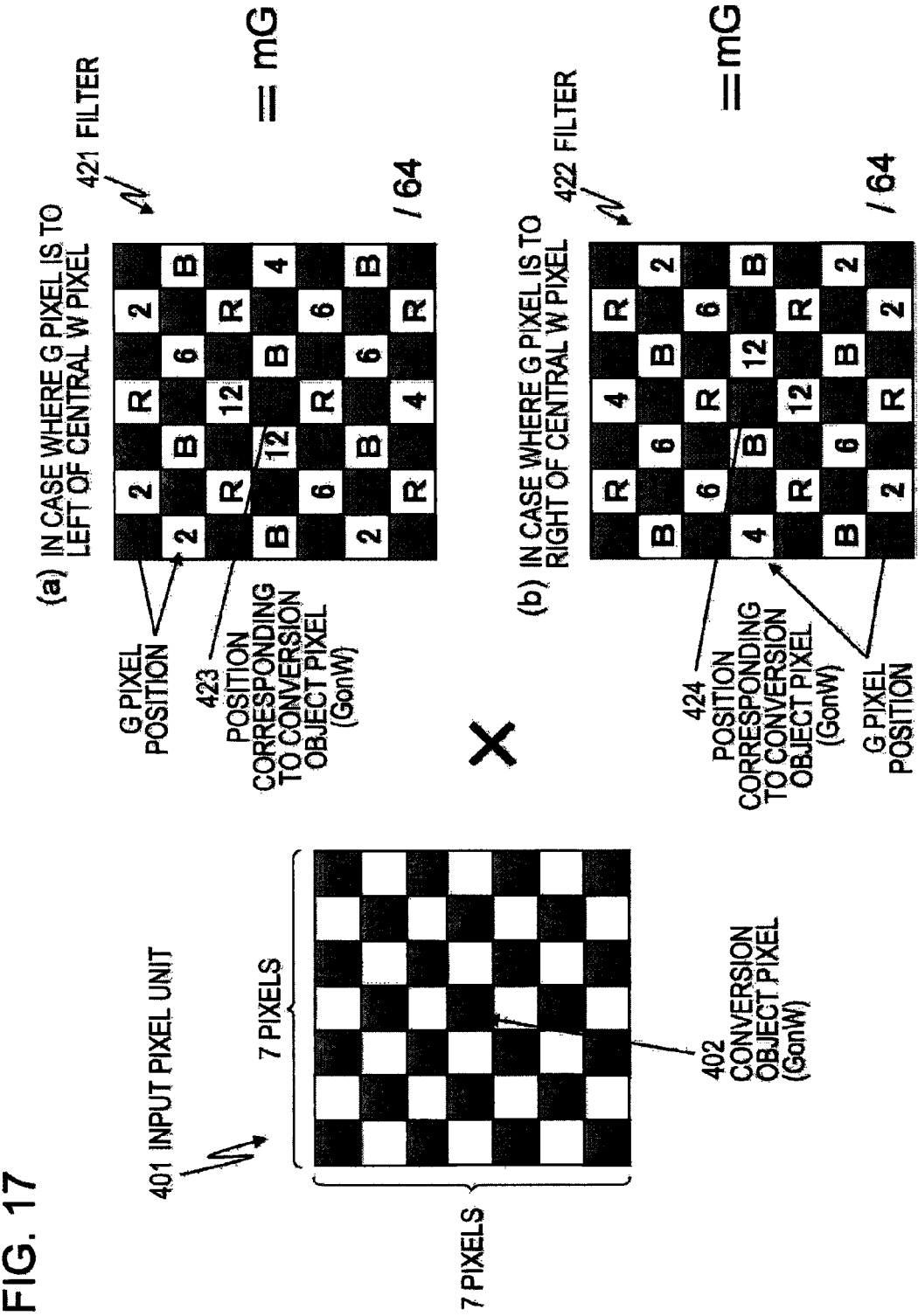
FIG. 17 is a view explaining the process which the first pixel interpolation parameter calculation unit (GonW) 202 as shown in FIG. 6 performs.

Next, a calculation process of calculating a low frequency component G of a G signal is described referring to FIG. 17. In the calculation process of calculating the low frequency component mG of the G signal, the filter which varies according to the configuration of the input image unit 401 of the 7×7 pixels and the edge direction is applied.

Specifically, as shown in FIG. 17, the filters 421 and 422 shown in FIG. 17 are properly used, according to the following two kinds of patterns: (a) the case in which the G pixel is to the left of the central W pixel of the input image unit 401 is, and (b) the case in which the G pixel is to the right of the central W pixel of the input image unit 401.

By this application of the filter, the low frequency component mG corresponding to an input signal 401 of the 7×7 pixels is calculated. At this point, the W pixel which is an object to be converted to the G pixel is the conversion object pixel 402 in the center of the input signal 401 of the 7×7 pixels.

In (a) the case where the G pixel is to the left of the central W pixel of the input image unit 401, a filter 421 of which the coefficient is set as shown in FIG. 17(a) is applied, and thus the low frequency component mG of the G pixel is calculated. The pixel showing the value indicating the filter coefficient is the position corresponding to the G pixel. The center of the filter 421 is a conversion object pixel correspondence position 423. In the case where the G pixel is to the left of the central W pixel of the input image unit 401, the configuration may be employed in which the weight of the filter coefficient for the G pixel position which is to the left of the immediate vicinity of the conversion object pixel correspondence position 423 is set to be great, and thus the effect of this pixel value of the G pixel on the conversion value is increased.

In (b) the case where the G pixel is to the right of the central W pixel of the input image unit 401, a filter 422 of which the coefficient is set as shown in FIG. 17(b) is applied, and thus the low frequency component mG of the G pixel is calculated. The pixel showing the value indicating the filter coefficient is the position corresponding to the G pixel. The center of the filter 422 is a conversion object pixel correspondence position 424. In the case where the G pixel is to the right of the central W pixel of the input image unit 401, the configuration may be employed in which the weight of the filter coefficient for the G pixel position which is to the right of the immediate vicinity of the conversion object pixel correspondence position 423 is set to be great, and thus the effect of this pixel value of the G pixel on the conversion value is increased.

Whatever filter is applied is set as a filter of which the filter coefficient for the position corresponding to the G pixel near the position corresponding to the conversion object pixel is the highest, and of which the filter coefficient becomes lower as the extent of departing from the neighborhood becomes large. A coefficient in a range of (1/64 to 12/64) is set as the coefficient. Any of the filters 421 and 422 is applied, and thus the low frequency component mG is calculated. The pixel value for the G pixel position in the input image unit 401 of the 7×7 pixels is multiplied by the filter coefficient which any of the filters 421 and 422 has, and the addition value, a result of adding up the multiplication results, is calculated as the low frequency component mG of the G signal.

Furthermore, the filter coefficient setting example for the filters 421 and 422, shown in FIG. 17, is one example, and a filter of which the filter coefficient is set as a different filter coefficient may be applied.

In this way, the first pixel interpolation parameter calculation unit 202 defines the 7×7 pixel region of which the central pixel is the W pixel which is the conversion object to be converted to the G pixel, as the process unit, and thus calculates the low frequency components mW and mG of the W pixel and the G signal, and the high frequency component w of the W pixel.

It is assumed that a ratio of mW to mG calculated in this manner is maintained in the local region within the image. According to this assumption, the correspondence relationship showing a pixel value ratio of W to G in the local region is a correspondence relationship plotted on the graph in FIG. 18. On the graph in FIG. 18, the W pixel values are plotted along the horizontal axis, and the G pixels along the vertical axis. If the ratio of W pixel value to G pixel value is held constant, it is assumed that the W pixel and the G pixel are in a proportional relationship like a straight line (line L1) shown in FIG. 18, in the specifically narrow local region in the image.

According to this assumption, in the case where the central W pixel in the input image unit 401, that is, the pixel value of the W signal of the conversion object pixel position is defined as w (=high frequency component), a pixel value GonW of the G signal which has to be set to that conversion object pixel position may be calculated according to the following formula.

This expression, GonW=(mG/mW) w is a pixel value estimation method based on the assumption that a ratio of W pixel value to G pixel value is constant in the local region.

Furthermore, mW is the low frequency component mW of the W signal, which is calculated by performing the process described referring to FIG. 15.

mG is the low frequency component mG of the G signal which is calculated by performing the process described referring to FIG. 17. For mG, the value is applied which is different according to the configuration and edge direction of the input image unit 401.

Figure 18:
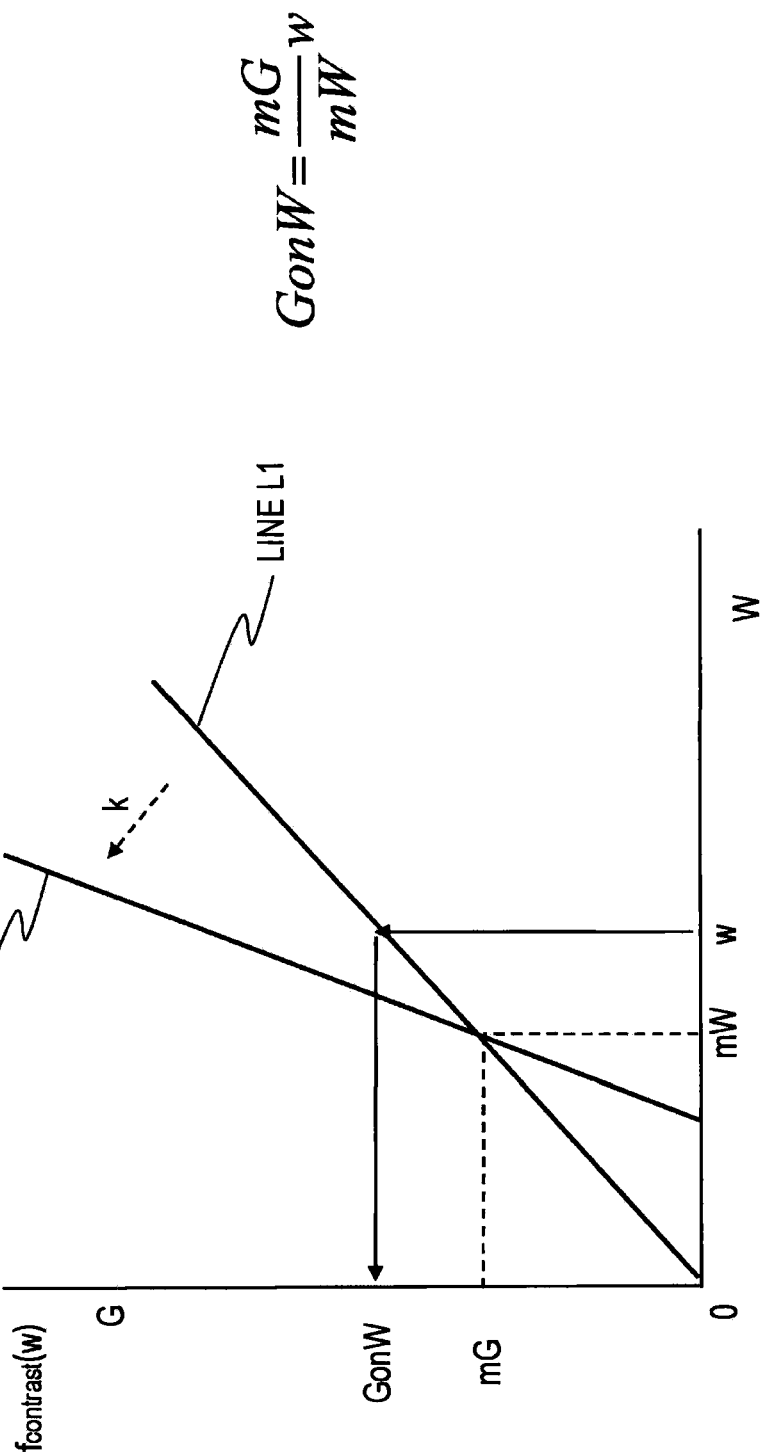
FIG. 18 is a view explaining the process which the first pixel interpolation parameter calculation unit (GonW) 202 as shown in FIG. 6 performs.

The straight line (line L1) shown in FIG. 18 is a line drawn based on the assumption that the ratio of W pixel value to G pixel value is constant in the local region. In a case where the contrast enhancement process is performed at the time of the contrast enhancement process, the line like the straight line (line L2), as shown in FIG. 18, may be applied. k is a contrast enhancement process adjustment parameter.

The pixel value of the G pixel which is set to the conversion object W pixels in the case of applying the contrast enhancement process is calculated as follows.

The pixel value of the W signal for the conversion object pixel position is defined as w, and the pixel value of the G signal, which is to be set to the conversion object pixel position as GonW. The G pixel value GonW after the conversion may be calculated according to the following formula.

$$GonW = f_{contrast}(mG, mW, w, k) f_{contrast}(mG, mW, w, k)$$
$$= k(mG/mW)(w - mW) + mG \ldots (\geq 0)$$
$$= 0 \ldots (< 0)$$

Furthermore, k is the contrast enhancement process adjustment parameter (no enhancement when k=1).

mW is the low frequency component mW of the W signal calculated by performing the process described referring to FIG. 15.

mG is the low frequency component mG of the G signal calculated by performing the process described referring to FIG. 17. Furthermore, mG is calculated using the different filters shown in FIGS. 17 (a) and (b) in the case where the G pixel is to the left of the central W pixel and in the case where the G pixel is to the right of the center W pixel.

In this way, the first pixel interpolation parameter calculation unit 202 calculates the following parameter, as the interpolation parameter which is applied to convert the W pixel to the G pixel in the RGBW arrangement.

The parameters, that is, the low frequency component mW of the W signal, the high frequency component w of the W signal, and the low frequency component mG of the G signal, are parameters corresponding to one W pixel in the center part of the 7×7 pixels as the process object. The first pixel interpolation parameter calculation unit 202 performs the same process on the W pixel included in the RGBW arrangement to be input, and thus calculates the above parameter for each W pixel. The calculation parameters are output to the blend process unit 211 shown in FIG. 6.

The blend process unit uses these parameters and data output from, for example, the texture detection unit 210, and thus calculates the G pixel value (GonW) which is set to the position of the W pixels included in the RGBW arrangement, according to the following formula.

$$GonW = (\text{weightFlat})(mG/mW)w + (1-\text{weightFlat})(k(mG/mW)(w-mW)+mG)$$

Furthermore, in the above-described formula, mW=the low frequency component mW of the W signal, w=the high frequency component w of the W signal, mG=the low frequency component mG of the G signal, weightFlat=flatness weight, and k=the contrast enhancement process adjustment parameter (no contrast enhancement when k=1 (refer to FIG. 18)).

Furthermore, weightFlat is the flatness weight which the texture detection unit 210 detects, the smaller the value of the flatness weight (weightFlat), the lower the flatness and the larger the textures are in number in the image region, and the larger the value of the flatness weight (weightFlat), the more likely the flatness is to be high in the image region and the more likely the textures is to be large in number in the image region.

The contrast enhancement process adjustment parameter (k) may be set in various ways, such as using a pre-set value, or using an input value input by a user.

(3-4-2. Process by a First Temporary Pixel Setting Unit (RBonWaroundG) 203)

Next, a first temporary pixel setting unit (RBonWaroundG) 203 is described. As is apparent from the block diagram shown in FIG. 6, the first temporary pixel setting unit (RBonWaroundG) 203 is provided in front of the second pixel interpolation parameter calculation unit (RBonGofHV) 204, and the third pixel interpolation parameter calculation unit (RBonGofAD) 205.

Any of the second pixel interpolation parameter calculation unit (RBonGofHV) 204 and the third pixel interpolation parameter calculation unit (RBonGofAD) 205 calculates the parameter for converting the G pixel to the R or B pixel. The first temporary pixel setting unit (RBonWaroundG) 203 performs a process of converting the W pixel position adjacent to RB pixels to a temporary R pixel (R') or B pixel (B') prior to these processes.

The first temporary pixel setting unit (RBonWaroundG) 203 first obtains the low frequency component mW of the W signal in the 7×7 pixel region as the process unit, a low frequency component mR of an R signal, and a low frequency component mB of the B signal.

Figure 19:
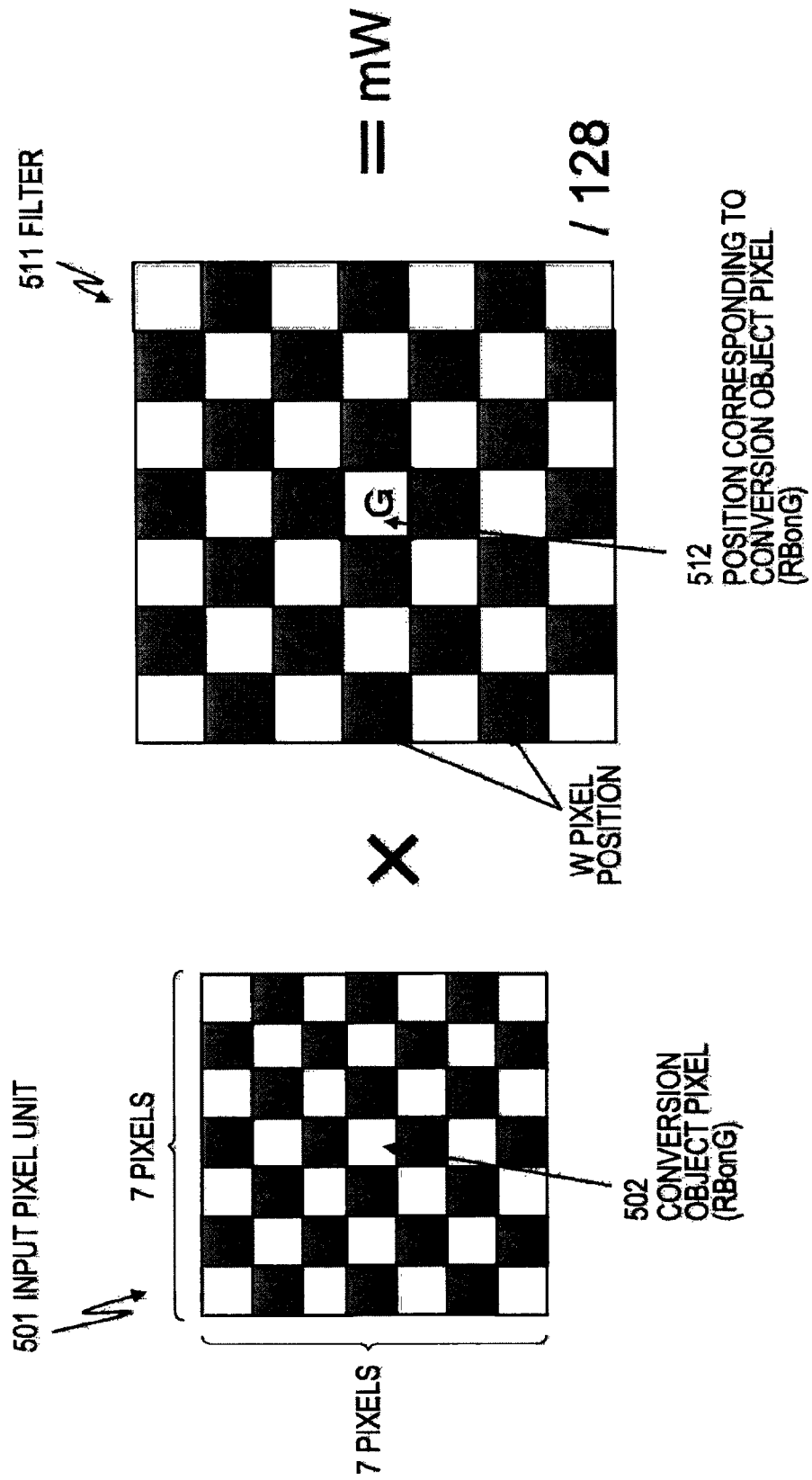
FIG. 19 is a view explaining a process which a first temporary pixel setting unit (RBonWaroundG) 203 as shown in FIG. 6 performs.

As shown in FIG. 19, a filter 511 shown in FIG. 19 is applied to an input pixel unit 501 of the 7×7 pixels, and thus the low frequency component mW of the W signal corresponding to the input pixel unit 501 of the 7×7 pixels is obtained.

Figure 20:
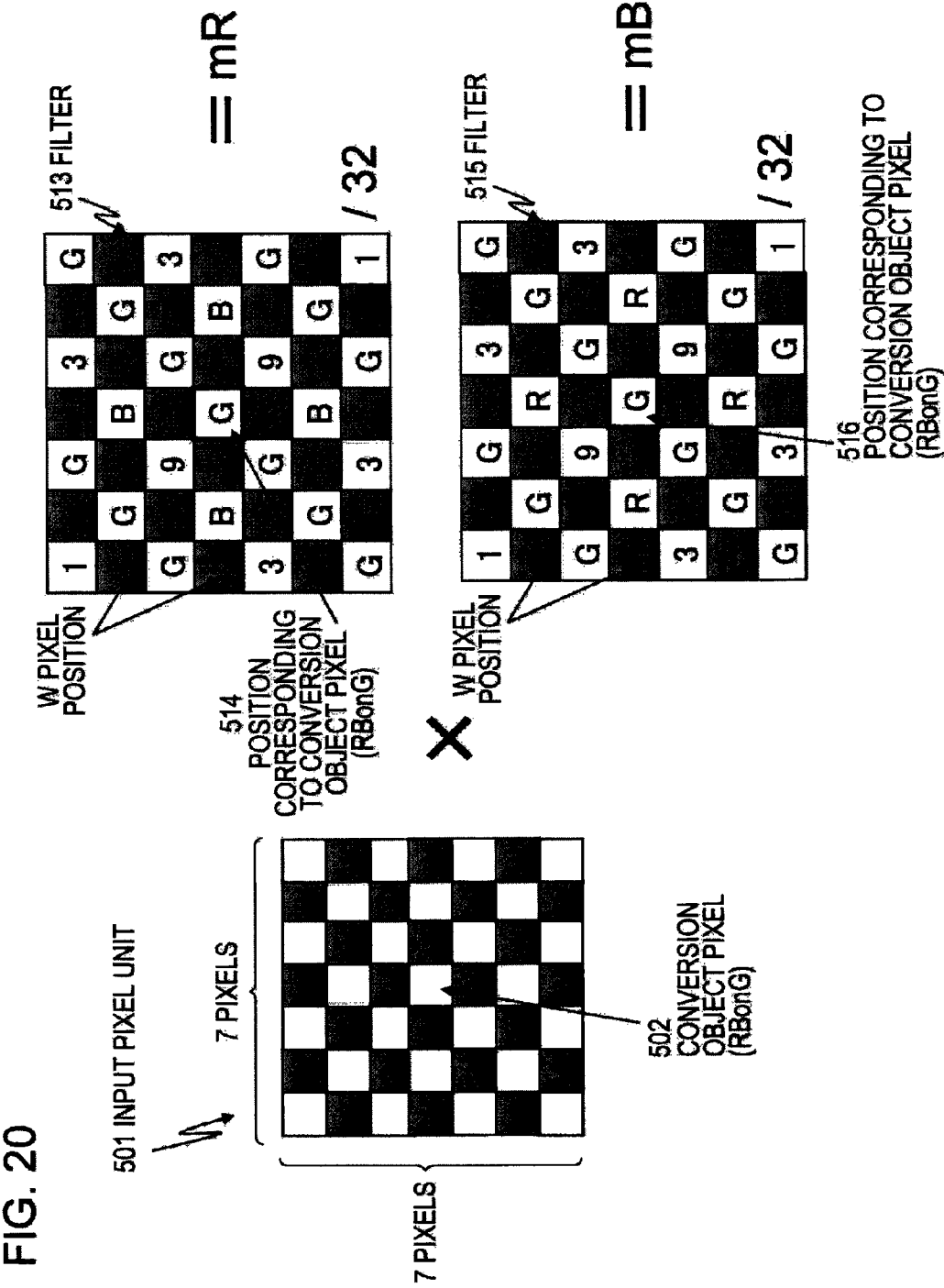
FIG. 20 is a view explaining the process which the first temporary pixel setting unit (RBonWaroundG) 203 as shown in FIG. 6 performs.

Furthermore, as shown in FIG. 20, filters 513 and 515 shown in FIG. 20 are applied to the input pixel unit 501 of the 7×7 pixels, and thus the low frequency component mR of the R signal and the low frequency component mB of the B signal which correspond to a conversion object pixel 502 in the center of the input pixel unit 501 of the 7×7 pixels are obtained.

The central pixel of the input pixel unit 501 of the 7×7 pixels shown in FIG. 19 and FIG. 20 is the conversion object pixel 502. In this case, the input pixel unit 501 is an input to the second pixel interpolation parameter calculation unit (RBonGofHV) 204 and the third pixel interpolation parameter calculation unit (RBonGofAD) 205, and since these are process units calculating the parameter for converting the G pixel to the R or B pixel, the conversion object pixel 502 in the center of the input pixel unit 501 is the G pixel.

A filter 511 obtaining the low frequency component mW of the W signal shown in FIG. 19 is a filter with the 7×7 pixels of which the center is a conversion object pixel correspondence position 512, and a coefficient setting unit is the position corresponding to the W pixel. The coefficient in the range of ($2/128$ to $12/128$) is set to the position corresponding to the W pixel in the filter 511. Each pixel value for the W pixel position in the input pixel unit 501 of the 7×7 pixels is multiplied by the filter coefficient for the pixel position corresponding to the filter 511, and thus the addition value, a result of adding up the multiplication results, is calculated as the low frequency component mW of the W signal.

A filter 513 obtaining the low frequency component mR of the R signal shown on the upper section of FIG. 20 is a filter with the 7×7 pixels of which the center is a conversion object pixel correspondence position 514, and the coefficient setting unit is the position corresponding to the R pixel. The coefficient in the range of ($1/32$ to $9/32$) is set to the position corresponding to the R pixel in the filter 513. Each pixel value for the R pixel position of the input pixel unit 501 of the 7×7 pixels is multiplied by the filter coefficient for the pixel position corresponding to the filter 513, and thus the addition value, a result of adding up the multiplication results, is calculated as the low frequency component mR of the R signal.

A filter 515 obtaining the low frequency component mB of the B signal shown in the lower section of FIG. 20 is a filter with the 7×7 pixels of which the center is a conversion object pixel correspondence position 516, and the coefficient setting unit is the position corresponding to the B pixel. The coefficient in the range of ($1/32$ to $9/32$) is set to the position corresponding to the B pixel in the filter 515. Each pixel value for the B pixel position in the input pixel unit 501 of the 7×7 pixels is multiplied by the filter coefficient for the pixel position corresponding to the filter 515, and thus the addition value, a result of adding up the multiplication results, is calculated as the low frequency component mB of the B signal.

Figure 21:
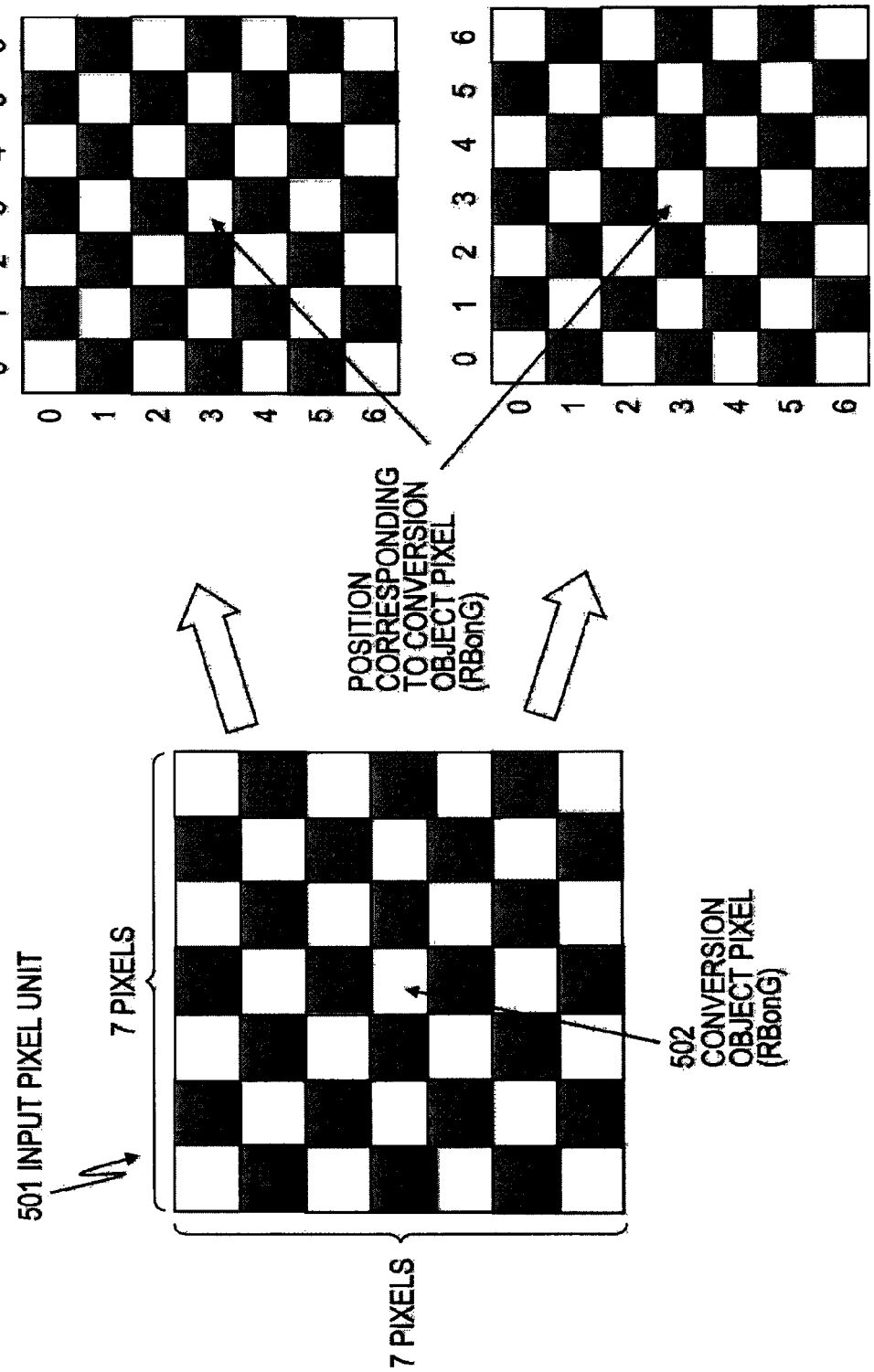
FIG. 21 is a view explaining the process which the first temporary pixel setting unit (RBonWaroundG) 203 as shown in FIG. 6 performs.

Next, the first temporary pixel setting unit (RBonWaroundG) 203, as shown in FIG. 21, estimates the R pixel value and the B pixel value for the W pixel position adjacent to the neighborhood of the conversion object pixel 502 in the center of the input pixel unit 501 of the 7×7 pixels.

As shown in FIG. 21, the number of the W pixel position adjacent to the neighborhood of the conversion object pixel 502 in the center of the input pixel unit 501 of the 7×7 pixels are 4. The R pixel values and the B pixel values for the W pixel positions are estimated. The estimation process, as described above referring to FIG. 18, is performed on the assumption that mW and mR, or a ratio to mW to mB is maintained in the local region in the image.

Based on this action, the R pixel values ($R_{xy}'=R_{23}'$, $R_{32}'$, $R_{43}'$, $R_{34}'$) for the W pixel positions adjacent to the neighborhood of the conversion object pixel 502 in the center of the input pixel unit 501 of the 7×7 pixels shown in FIG. 21 may be estimated as follows. $R_{23}'=(mR/mW)\ W_{23}$, $R_{32}'=(mR/mW)\ w_{32}$, $R_{43}'=(mR/mW)\ w_{43}$, $R_{34}'=(mR/mW)\ w_{34}$.

Furthermore, $w_{23}$, $w_{32}$, $w_{43}$, and $w_{34}$ are the W pixel values for the W pixel positions adjacent to the neighborhood of the conversion object pixel 502 in the center of the input pixel unit 501 of the 7×7 pixels shown in FIG. 21.

Likewise, the B pixel values ($B_{xy}'=B_{23}'$, $B_{32}'$, $B_{43}'$, $B_{34}'$) for the W pixel positions adjacent to the neighborhood of the conversion object pixel 502 in the center of the input pixel unit 501 of the 7×7 pixels shown in FIG. 21 may be estimated as follows. $B_{23}'=(mB/mW)\ w_{23}$, $B_{32}'=(mB/mW)\ w_{32}$, $B_{43}'=(mB/mW)\ w_{43}$, $B_{34}'=(mB/mW)\ w_{34}$. Furthermore, $w_{23}$, $w_{32}$, $w_{43}$, and $w_{34}$ are the W pixel values for the W pixel positions adjacent to the neighborhood of the conversion object pixel 502 in the center of the input pixel unit 501 of the 7×7 pixels shown in FIG. 21.

In this way, the first temporary pixel setting unit (RBonWaroundG) 203 estimates the R pixel value and the B pixel value for the W pixel positions adjacent to the neighborhood of the conversion object pixel 502 in the center of the input pixel unit 501 of the 7×7 pixels, and supplies these to the second pixel interpolation parameter calculation unit (RBonGofHV) 204 and the third pixel interpolation parameter calculation unit (RBonGofAD) 205.

(3-4-3. Process by the Second Pixel Interpolation Parameter Calculation Unit (RBonGofHV) 204)

Next, a process by a second pixel interpolation parameter calculation unit (RBonGofHV) 204 is described. The second pixel interpolation parameter calculation unit (RBonGofHV) 204 calculates the parameter corresponding to the longitudinal or traverse edge, as the parameter which is applied to the process of converting the G pixel to the R pixel or the B pixel.

The edge detection unit 209, as described above, generates the edge information (dirH, dirV, dirA, and dirD), that is, dirH; horizontal gradient information, dirV: vertical gradient information, dirA: gradient information on the right gradient upward direction, and dirD: gradient information on the left gradient upward direction, as the edge information corresponding to each pixel.

The second pixel interpolation parameter calculation unit (RBonGofHV) 204 inputs the edge information corresponding to the G pixel which is defined as the conversion object.

The second pixel interpolation parameter calculation unit (RBonGofHV) 204 compares dirH and dirV of four direction edge information (dirH, dirV, dirA, and dirD) corresponding to the G pixel which is defined as the conversion object, and thus calculates the parameter corresponding to the longitudinal or traverse edge according to the comparison result. The calculated parameter is the interpolation parameter for converting the G pixel to the R pixel, or the B pixel.

The second pixel interpolation parameter calculation unit (RBonGofHV) 204 calculates the high frequency component corresponding to the conversion object pixel 502 in the center position of the input pixel unit 501 of the 7×7 pixels, according to the edge direction of the input pixel unit 501 of the 7×7 pixels. The edge direction information is input from the edge detection unit 209.

dirH (horizontal gradient information) and dirV (vertical gradient information) which are input from the edge detection unit 209 are compared in terms of size, and thus whether the edge direction of the input pixel unit 501 of the 7×7 pixels is the traverse direction or the longitudinal direction and whether the edge direction is a flat region which cannot be specified is judged. For example, the judgment process is performed using a pre-set threshold value. Furthermore, the conversion object pixel 502 in the center position of the input pixel unit 501 of the 7×7 pixels is originally the G pixel.

Figure 22:
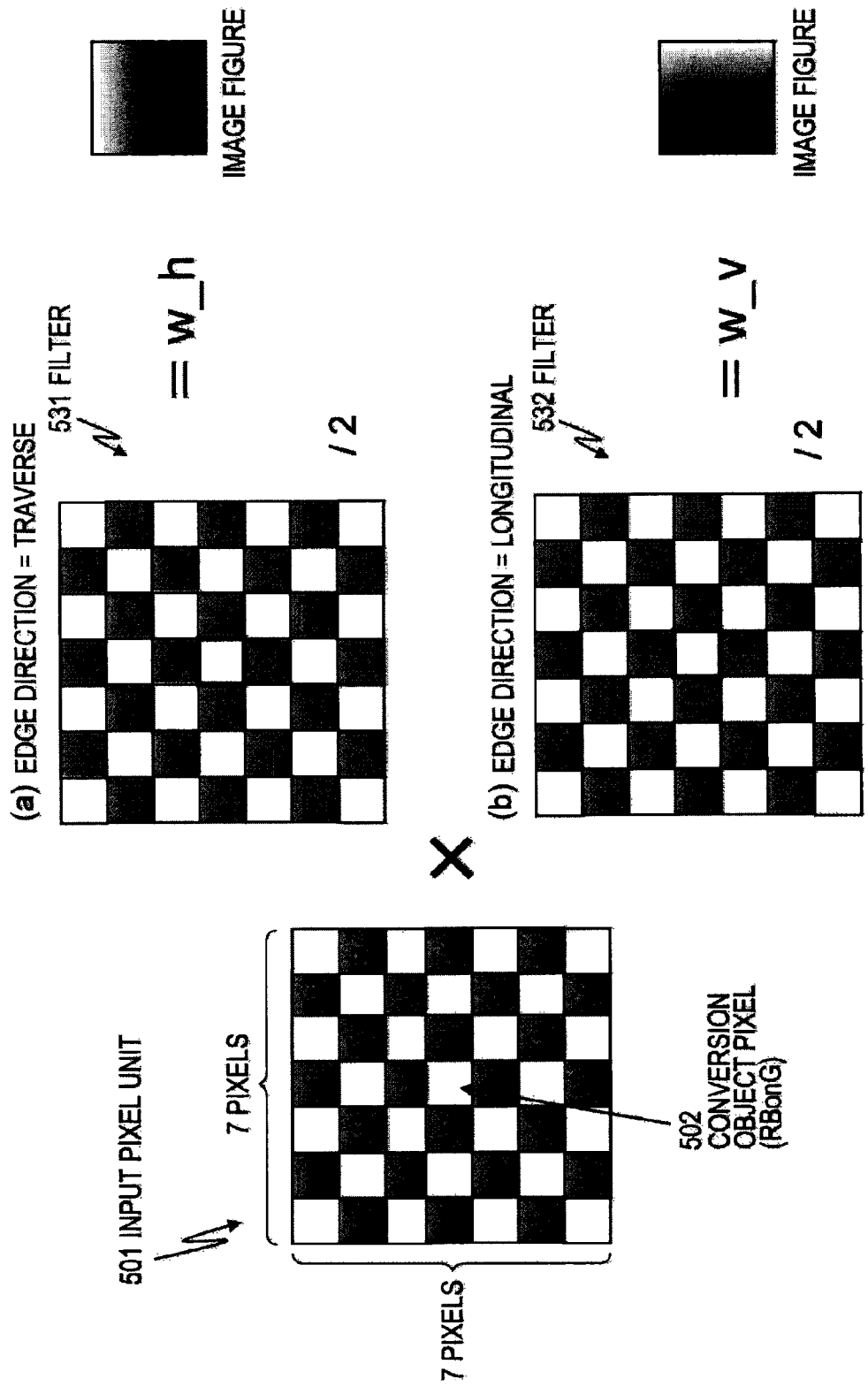
FIG. 22 is a view explaining a process which a second pixel interpolation parameter calculation unit (RBonGofHV) 204 as shown in FIG. 6 performs.
Figure 23:
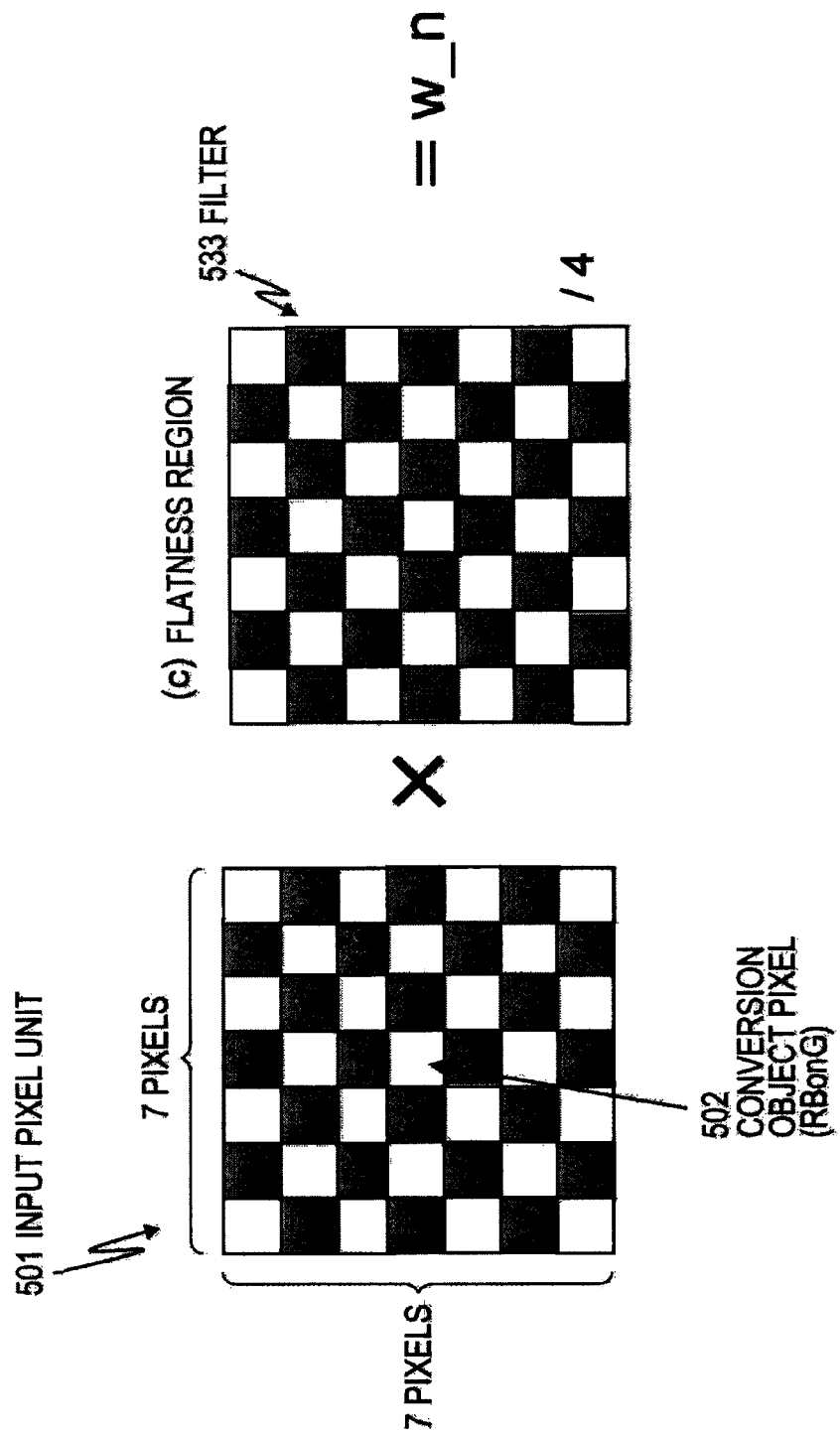
FIG. 23 is a view explaining the process which the second pixel interpolation parameter calculation unit (RBonGofHV) 204 as shown in FIG. 6 performs.

The process of estimating the high frequency component corresponding to the conversion object pixel 502 in the center position of the input pixel unit 501 of the 7×7 pixels is described referring to FIG. 22 and FIG. 23.

In the case where the edge direction of the input pixel unit 501 of the 7×7 pixels is the traverse direction, as shown in FIG. 22(*a*), a filter 531 is applied, and thus an average of the pixel values of two W pixels traversely adjacent to the conversion object pixel 502 in the center position is calculated.

This average value is calculated as the high frequency component (w_h) corresponding to the conversion object pixel 502 in the traverse edge direction.

The filter 531 is a filter of which the filter coefficient is set to the line in parallel with the edge direction (traverse direction). That is, the filter reflects the pixel value which is only in the direction in which a change in the pixel value is estimated to be small.

In the case where the edge direction of the input pixel unit 501 of the 7×7 pixels is the longitudinal direction, as shown in FIG. 22(*b*), a filter 532 is applied, and thus an average of the pixel value of two W pixels longitudinally adjacent to the conversion object pixel 502 in the center position is calculated.

This average value is calculated as the high frequency component (w_v) corresponding to the conversion object pixel 502 in the longitudinal edge direction.

The filter 532 is a filter of which the filter coefficient is set to the line in parallel with the edge direction (longitudinal direction). That is, the filter reflects the pixel value which is only in the direction in which a change in the pixel value is estimated to be small.

Furthermore, on the rightmost side of FIG. 22, image figures are shown illustrating edge examples of the input pixel unit 501 of the 7×7 pixels which is defined as the process object.

Furthermore, the second pixel interpolation parameter calculation unit (RBonGofHV) 204 applies a filter 533 to all of the pixels as shown in FIG. 23(*c*), regardless of the edge direction of the input pixel unit 501 of the 7×7 pixels, and thus calculates an average of the pixel values of four W pixels longitudinally and traversely adjacent to the conversion object pixel 502 in the central position, and calculates the high frequency component (w_n) corresponding to the conversion object pixel 502.

The filter 533 is set as a filter of which the filter coefficient is equally set to all the directions.

Next, the second pixel interpolation parameter calculation unit (RBonGofHV) 204 calculates the parameter corresponding to the longitudinal or traverse edge, as the parameter which is applied to the process of converting the G pixel to the R pixel or the B pixel.

Specifically, the following parameter is calculated as the parameter which is applied to the process of converting the G pixel to the R pixel.

$$RonG(H)=(mR'/mW)(w\_h), RonG(V)=(mR'/mW)(w\_v), RonGn=(mR'/mW)(w\_n).$$

Furthermore, the following parameter is calculated as the parameter which is applied to the process of converting the G pixel to the B pixel.

$$BonG(H)=(mB'/mW)(w\_h), BonG(V)=(mB'/mW)(w\_v), BonGn=(mB'/mW)(w\_n)$$

Furthermore, RonG(H) and BonG(H) are parameters which are calculated for the pixel in which the edge direction is judged to be the traverse direction and thus the high frequency component (w_h) corresponding to the traverse edge is calculated.

Furthermore, RonG(V) and BonG(V) are parameters which are calculated for the pixels of which the edge direction is judged as the longitudinal direction and therefore for which the high frequency component (w_h) corresponding to the longitudinal edge is calculated.

RonGn and BonGn are calculated as parameters corresponding to all of the pixels regardless of the edge direction.

Furthermore, in the above-described parameter calculation formula, mR' is a compensation value mR' of the low frequency component mR of the R signal corresponding to the input pixel unit 501 of the 7×7 pixels, which is calculated using the R pixel values for the W pixel positions adjacent to the neighborhood of the conversion object pixel 502 in the center of the input pixel unit 501, which the first temporary pixel setting unit (RBonWaroundG) 203 described above calculates.

That is, mR' is the low frequency component compensation value mR' of the R signal corresponding to the input pixel unit 501 of the 7×7 pixels, which is calculated by applying the R pixel values ($R_{xy}'=R_{23}', R_{32}', R_{43}', R_{34}'$) for the W pixel positions adjacent to the neighborhood of the conversion object pixel 502 in the center of the input pixel unit 501 of the 7×7 pixels shown in FIG. 21.

Likewise, mB' is a compensation value mB' of the low frequency component mB of the B signal corresponding to the input pixel unit 501 of the 7×7 pixels, which is calculated using the B pixel values for the W pixel positions adjacent to the neighborhood of the conversion object pixel 502 in the center of the input pixel unit 501, which the first temporary pixel setting unit (RBonWaroundG) 203 calculates, as described above.

That is, mB' is the low frequency component compensation value mB' of the B signal corresponding to the input pixel unit 501 of the 7×7 pixels, which is calculated by applying the B pixel values ($B_{xy}'=B_{23}', B_{32}', B_{43}', B_{34}'$) for the W pixel positions adjacent to the neighborhood of the conversion object pixel 502 in the center of the input pixel unit 501 of the 7×7 pixels shown in FIG. 21.

Figure 24:
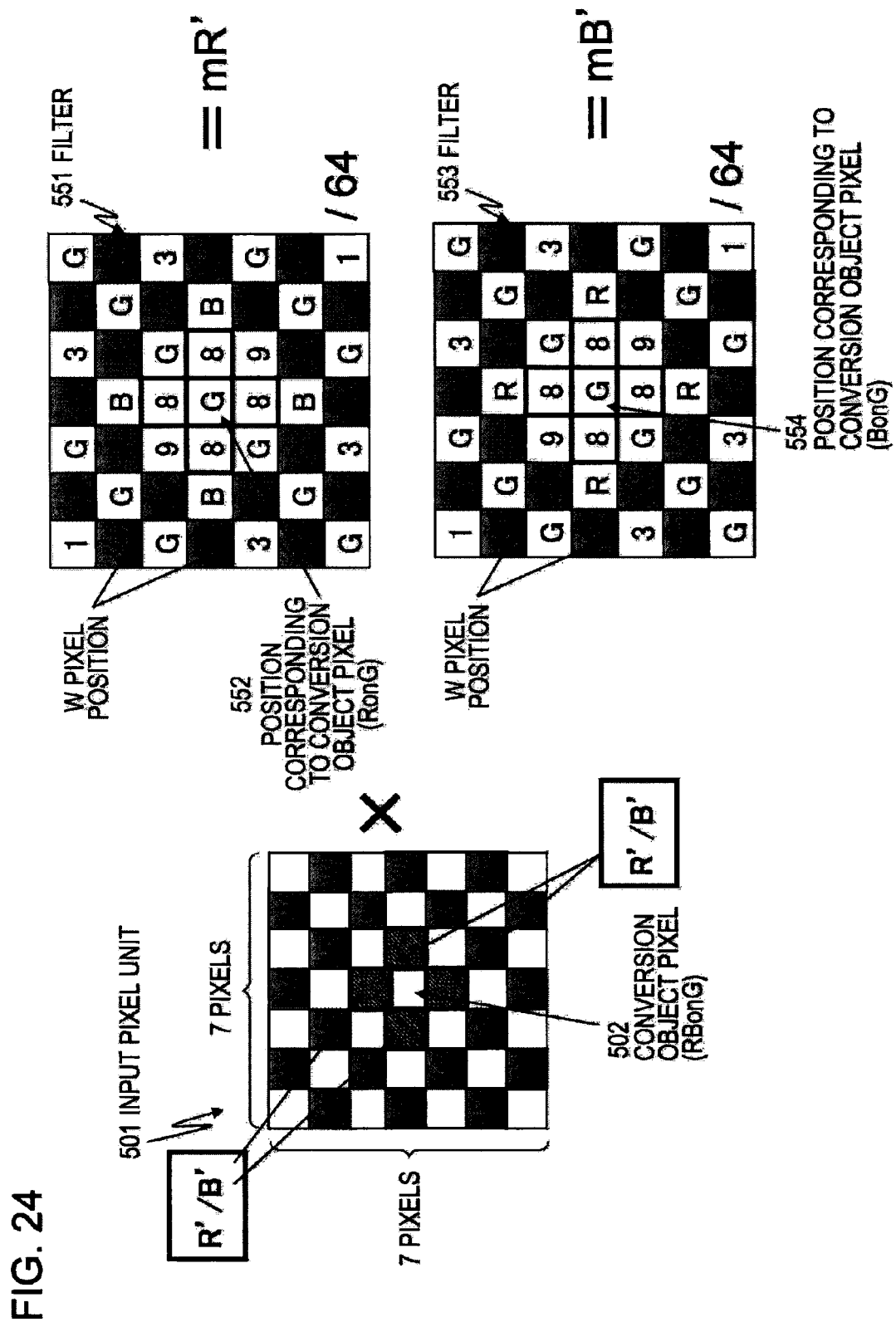
FIG. 24 is a view explaining the process which the second pixel interpolation parameter calculation unit (RBonGofHV) 204 as shown in FIG. 6 performs.

A calculation process example of calculating the low frequency component compensation value mR' of the R signal corresponding to the input pixel unit 501 of the 7×7 pixels and the low frequency component compensation value mB' of the B signal are is described referring to FIG. 24.

A filter 551 obtaining a compensation low frequency component mR' of the R signal shown in the upper section of FIG. 24 is a filter with the 7×7 pixels of which the center is a conversion object pixel correspondence position 552, and the coefficient setting unit is the position corresponding to an original R pixel in an input RGBW arrangement image, and is also the position for which the first temporary pixel setting unit (RBonWaroundG) 203 described above calculates the R pixel values ($R_{xy}'=R_{23}', R_{32}', R_{43}', R_{34}'$).

As described above referring to FIG. 21, the first temporary pixel setting unit (RBonWaroundG) 203 estimates the R pixel values ($R_{xy}'=R_{23}', R_{32}', R_{43}', R_{34}'$) corresponding to the four W pixel positions in the neighborhood (upper, lower, left, and right) of the conversion object pixel correspondence position 502.

The calculation process of calculating the low frequency component compensation value mR' of the R signal corresponding to the input pixel unit 501 of the 7×7 pixels is performed also using the R pixel values ($R_{xy}'=R_{23}', R_{32}', R_{43}', R_{34}'$) which the first temporary pixel setting unit (RBonWaroundG) 203 estimates, in addition to the R pixel originally included in the RGBW arrangement.

At the time of calculating the low frequency component compensation value mR', the process is performed, in which each R pixel value for the original R pixel position in the input pixel unit 501 of the 7×7 pixels, and each of the R pixel values ($R_{xy}'=R_{23}', R_{32}', R_{43}', R_{34}'$) which the first temporary pixel setting unit (RBonWaroundG) 203 estimates are multiplied by the filter coefficient for the pixel position corresponding to the filter 551. The addition value, a result of adding up the multiplication results, is calculated as the compensation low frequency component mR' of the R signal.

Likewise, at the time of calculating the low frequency component compensation value mB', the process is performed, in which each B pixel value for the original B pixel position in the input pixel unit 501 of the 7×7 pixels, and each of the R pixel values ($B_{xy}'=B_{23}', B_{32}', B_{43}', B_{34}'$) which the first temporary pixel setting unit (RBonWaroundG) 203 estimates are multiplied by the filter coefficient for the pixel position corresponding to the filter 553. The addition value, a result of adding up the multiplication results, is calculated as the compensation low frequency component mB' of the B signal.

The parameters which the second pixel interpolation parameter calculation unit (RBonGofHV) 204 calculates, that is, such parameters as RonG (H)=(mR'/mW) (w_h), RonG (V)=(mR'/mW) (w_v), RonGn=(mR'/mW) (w_n), BonG (H)=(mB'/mW) (w_h), BonG (V)=(mB'/mW) (w_v), and BonGn=(mB', mW) (w_n) may be calculated using the following: the low frequency component mW of the W signal calculated by the same process as is described referring to FIG. 19, the high frequency components (w_h), (w_v), and (w_n) corresponding to the conversion object pixel 502 described referring to FIGS. 22 and 23, the compensation low frequency component mR' of the R signal described referring to FIG. 24, and the compensation low frequency component mB' of the B signal.

Furthermore, the low frequency component mW of the W signal described referring to FIG. 19 is the value calculated in the first temporary pixel setting unit (RBonWaroundG) 203, and the second pixel interpolation parameter calculation unit (RBonGofHV) 204 may use this value as it is, and the configuration may be employed in which this value is again recalculated by performing the same process as the process described referring to FIG. 19.

The second pixel interpolation parameter calculation unit (RBonGofHV) 204 outputs the above-described calculated parameter to the blend process unit 211. The blend process unit 211 performs a blend process according to the edge state, and thus determines the R pixel value when converting the G pixel position which is the conversion object pixel 502 in the center position of the input pixel unit 501 of the 7×7 pixels. The process by the blend process unit 211 is described below.

(3-4-4. Process by a Third Pixel Interpolation Parameter Calculation Unit (RBonGofAD) 205)

Next, a third pixel interpolation parameter calculation unit (RBonGofAD) 205 is described. The third pixel interpolation parameter calculation unit (RBonGofAD) 205 calculates, for example, the parameter corresponding to the gradient edge, as the parameter which is applied to the process of converting the G pixel to the R pixel or the B pixel.

The edge detection unit 209, as described above, generates the edge information (dirH, dirV, dirA, and dirD), that is, dirH; horizontal gradient information, dirV: vertical gradient information, dirA: gradient information on the right gradient upward direction, and dirD: gradient information on the left gradient upward direction, as the edge information corresponding to each pixel. The third pixel interpolation parameter calculation unit (RBonGofAD) 205 inputs this edge information corresponding to the G pixel which is defined as the conversion object.

The third pixel interpolation parameter calculation unit (RBonGofAD) 205 compares four direction edge information (dirH, dirV, dirA, and dirD) corresponding to the G pixel which is defined as the conversion object, and thus generates the parameter corresponding to the gradient edge by performing the processes which are different according to the comparison result. The calculated parameter is the interpolation parameter for converting the G pixel to the R pixel, or the B pixel.

The third pixel interpolation parameter calculation unit (RBonGofAD) 205 first estimates the high frequency component corresponding to the conversion object pixel 502 in the center position of the input pixel unit 501 of the 7×7 pixels, according to the edge direction of the input pixel unit 501 of the 7×7 pixels. The edge direction information is input from the edge detection unit 209.

dirA (gradient information on the right gradient upward direction) which is input from the edge detection unit 209 and dirD (gradient information on the left gradient upward direction) are compared in terms of size, and thus whether the edge direction of the input pixel unit 501 of the 7×7 pixels is the right gradient upward direction or the left gradient upward direction is judged. For example, the judgment process is performed using a pre-set threshold value. Furthermore, the conversion object pixel 502 in the center position of the input pixel unit 501 of the 7×7 pixels is originally the G pixel.

The process is different depending on the edge direction of the input pixel unit 501 of the 7×7 pixels is the right gradient upward direction or the left gradient upward direction.

First, the process performed in the case where the edge direction of the input pixel unit 501 of the 7×7 pixels is the right gradient upward direction is described.

In the case where the edge direction of the input pixel unit 501 of the 7×7 pixels is the right gradient upward direction, the third pixel interpolation parameter calculation unit (RBonGofAD) 205 estimates the high frequency component corresponding to the conversion object pixel 502 in the center position of the input pixel unit 501 of the 7×7 pixels. This process is described referring to FIG. 25.

Figure 25:
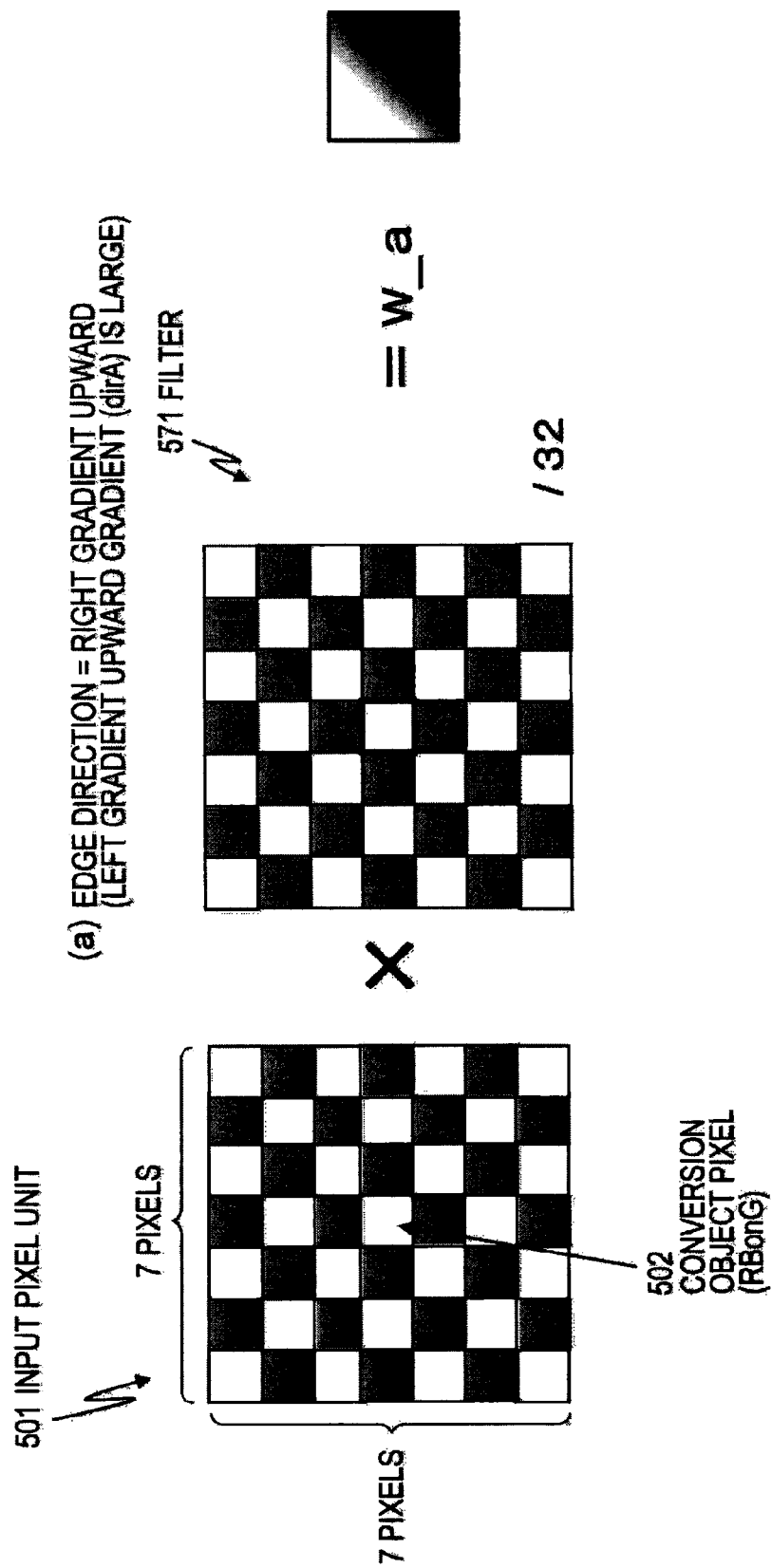
FIG. 25 is a view explaining a process which a third pixel interpolation parameter calculation unit (RBonGofAD) 205 as shown in FIG. 6 performs.

In the case where the edge direction of the input pixel unit 501 of the 7×7 pixels, as shown in FIG. 25, a filter 571 is applied, and the pixel values of the 12 W pixels, from the right gradient upward direction to the right gradient upward direction of the conversion object pixel 502 in the center position are applied, and thus calculates the high frequency component (W_a) corresponding to the conversion object pixel 502. The filter 571 is a filter of which the filter coefficient is set to the line in parallel with the edge direction (right gradient upward) and thus the coefficient value for the center part being high. That is, the filter 571 is a filter which reflects only the pixel value which is in the direction in which a change in the pixel value is estimated to be small.

The third pixel interpolation parameter calculation unit (RBonGofAD) 205, for example, the high frequency component (W_a) calculated by applying the filter 571 shown in FIG. 25 is used, and thus the following parameter is calculated as the parameter which is applied to the process of converting the G pixel to the R pixel.

$RonG(A)=(mR'/mW)(w\_a)$

Furthermore, the following parameter is calculated as the parameter which is applied to the process of converting the G pixel to the B pixel.

$BonG(A)=(mB'/mW)(w\_a)$

This parameter is calculated as the parameter corresponding to the conversion object pixel for which the edge direction of the input pixel unit 501 of the 7×7 pixels of which the central pixel is set to the conversion object pixel is judged as the right gradient upward direction, and is output to the blend process unit 211.

Furthermore, in the parameter calculation formula described above, mW is the low frequency component mW of the W signal, calculated by the same process as one described referring to FIG. 19, w_a is the high frequency component (w_a) corresponding to the conversion object pixel 502 described referring to FIG. 25, and mR' and mB' are the compensation low frequency component mR' of the R signal and the compensation low frequency component mB' of the B signal, described referring to FIG. 24.

These values may be values which are calculated in the first temporary pixel setting unit (RBonWaroundG) 203, or may be calculated in the second pixel interpolation parameter calculation unit (RBonGofHV) 204, and may be values which are anew calculated in the third pixel interpolation parameter calculation unit (RBonGofAD) 205.

Figure 26:
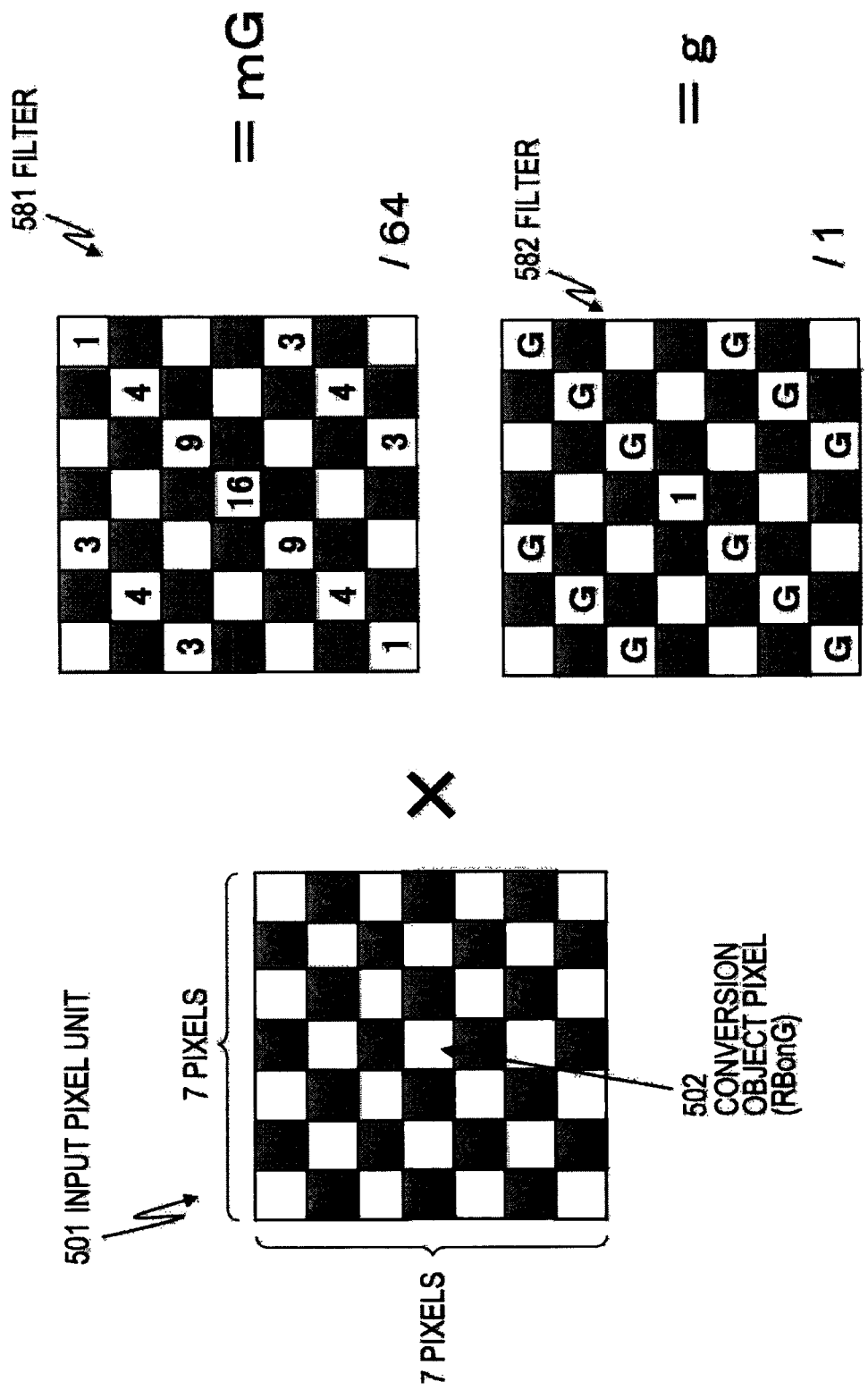
FIG. 26 is a view explaining the process which the third pixel interpolation parameter calculation unit (RBonGofAD) 205 as shown in FIG. 6 performs.

Next, the parameter calculation process which the third pixel interpolation parameter calculation unit (RBonGofAD) 205 performs, in the case where the edge direction of the input pixel unit 501 of the 7×7 pixels is the left gradient upward direction is described referring to FIG. 26.

In the case where the edge direction of the input pixel unit 501 of the 7×7 pixels is the left gradient upward direction, the third pixel interpolation parameter calculation unit (RBonGofAD) 205, as shown in FIG. 26, calculates the low frequency component mG and the high frequency component g of the G signal corresponding to the conversion object pixel 502 in the center position of the input pixel unit 501 of the 7×7 pixels.

For example, a filter 581 shown in FIG. 26 is applied to the calculation of the low frequency component mG of the G signal. The filter 581 is a filter of which the filter coefficient is set to the G signal pixel part of the 7×7 pixels and the coefficient for the center part being set to high.

For example, a filter 582 shown in FIG. 26 is applied to the calculation of the high frequency component g of the G signal. The filter 582 is a filter of which the filter coefficient is set for obtaining the pixel value of the conversion object pixel 502.

The third pixel interpolation parameter calculation unit (RBonGofAD) 205 uses, for example, the low frequency component mG and the high frequency component g of the G signal calculated by applying the filters 581 and 582 shown in FIG. 26, and thus calculates the following parameter as the parameter which is applied to the process of converting the G pixel to the R pixel.

$RonG(D)=(mR'/mG)g$

Furthermore, the following parameter is calculated as the parameter which is applied to the process of converting the G pixel to the B pixel.

$BonG(D)=(mB'/mG)g$

This parameter is calculated as the parameter corresponding to the conversion object pixel for which the edge direction of the input pixel unit 501 of the 7×7 pixels of which the central pixel is set to the conversion object pixel is judged as the left gradient upward direction, and is output to the blend process unit 211.

Furthermore, in the above-described parameter calculation formula, mG is the low frequency component mG of the G signal described referring to FIG. 26, g is the high frequency component g of the G signal described referring to FIG. 26, and mR' and mB' are the compensation low frequency component mR' of the R signal and the compensation low frequency component mB' of the B signal, described referring to FIG. 24.

In this way, the third pixel interpolation parameter calculation unit (RBonGofAD) 205 calculates the parameters which are applied to the process of converting the G pixel on the gradient to the R pixel, or the B pixel, that is, RonG(A)=(mR'/mW) (w_a), RonG(D)=(mR'/mG) g, BonG(A)=(mB'/mW)(w_a), and BonG(D)=(mB'/mG) g, and outputs these parameters to the blend process unit 211.

Furthermore, in the present embodiment, the above-described formula, RonG(D)=(mR'/mG) g is applied when performing the estimation process of estimating the R pixel value for the G pixel position in the case where the edge direction of the input pixel unit 501 of the 7×7 pixels is the left gradient upward direction, and the formula, BonG(D)=(mB'/mG) g is applied when performing the estimation process of estimating the B pixel for the G pixel position. This is to estimate the RonG (D) and the RonG (D) from a correlation between the G pixel and the R pixel. For this reason, it is because phases of the G pixel and the R pixel are equal in the left gradient upward direction, and thus an effect of preventing an occurrence of the false color is great.

(3-4-5. Process by a Second Temporary Pixel Setting Unit (RBonWaroundRB) 206)

A process by a second temporary pixel setting unit (RBonWaroundRB) 206 is described. As is apparent from the block diagram shown in FIG. 6, the second temporary pixel setting unit (RBonWaroundRB) 206 is provided in front of the fourth pixel interpolation parameter calculation unit (RBonRBofHV) 207, and the fifth pixel interpolation parameter calculation unit (RBonRBofAD) 208.

Any of the fourth interpolation parameter calculation unit (RBonRBofHV) 207 and the fifth pixel interpolation parameter calculation unit (RBonRBofAD) 208 calculates the parameter for converting (compensating) the R or B pixel to the same R pixel or the B pixel. The second temporary pixel setting unit (RBonWaroundRB) 206 performs a process of converting the W pixel position adjacent to RB pixels to a temporary R pixel (R') or B pixel (B') before performing these processes.

The second temporary pixel setting unit (RBonWaroundRB) 206 first obtains the low frequency component mW of the W signal in the 7×7 pixel region as the process unit, a low frequency component mR of an R signal, and a low frequency component mB of the B signal.

The calculation process of processing the low frequency component mW of the W signal first performs the same process as the process by the first temporary pixel setting unit (RBonWaroundG) 203 described referring to FIG. 19.

Figure 27:
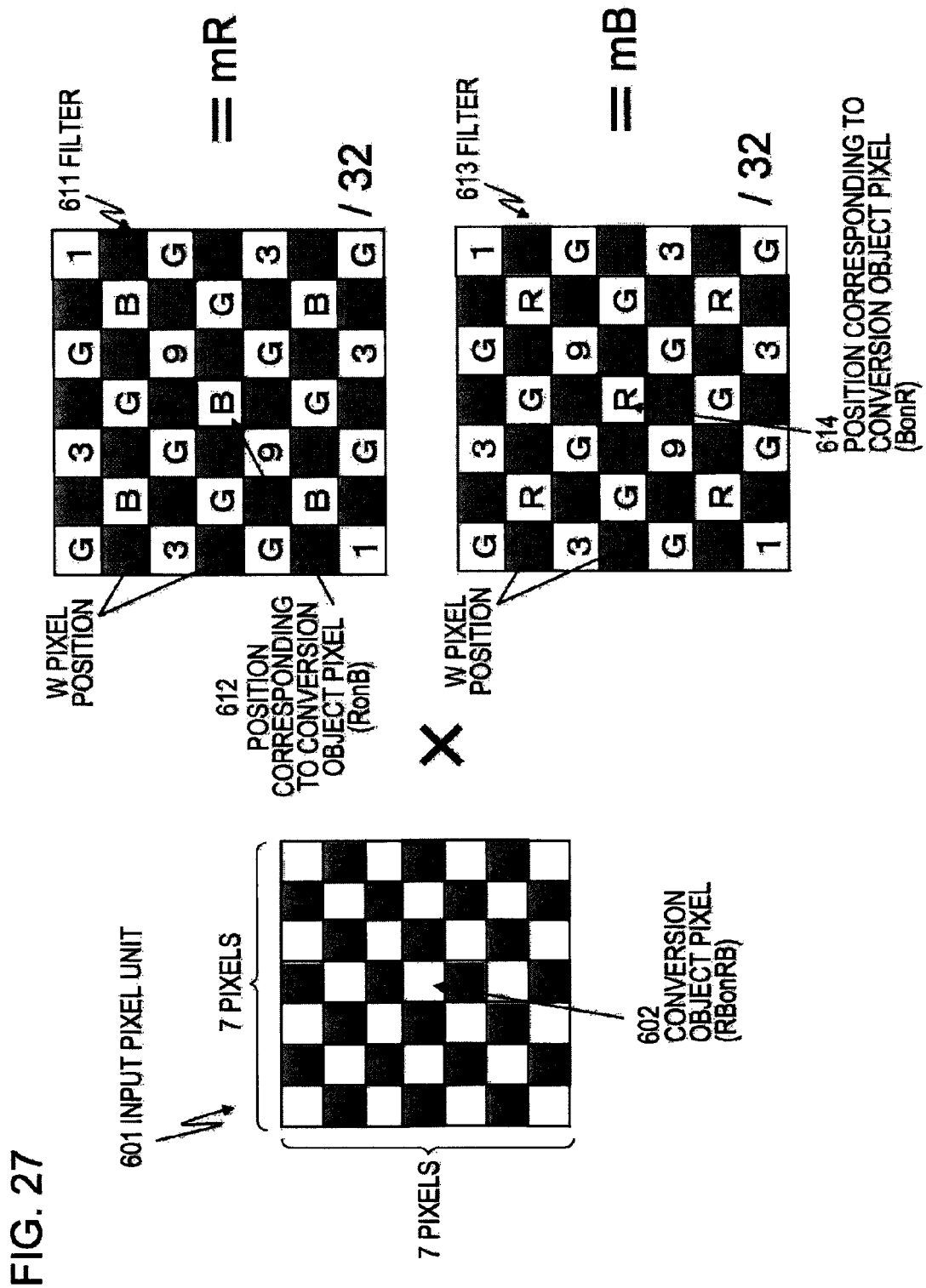
FIG. 27 is a view explaining a process which a second temporary pixel setting unit (RBonWaroundRB) 206 as shown in FIG. 6 performs.

Furthermore, as shown in FIG. 27, the filters 611 and 613 are applied to an input pixel unit 601 of the 7×7 pixels, and thus the low frequency component mR of the R signal and the low frequency component mB of the B signal corresponding to a conversion object pixel 602 in the center of the input pixel unit 601 of the 7×7 pixels.

A filter 611 obtaining the low frequency component mR of the R signal shown in the upper section of FIG. 27 is a filter with the 7×7 pixels of which the center is a conversion object pixel correspondence position 612, and a coefficient setting unit is the position corresponding to the R pixel. The coefficient in the range of (1/32 to 9/32) is set to the position corresponding to the R pixel in the filter 611. Each pixel value for the R pixel position of the input pixel unit 601 of the 7×7 pixels is multiplied by the filter coefficient for the pixel position corresponding to the filter 611, and thus the addition value, a result of adding up the multiplication results, is calculated as the low frequency component mR of the R signal.

A filter 613 obtaining the low frequency component mB of the B signal shown in the lower section of FIG. 27 is a filter with the 7×7 pixels of which the center is a conversion object pixel correspondence position 614, and the coefficient setting unit is the position corresponding to the B pixel. The coefficient in the range of (1/32 to 9/32) is set as the position corresponding to the B pixel in the filter 613. Each pixel value for the B pixel position of the input pixel unit 601 of the 7×7 pixels is multiplied by the filter coefficient for the pixel position corresponding to the filter 613, and thus the addition value, a result of adding up the multiplication results, is calculated as the low frequency component mB of the B signal.

Next, the second temporary pixel setting unit (RBonWaroundRB) 206 estimates the R pixel value and the B pixel value for the W pixel position adjacent to the neighborhood of the conversion object pixel 602 in the center of the input pixel unit 601 of the 7×7 pixels.

This process is the same as the process by the first temporary pixel setting unit (RBonWaroundG) 203 described above referring to FIG. 21, and a description of this process is omitted.

The second temporary pixel setting unit (RBonWaroundRB) 206 estimates the R pixel values ($R_{xy}'=R_{23}'$, $R_{32}'$, $R_{43}'$, $R_{34}'$) and the B pixel values ($B_{xy}'=B_{23}'$, $B_{32}'$, $B_{43}'$, $B_{34}'$) for the W pixel position adjacent to the neighborhood of the conversion object pixel 602 in the center of the input pixel unit 601 of the 7×7 pixels shown in FIG. 26, as follows. $R_{23}'=(mR/mW)\ w_{23}$, $R_{32}'=(mR/mW)\ w_{32}$, $R_{43}'=(mR/mW)\ w_{43}$, $R_{34}'=(mR/mW)\ w_{34}$, $B_{23}'=(mB/mW)\ w_{23}$, $B_{32}'=(mB/mW)\ w_{32}$, $B_{43}'=(mB/mW)\ w_{43}$, $B_{34}'=(mB/mW)\ w_{34}$.

Furthermore, $w_{23}$, $w_{32}$, $w_{43}$, and $w_{34}$ are the W pixel values for the W pixel positions adjacent to the neighborhood of the conversion object pixel 602 in the center of the input pixel unit 601 of the 7×7 pixels shown in figure.

In this way, the second temporary pixel setting unit (RBonWaroundRB) 206 estimates the R pixel value and the B pixel value for the W pixel position adjacent to the neighborhood of the conversion object pixel 602 in the center of the input pixel unit 601 of the 7×7 pixels, and supplies these to the fourth interpolation parameter calculation unit (RBonRBofHV) 207 and the fifth pixel interpolation parameter calculation unit (RBonRBofAD) 208.

(3-4-6. Process by the Fourth Pixel Interpolation Parameter Calculation Unit (RBonRBofHV) 207)

Next, a process by a fourth pixel interpolation parameter calculation unit (RBonRBofHV) 207 is described. The fourth pixel interpolation parameter calculation unit (RBonRBofHV) 207 calculates, for example, the parameter corresponding to the longitudinal or traverse edge, as the parameter which is applied to the process of converting the R pixel to the B pixel, or the B pixel to the R pixel.

As described above, the edge detection unit 209 generates the edge information (dirH, dirV, dirA, and dirD), dirH: horizontal gradient information, dirV: vertical gradient information, dirA: gradient information on the right gradient upward direction, and dirD: gradient information on the left gradient upward direction to the edge information corresponding to each pixel, as the edge information corresponding to each pixel. The fourth pixel interpolation parameter calculation unit (RBonRBofHV) 207 inputs these edge information corresponding to the R or B pixel which is defined as the conversion object.

The fourth pixel interpolation parameter calculation unit (RBonRBofHV) 207 compares dirH and dirV of the four direction edge information (dirH, dirV, dirA, and dirD) corresponding to the R/B pixel which is defined as the conversion object, and thus calculates, for example, the parameter corresponding to the longitudinal or traverse edge according to the comparison result. The calculated parameter is a parameter which is applied to the process of converting the R pixel to B pixel, or the B pixel to the R pixel.

The fourth pixel interpolation parameter calculation unit (RBonRBofHV) 207 first calculates the high frequency component corresponding to the conversion object pixel 602 in the center position of the input pixel unit 601 of the 7×7 pixels, according to the edge direction of the input pixel unit 601 of the 7×7 pixels. The edge direction information is input from the edge detection unit 209.

dirH (horizontal gradient information) and dirV (vertical gradient information) which are input from the edge detection unit 209 are compared in terms of size, and thus whether the edge direction of the input pixel unit 601 of the 7×7 pixels is the traverse direction or the longitudinal direction, and whether the edge direction is the flatness region which cannot be specified are judged. For example, the judgment process is performed using a pre-set threshold value. Furthermore, the conversion object pixel 602 in the center position of the input pixel unit 601 of the 7×7 pixels is the original R or B pixel.

The process of estimating the high frequency component corresponding to the conversion object pixel 602 in the center position of the input pixel unit 601 of the 7×7 pixels is the same process as described above as the process by the second pixel interpolation parameter calculation unit (RBonGofHV) 204, referring to FIGS. 22 and 23, and thus the description of that process is omitted.

The high frequency component data which the fourth pixel interpolation parameter calculation unit (RBonRBofHV) 207 calculates is as follows.

In the case where the edge direction of the input pixel unit 601 of the 7×7 pixels is the traverse direction, for example, the filter 531 shown in FIG. 22(*a*) is applied, and thus the high frequency component (w_h) corresponding to the conversion object pixel 602 which is in the traverse direction is calculated.

In the case where the edge direction of the input pixel unit 601 of the 7×7 pixels is the longitudinal direction, for example, the filter 532 shown in FIG. 22(*b*) is applied, and thus the high frequency component (w_v) corresponding to the conversion object pixel 602 is in the edge direction of the longitudinal direction is calculated.

Furthermore, for all of the pixels which have no relationship with the edge direction, for example, the filter 533 shown in FIG. 23(*c*) is applied, and thus the high frequency component (w_n) corresponding to the conversion object pixel 602 is calculated.

Next, the fourth pixel interpolation parameter calculation unit (RBonRBofHV) 207 calculates the parameter which is applied to the process of converting the R pixel to the B pixel, or the B pixel to the R pixel.

Specifically, the following parameter is calculated as the parameter which is applied to the process of converting the B pixel to the R pixel.

$$RonB(H)=(mR'/mW)(w\_h), RonB(V)=(mR'/mW)(w\_v), RonBn=(mR'/mW)(w\_n).$$

Furthermore, the following parameter is calculated as the parameter which is applied to the process of converting the R pixel to the B pixel. $BonR(H)=(mB'/mW)(w\_h)$, $BonR(V)=(mB'/mW)(w\_v)$, $BonRn=(mB'/mW)(w\_n)$.

Furthermore, RonB(H) and BonR(H) are parameters which are calculated for the pixels of which the edge direction is judged as the traverse direction and thus the high frequency component (w_h) corresponding to the traverse edge is calculated.

Furthermore, RonB(V) and BonR(V) are parameters which are calculated for the pixels of which the edge direction is judged as the longitudinal direction and thus the high frequency component (w_h) corresponding to the longitudinal edge is calculated.

RonBn and BonRn are calculated as the parameters for all of the pixels which have no relationship with the edge direction.

Furthermore, in the above-described parameter calculation formula, mR' is the compensation value mR' for the low frequency component mR of the R signal corresponding to the input pixel unit 601 of the 7×7 pixels, which is calculated using the R pixel value for the W pixel position adjacent to the neighborhood of the conversion object pixel 602 in the center of the input pixel unit 601, which the second temporary pixel setting unit (RBonWaroundRB) 206 described above calculates.

Likewise, mB' is the compensation value mB' of the low frequency component mB of the B signal corresponding to the input pixel unit 501 of the 7×7 pixels which is calculated using the B pixel value for the W pixel position adjacent to the neighborhood of the conversion object pixel 502 in the center of the input pixel unit 501, which the second temporary pixel setting unit (RBonWaroundRB) 206 described above calculates.

Figure 28:
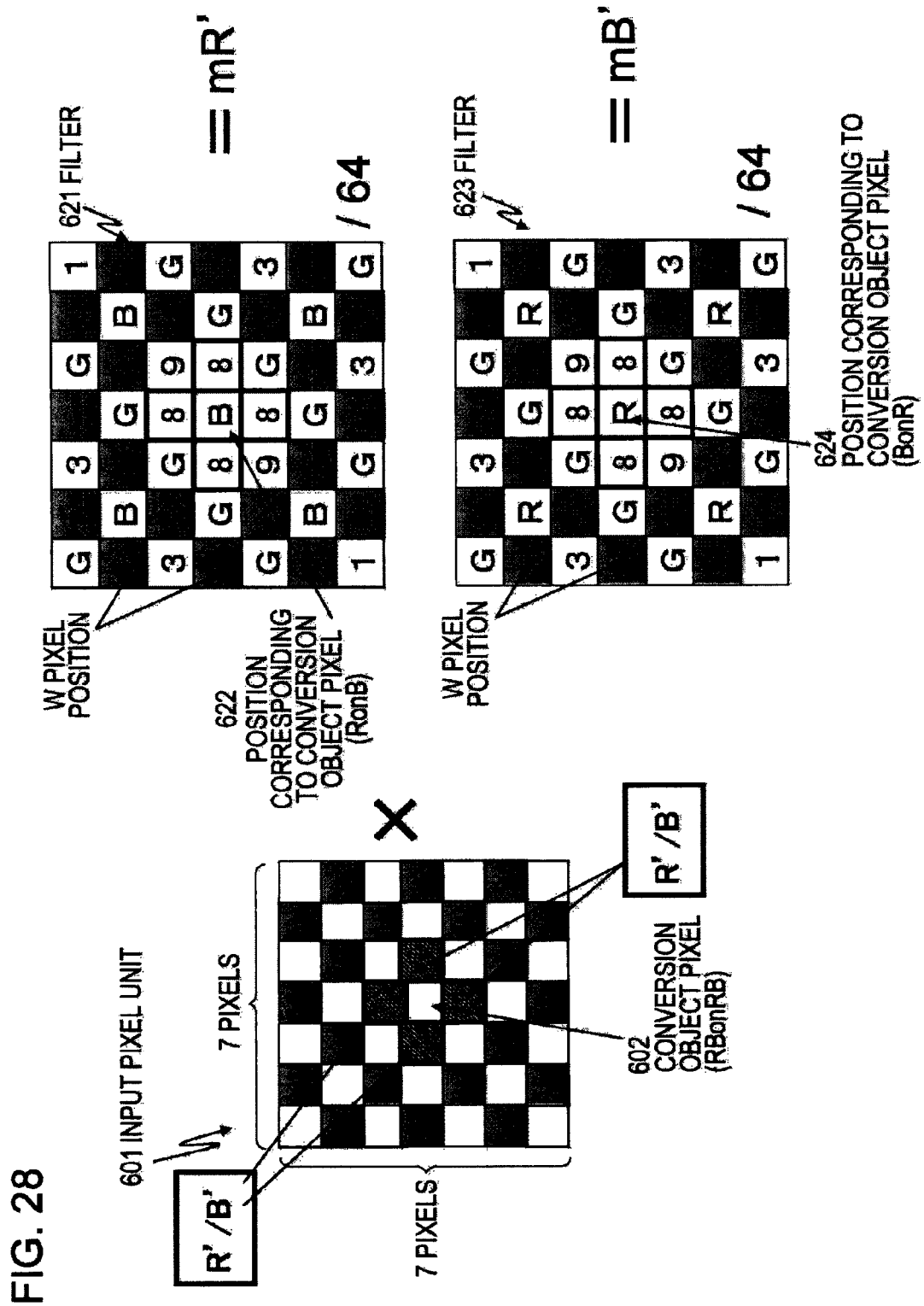
FIG. 28 is a view explaining a process which a fourth pixel interpolation parameter calculation unit (RBonRBofHV) 207 as shown in FIG. 6 performs.

A calculation process example, in which the low frequency component compensation value mR' of the R signal and the low frequency component compensation value mB' of the B signal, which correspond to the input pixel unit 601 of the 7×7 pixels are calculated, is described referring to FIG. 28.

A filter 621 obtaining the compensation low frequency component mR' of the R signal shown in the upper section of FIG. 28 is a filter with the 7×7 pixels of which the center is a conversion object pixel correspondence position 622, and the coefficient setting unit is the position corresponding to the original R pixel in the input RGBW arrangement image, and is also the position for which the second temporary pixel setting unit (RBonWaroundRB) 206 described above calculates the R pixel values ($R_{xy}'=R_{23}'$, $R_{32}'$, $R_{43}'$, $R_{34}'$).

The second temporary pixel setting unit (RBonWaroundRB) 206 estimates the R pixel values ($R_{xy}'=R_{23}'$, $R_{32}'$, $R_{43}'$, $R_{34}'$) corresponding to the four W pixel positions in the neighborhood (upper, lower, left, and right) of the conversion object pixel correspondence position 602.

The calculation process of calculating the low frequency component compensation value mR' of the R signal corresponding to the input pixel unit 601 of the 7×7 pixels, is performed also using the R pixel values ($R_{xy}'=R_{23}'$, $R_{32}'$, $R_{43}'$, $R_{34}'$) which the second temporary pixel setting unit (RBonWaroundRB) 206 estimates, in addition to the R pixel originally included in the RGBW arrangement.

At the time of calculating the low frequency component compensation value mR', the process is performed, in which each R pixel value for the original R pixel position in the input pixel unit 601 of the 7×7 pixels, and each of the R pixel values ($R_{xy}'=R_{23}'$, $R_{32}'$, $R_{43}'$, $R_{34}'$) which the second temporary pixel setting unit (RBonWaroundRB) 206 estimates are multiplied by the filter coefficient for the pixel position corresponding to the filter 621. The addition value, a result of adding up the multiplication results, is calculated as the compensation low frequency component mR' of the R signal.

Likewise, at the time of calculating the low frequency component compensation value mB', the process is performed, in which each B pixel value for the original B pixel position in the input pixel unit 601 of the 7×7 pixels, and each of the R pixel values ($B_{xy}'=B_{23}'$, $B_{32}'$, $B_{43}'$, $B_{34}'$) which the second temporary pixel setting unit (RBonWaroundRB) 206 estimates are multiplied by the filter coefficient for the pixel position corresponding to the filter 623. The addition value, a result of adding up the multiplication results, is calculated as the compensation low frequency component mB' of the B signal.

The parameters which the fourth pixel interpolation parameter calculation unit (RBonRBofHV) 207 calculates, that is, such parameters as RonB (H)=(mR'/mW) (w_h), RonB (V)=(mR'/mW) (w_v), RonBn=(mR'/mW) (w_n), BonR (H)=(mB'/mW) (w_h), BonR (V)=(mB'/mW) (w_v), and BonRn=(mB'/mW) (w_n) may be calculated using the following: the low frequency component mW of the W signal calculated by the same process as is described referring to FIG. 19, the high frequency components (w_h), (w_v), and (w_n) calculated by the same process as is described referring to FIGS. 22 and 23, the compensation low frequency component mR' of the R signal described referring to FIG. 28, and the compensation low frequency component mB' of the B signal.

Furthermore, for example, for the low frequency component mW of the W signal, in a case where the value of which the calculation is finished in other process units can be applied, that calculation-finished value may be used.

The fourth pixel interpolation parameter calculation unit (RBonRBofHV) 207 outputs the calculated parameter described above to the blend process unit 211. The blend process unit 211 performs the blend process according to the edge state, and thus determines the conversion pixel value for the R or B pixel which is the conversion object pixel 602 in the center position of the input pixel unit 601 of the 7×7 pixels. The process by the blend process unit 211 is described below.

(3-4-7. Process by a Fifth Pixel Interpolation Parameter Calculation Unit (RBonRBofAD) 208)

Next, a process by a fifth pixel interpolation parameter calculation unit (RBonRBofAD) 208 is described. The fifth pixel interpolation parameter calculation unit (RBonRBofAD) 208 calculates, for example, the parameter corresponding to the gradient edge, as the parameter which is applied to the process of converting the R pixel to the B pixel, or the B pixel to the R pixel.

As described above, the edge detection unit 209 generates the edge information (dirH, dirV, dirA, and dirD), dirH: horizontal gradient information, dirV: vertical gradient information, dirA: gradient information on the right gradient upward direction, and dirD: gradient information on the left gradient upward direction to the edge information corresponding to each pixel, as the edge information corresponding to each pixel. The fifth pixel interpolation parameter calculation unit (RBonRBofAD) 208 inputs these edge information corresponding to the G pixel which is defined as the conversion object.

The fifth pixel interpolation parameter calculation unit (RBonRBofAD) 208 compares dirA and dirD of the four direction edge information (dirH, dirV, dirA, and dirD) corresponding to the G pixel which is defined as the conversion object, and thus calculates the parameter corresponding to the gradient edge by performing the different process according to the comparison result. The calculated parameter is an interpolation parameter for converting the R pixel to B pixel, or the B pixel to the R pixel.

The fifth pixel interpolation parameter calculation unit (RBonRBofAD) 208 first estimates, for example, the high frequency component corresponding to the conversion object pixel 602 in the center position of the input pixel unit 601 of the 7×7 pixels, according to the edge direction of the input pixel unit 601 of the 7×7 pixels shown in FIG. 27 and FIG. 28. The edge direction information is input from the edge detection unit 209.

dirA (right gradient upward direction gradient information) and dirD (left gradient upward direction gradient information) which are input from the edge detection unit 209 are compared in terms of size, and thus whether the edge direction of the input pixel unit 601 of the 7×7 pixels is the right gradient upward direction or the left gradient upward direction is judged. For example, the judgment process is performed using a pre-set threshold value. Furthermore, the conversion object pixel 602 in the center position of the input pixel unit 601 of the 7×7 pixels is the R pixel or the B pixel.

The process is different depending on whether the edge direction of the input pixel unit 601 of the 7×7 pixels is the right gradient upward direction or the left gradient upward direction.

First, the process in the case where the edge direction of the input pixel unit 601 of the 7×7 pixels is the right gradient upward direction is described.

In this case, the fifth pixel interpolation parameter calculation unit (RBonRBofAD) 208 calculates the high frequency component (w_a) corresponding to the conversion object pixel in the center position of the input pixel unit of the 7×7 pixels using the same process as is above described as the process by the third pixel interpolation parameter calculation unit (RBonGofAD) 205, referring to FIG. 25.

The fifth pixel interpolation parameter calculation unit (RBonRBofAD) 208, for example, uses the high frequency component (w_a) calculated by applying the filter 571 shown in FIG. 25, and thus calculates the following parameter as the parameter which is applied to the process of converting the B pixel to the R pixel.

$$RonB(A)=(mR'/mW)(w\_a)$$

Furthermore, the following parameter is calculated as the parameter which is applied to the process of converting the R pixel to the B pixel.

$$BonR(A)=(mB'/mW)(w\_a)$$

This parameter is calculated as the parameter corresponding to the conversion object pixel for which the edge direction of the input pixel unit 601 of the 7×7 pixels of which the central pixel is set to the conversion object pixel is judged as the left gradient upward direction, and is output to the blend process unit 211.

Furthermore, in the above-described parameter calculation formula, mW is the low frequency component mW of the W signal, calculated by performing the same process as described referring to FIG. 19, w_a is the high frequency component (w_a) corresponding to the conversion object pixel 502 described referring to FIG. 25, and mR' and mB' are the compensation low frequency component mR' of the R signal and the compensation low frequency component mB' of the B signal which are described referring to FIG. 28.

For these values, the values of which the calculation is finished in other process units may be applied and new values may be calculated in the fifth pixel interpolation parameter calculation unit (RBonRBofAD) 208.

Figure 29:
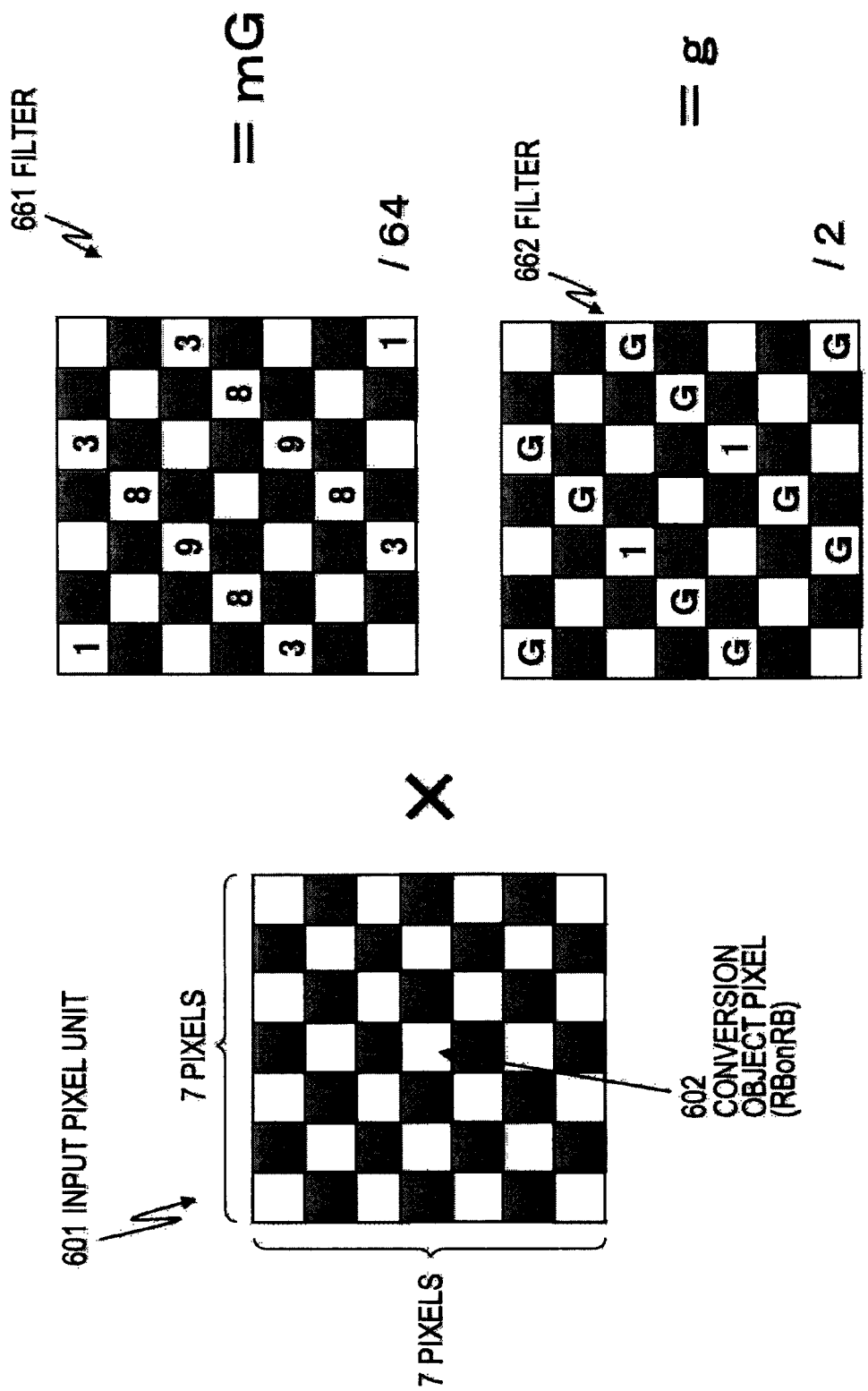
FIG. 29 is a view explaining a process which a fifth pixel interpolation parameter calculation unit (RBonRBofAD) 208 as shown in FIG. 6 performs.

Next, The parameter calculation process which the fifth pixel interpolation parameter calculation unit (RBonRBofAD) 208 performs in the case where the edge direction of the input pixel unit 601 of the 7×7 pixels is the left gradient upward direction is described referring to FIG. 29.

In the case where the edge direction of the input pixel unit 601 of the 7×7 pixels is the left gradient upward direction, the fifth pixel interpolation parameter calculation unit (RBonRBofAD) 208, as shown in FIG. 29, calculates the low frequency component mG and the high frequency component g of the G signal corresponding to the conversion object pixel 602 in the center position of the input pixel unit 601 of the 7×7 pixels.

For example, a filter 661 shown in FIG. 29 is applied to the calculation of the low frequency component mG of the G signal. The filter 661 is a filter of which the filter coefficient is set to the G signal pixel part of the 7×7 pixels and the coefficient for the center part being set to high.

For example, a filter 662 shown in FIG. 29 is applied to the calculation of the high frequency component g of the G signal. The filter 662 is a filter of which the filter coefficient is set to an average of pixel values of the upper left and lower light pixels of the conversion object pixel 602, that is, an average of pixel values in the edge direction.

The fifth pixel interpolation parameter calculation unit (RBonRBofAD) 208, for example, uses the low frequency component mG and the high frequency component g of the G signal calculated by applying the filters 661 and 662 shown in FIG. 29, and thus calculates the following parameter, as the parameter which is applied to the process of converting the B pixel to the R pixel.

$$RonB(D)=(mR'/mG)g$$

Furthermore, the following parameter is calculated as the parameter which is applied to the process of converting the R pixel to B pixel.

$$BonR(D)=(mB'/mG)g$$

This parameter is calculated as the parameter corresponding to the conversion object pixel for which the edge direction of the input pixel unit 601 of the 7×7 pixels of which the central pixel is set to the conversion object pixel is judged as the left gradient upward direction, and is output to the blend process unit 211.

Furthermore, in the parameter calculation formula described above, mG is the low frequency component mG of the G signal, described referring to FIG. 29, g is the high frequency component g of the G signal, described referring to FIG. 29, and mR' and mB' are the compensation low frequency component mR' of the R signal and the compensation low frequency component mB' of the B signal which are described referring to FIG. 28.

In this way, the fifth pixel interpolation parameter calculation unit (RBonRBofAD) 208 calculates the parameters which are applied to the process of converting the B pixel on the gradient edge to the R pixel, or the R pixel to the B pixel, that is, RonB (A)=(mR'/mW) (w_a), RonB (D)=(mR'/mG)g, BonR (A)=(mB'/mW) (w_a), BonR (D)=(mB'/mG)g, and thus outputs these parameters to the blend process unit 211.

Furthermore, in the present embodiment, the formula described above, that is, RonB (D)=(mR'/mG)g, or BonR (D)=(mB'/mG)g is applied when performing the estimation (compensation) process of estimating the R pixel value for the R pixel position, or the B pixel value for the B pixel position, in the case where the edge direction of the input pixel unit 601 of the 7×7 pixels is the left gradient upward direction. This means that RonB (D) and BonR (D) are estimated from the correlation between the G pixel and the R pixel. For this reason, it is because phases of the G pixel and the R pixel, and the B pixel are equal in the left gradient upward direction, and thus an effect of preventing an occurrence of the false color is great.

(3-5. Process by the Blend Process Unit)

Next, a process by a blend process unit 211 is described. The blend process unit 211 inputs the pixel interpolation parameters which the first to fifth pixel interpolation calculation units generate, additionally inputs the edge information which the edge detection unit 209 detects and the texture information which the texture detection unit 210 which detects, and calculates the final conversion pixel value.

The edge information which is input from the edge detection unit 209 is as follows. The edge information (dirH, dirV, dirA, and dirD), that is, dirH; horizontal gradient information, dirV: vertical gradient information, dirA: gradient information on the right gradient upward direction, and dirD: gradient information on the left gradient upward direction are input.

Furthermore, the texture information which is input from the texture detection unit 210 is the following flatness weight (weightFlat) information which calculates according to the above-described formula (Formula 7).

$$\text{weightFlat}(x,y)=f_{flat}(WTX(p)) \quad \text{(Formula 7)}$$

Furthermore, as described above, in the above-described (Formula 7), for $f_{flat}(r)$, for example, the linear approximation function as shown in FIG. 14 may be used. The linear approximation function shown in FIG. 14 is a linear approximation function, where r=0 to Th0→φ(r)=0, r=Th0 to Th1→φ(r)=0 to 1.0 (linear change), r=equal to or more than Th1→φ(r)=1, with 0<Th 0<Th1<1 being set as threshold values.

Furthermore, it is indicated that the smaller the value of the flatness weight (weightFlat), the lower the flatness and the larger the textures are in number in the image region, and the larger the value of the flatness weight (weightFlat), the more likely the flatness is to be high in the image region and the more likely the textures is to be large in number in the image region.

The blend process unit 211 inputs this information, and thus determines the final conversion pixel value for converting the RGBW arrangement to the RGB arrangement.

Figure 30:
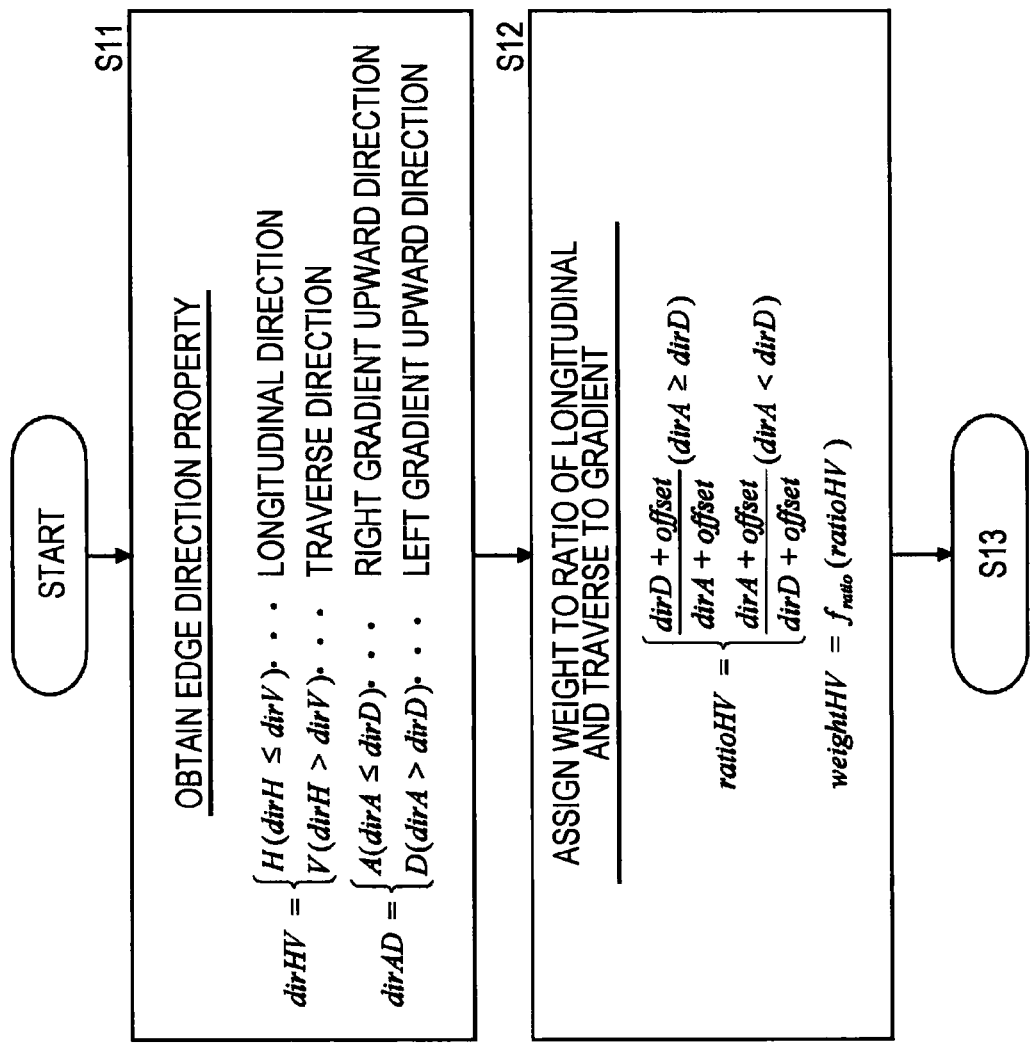
FIG. 30 is a view explaining a process which a blend process unit 211 as shown in FIG. 6 performs.
Figure 31:
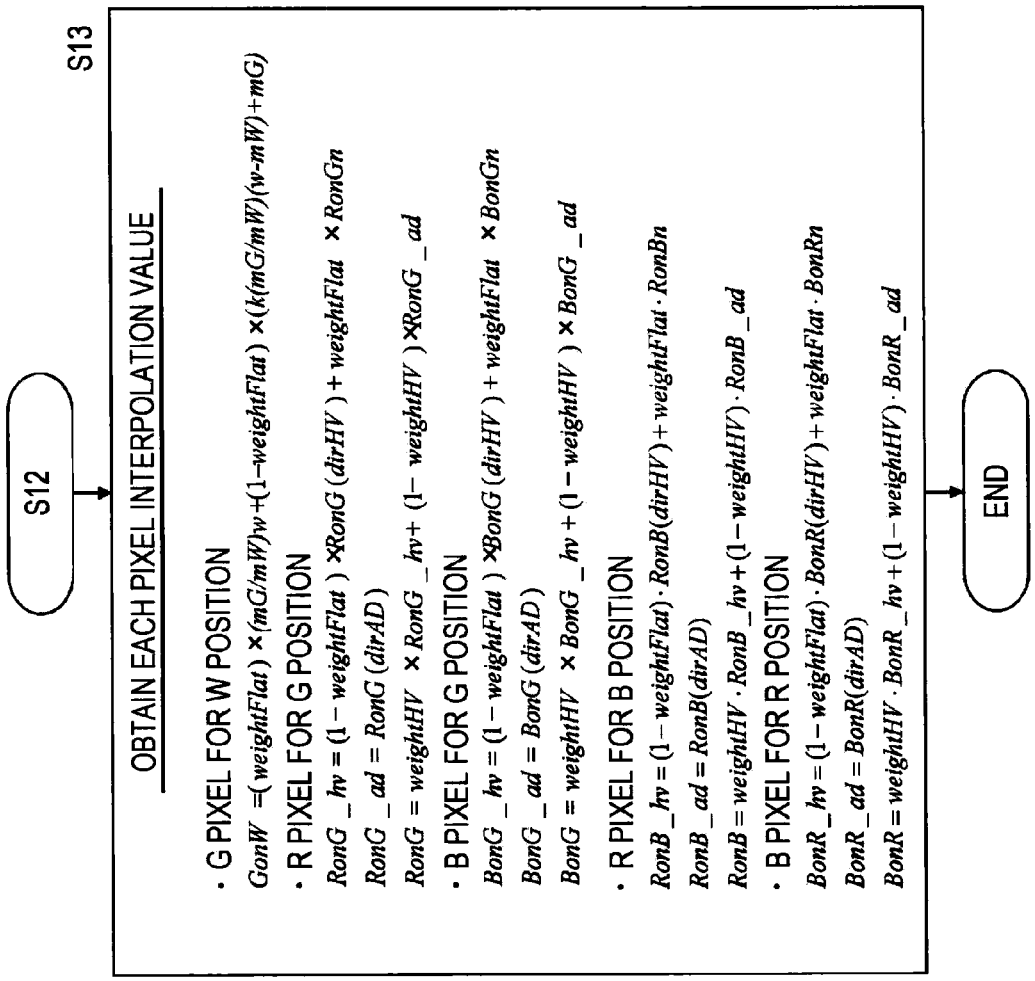
FIG. 31 is a view explaining the process which the blend process unit 211 as shown in FIG. 6 performs.

A sequence of processes which the blend process unit 211 performs is described referring to flow charts in FIGS. 30 and 31.

The blend process unit 211 first judges edge direction property of the pixel unit in step S11 shown in FIG. 30.

The blend process unit 211 judges the edge direction property of the pixel unit using the edge information (dirH, dirV, dirA, and dirD) on the pixel unit, which is input from the edge detection unit 209, according to the following judgment formula.

First, dirHV is defined as follows. When dirH≤dirV, DirHV=H, and when dirH>dirV, dirHV=V, and dirHV is any of H (horizontal direction) or, V (Vertical direction).

Furthermore, dirAD is defined as follows.

When dirA≤dirD, dirAD=A, and when dirA>dirD, dirAD=D and dirAD is any of A (right gradient upward direction) or D (right gradient upward direction).

The dirHV and dirAD are property information indicating the edge direction of each pixel.

Next, the blend process unit 211 obtains an edge direction ratio (ratioHV) of longitudinal direction edge to gradient direction edge from these dirHV and dirAD according to the following formula in step S12 shown in FIG. 30.

When dirA≦dirD, ratioHV=(dirD+offset)/(dirA+offset), and when dirA>dirD, ratioHV=(dirA+offset)/(dirD+offset). Furthermore, in the above-described formula, (offset) is non-negative value, and is a parameter for avoidance of a zero rate and for adjustment of detection sensitivity.

Figure 32:
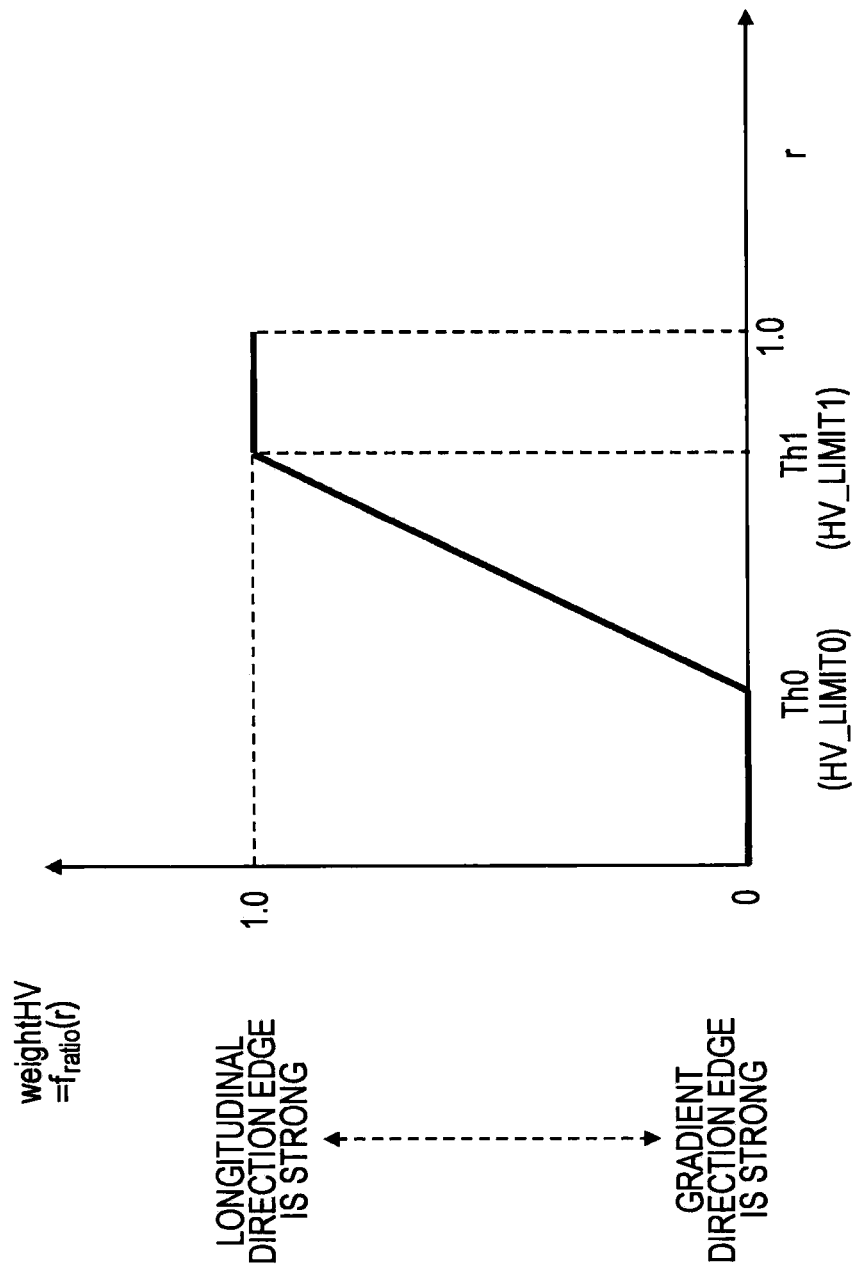
FIG. 32 is a view explaining the process which the blend process unit 211 as shown in FIG. 6 performs.

Furthermore, the edge direction ratio (ratioHV) calculated according to the above-described formula calculates a longitudinal and traverse direction edge direction weight (weighHV) by the non-linearization process by a function $f_{ratio}$ (ratioHV) shown in FIG. 32. Furthermore, threshold values Th0 (HV_LIMIT0) and Th1 (HV_LIMIT1) are adjustment parameters as threshold values which are applied to the non-linearity process.

A the linear approximation function $f_{ratio}$ (r) shown in FIG. 32 is a linear approximation function, where r=0 Th0(HV_LIMIT0)→$f_{ratio}$(r)=0, r=Th0(HV_LIMIT0) to Th1(HV_LIMIT1)→$f_{ratio}$(r)=0 to 1.0(linear change), r=equal to or more than Th1(HV_LIMIT1)→$f_{ratio}$(r)=1, with 0<Th0(HV_LIMIT0)<Th1(HV_LIMIT1)<1 is set as threshold value.

Furthermore, the longitudinal and traverse direction edge direction weight (weightHV) indicates strength of the longitudinal and traverse direction edge to the gradient direction edge, and indicates that the greater the value of the longitudinal and traverse direction edge direction weight (weightHV) is, the stronger the longitudinal and traverse direction edge is than the gradient direction edge, and the smaller the value of the longitudinal and traverse direction edge direction weight (weightHV) is, the stronger the gradient direction edge is than the longitudinal and traverse direction edge.

Next, the blend process unit 211 determines a final conversion pixel value (RGB pixel value) for converting the RGBW arrangement to the RGB arrangement in step S13 shown in FIG. 31.

The data conversion process unit 200 of the image processing device according to the present invention, as described above referring to FIG. 2, the conversion process of converting the RGBW arrangement 181 to the RGB arrangement 182 is performed. When performing this conversion process, as described above, the following five conversion and compensation processes are performed:

"Convert a W pixel to a G pixel (Estimate a G pixel value)= (GonW)"
"Convert a G pixel to an R pixel (Estimate an R pixel value)= (RonG)"
"Convert a G pixel to a B pixel (Estimate a B pixel value)= (BonG)"
"Convert a B pixel to an R pixel (Estimate an R pixel value)= (RonB)"
"Convert an R pixel to a B pixel (Estimate a B pixel value)= (BonR)"

The blend process unit 211 determines these final conversion pixel values.

The G pixel value (GonW) which is set in the conversion process of converting the W pixel position to the G pixel is calculated according to the following formula (Formula 11).

$$GonW=(weightFlat)(mG/mW)w+(1-weightFlat)(k(mG/mW)(w-mW)+mG) \quad \text{(Formula 11)}$$

Furthermore, in the formula described above, mW is a low frequency component mW of a W signal, w is a high frequency component w of a W signal, mG is a low frequency component mG of a G signal, weightFlat is flatness weight, and k is a contrast enhancement process adjustment parameter (no enhancement when k=1) (refer to FIG. 18).

In this way, the G pixel value (GonW) in a case of converting the W pixel position in the RGBW arrangement to the G pixel is calculated.

Furthermore, the G pixel value (GonW) calculation formula shown in the above-described formula (Formula 11) is a formula for calculating the final G pixel value by changing a blend ratio of the following values, according to the flatness weight (weightFlat) of the conversion object pixel: (GonW (dirHV)): the conversion G pixel value calculated by applying the contrast enhancement, and (GonWn (dirHV)): the conversion G pixel value calculated without applying the contrast enhancement.

In a case where the flatness weight (weightFlat) of the conversion object pixel is great and is a flat region, a blend ratio of (GonW(dirHV)) corresponding to the conversion G pixel without contrast enhancement is high, and in a case where the flatness weight (weightFlat) of the conversion object pixel is small and is a flat region with many textures, a blend ratio of (GonW(dirHV)) corresponding to the conversion pixel value after contrast enhancement is high.

In this way, the final G pixel value (GonW) is determined by changing the blend ratio according to the flatness of the conversion object pixel.

Next, the calculation process of calculating the R pixel value (RonG) in the process of converting the G pixel position among the RGBW arrangement to the R pixel is described.

First, the conversion pixel value (RonG_hv) corresponding to the longitudinal and traverse direction edge and the conversion pixel value (RonG_ad) corresponding to the gradient direction edge are obtained according to the following formulae (Formula 21) and (Formula 22).

$$RonG\_hv=(1-weightFlat)\cdot(RonG(dirHV))+(weightFlat)\cdot(RonGn) \quad \text{(Formula 21)}$$

$$RonG\_ad=(RonG(dirAD)) \quad \text{(Formula 22)}$$

Furthermore, the blend process is performed on (RonG_hv) and (RonG_ad) which is calculated according to the above-described formulae (Formula 21) and (Formula 22), according to the following formula (Formula 23), and thus calculates the final R pixel value (RonG).

$$RonG=(weightHV)\cdot(RonG\_hv)+(1-weightHV)RonG\_ad \quad \text{(Formula 23)}$$

In this way, the calculation process of calculating the R pixel value (RonG) in a case of converting the G pixel position among the RGBW arrangement to the R pixel is performed.

The above-described formula is described.

In the above-described formula (Formula 21), the RonG (dirHV) and RonGn are interpolation parameters which the second pixel interpolation parameter calculation unit (RBonGofHV) 204 described above calculates, and are the following parameters which are applied to the process of converting the G pixel on the longitudinal or traverse edge to the R pixel.

$$RonG(H)=(mR'/mW)(w\_h), RonG(V)=(mR'/mW)(w\_v), RonGn=(mR'/mW)(w\_n).$$

When dirH≦dirV, dirHV=H, as shown in step S11, and when RonG(dirHV)=RonG(H)=(mR'/mW)(w_h), or dirH>dirV, dirHV=V, and RonG(dirHV)=RonG(V)=(mR'/mW)(w_v), as shown in step S11.

Furthermore, in the above-described formula (Formula 22), the RonG (dirAD) is an interpolation parameter which the third pixel interpolation parameter calculation unit (RBonGofAD) 205 which calculates and are the following parameters which are applied to the process of converting the G pixel on the gradient direction edge to the R pixel.

$$RonG(A)=(mR'/mW)(w\_a)$$

$$RonG(D)=(mR'/mG)g$$

When dirA≤dirD, dirAD=A, and RonG (dirAD)=RonG (A)=(mR'/mw)(w_a), as shown in step S11, and furthermore when dirA>dirD, dirAD=D, and RonG (dirAD)=RonG (D)=(mR'/mG)g, as shown in step S11.

The formula (Formula 21) is a calculation formula for calculating the R pixel value (RonG_hv) depending on the longitudinal and traverse direction edge according to the longitudinal and traverse direction edge information on the conversion object pixel and the flatness weight (weightFlat).

In the case where the flatness weight (weightFlat) of the conversion object pixel is great and is the flat region, the R pixel value estimated using the W pixel value (w_n) calculated by applying the filter 533 shown in FIG. 25(c), described above, that is, the weight of the value of RonGn=(mR'/mW) (w_n) is increased.

On the other hand, in the case where the flatness weight (weightFlat) of the conversion object pixel is small and is the flat region having the low flatness and a large number of textures, the R pixel value estimated using the W pixel value (w_n) or (w_v) calculated by applying the filters 531 and 532 shown in FIGS. 25(a) and (b), described above, that is, the weights of the values, RonG (H)=(mR'/mW) (w_h) and RonG (V)=(mR'/mw)(w_v) are increased.

Furthermore, the value, RonG(dirHV) is dirH≤dirV in a case of the traverse direction edge, and the R pixel value estimated using the W pixel value (w_h) calculated by applying the filter 531 shown in FIG. 25(a) described above, that is, the value RonG (dirHV)=RonG (H)=(mR'/mw)(w_h) is applied.

Furthermore, the value RonG(dirHV) is dirH>dirV in a case of the longitudinal direction edge, and the R pixel value estimated using the W pixel value (w_v) calculated by applying the filter 532 shown in FIG. 25(b), described above, that is, the value, RonG(dirHV)=RonG(H)=(mR'/mW)(w_v) is applied.

In this way, the formula (Formula 21) is a calculation formula for calculating the R pixel value (RonG_hv) depending on the longitudinal and traverse direction edge according to the flatness weight (weightFlat).

The formula (Formula 22) is RonG_ad=(RonG(dirAD)), and is a formula for selecting the following parameter which is applied to the process of converting the G pixel on the interpolation parameter gradient direction edge to the R pixel, which the third pixel interpolation parameter calculation unit (RBonGofAD) 205 calculates, that is, RonG (A)=(mR'/mW) (w_a), RonG (D)=(mR'/mG)g.

When dirA>dirD, the R pixel value estimated using the W pixel value (w_d) calculated by applying the filter 541 shown in FIG. 26(a), described above, that is, RonG (dirAD)=RonG (D)=(mR'/mG)g, is selected, and when dirA≤dirD, the R pixel value estimated using the W pixel value (w_a) calculated by applying the filter 542 shown in FIG. 26(b), described above, that is, RonG(dirAD)=RonG(A)=(mR'/mW)(w_a) is selected.

In this way, the formula (Formula 22) is a calculation formula for calculating the R pixel value (RonG_hv) depending on the gradient direction edge according to the edge direction information on the gradient direction of the conversion object pixel.

The blend process unit 211 additionally performs the blend process on the (RonG_hv) and (RonG_ad) calculated using the above-described formulae (Formulae 21 and 22), according to the following formula (Formula 23), and thus calculates the final R pixel value (RonG).

$$RonG=(\text{weight}HV)\cdot(RonG\_hv)+(1-\text{weight}HV)RonG\_ad$$

The above-described formula (Formula 23) is a formula for calculating the final R pixel value (RonG) by blending the R pixel value (RonG_hv) depending on the longitudinal and traverse direction edge, calculated using the formula 21, and the R pixel value (RonG_ad) depending on the gradient direction edge, calculated using the formula 22, according to the longitudinal and traverse direction edge direction weight (weightHV) calculated in step S12.

As described above, the longitudinal and traverse direction edge direction weight (weightHV) indicates strength of the longitudinal and traverse edge to the gradient direction edge, and indicates that the greater the value of the longitudinal and traverse direction edge direction weight (weightHV) is, the stronger the longitudinal and traverse direction edge is than the gradient direction edge, and the smaller the value of the longitudinal and traverse direction edge direction weight (WeightHV) is, the stronger the gradient direction edge is than the longitudinal and traverse direction edge.

Therefore, in the formula (Formula 23), the weight of the R pixel value (RonG_hv) depending on the longitudinal and traverse direction edge calculated using Formula 21 is set to be great, in a case where the longitudinal and traverse direction edge is strong and the value of longitudinal and traverse direction edge direction weight (weight HV) is great.

Furthermore, in the case where the gradient direction edge is strong and the value of the longitudinal and traverse direction edge direction weight (weightHV) is small, the weight of the R pixel value (RonG_ad) depending on the gradient direction edge calculated using the formula 22 is set to be great.

In this way, the final R pixel value (RonG) is determined by changing a brend rate according to the edge direction of the conversion object pixel.

Next, the calculation process of calculating the B pixel value (BonG) in the process of converting the G pixel position among the RGBW arrangement to the B pixel is described.

The blend process unit 211 first obtains the conversion pixel value (BonG_hv) corresponding to the longitudinal direction edge and the conversion pixel value (BonG_ad) corresponding to the gradient direction edge, according to the following formulae (Formula 31) and (Formula 32).

$$BonG\_hv=(1-\text{weightFlat})\cdot(BonG(dirHV))+(\text{weightFlat})\cdot(BonGn) \quad \text{(Formula 31)}$$

$$BonG\_ad=(BonG(dirAD)) \quad \text{(Formula 32)}$$

Furthermore, The blend process is performed on (BonG_hv) and (BonG_ad) calculated using the above-described formulae (Formulae 31) and (Formula 32) according to the following formula (Formula 33), and thus the final B pixel value (BonG) is calculated, $$BonG=(\text{weight}HV)\cdot(BonG\_hv)+(1-\text{weight}HV)BonG\_ad \quad \text{(Formula 33)}$$

In this way, the calculation process of calculating the B pixel value (BonG) is performed in the case where the G pixel position among the RGBW arrangement is converted to the B pixel.

The formulae 31 to 33 is the same as the above-described formulae 21 to 23, that is, the formula which is applied to the calculation process of calculating the R pixel value (RonG) at the time of converting the G pixel position among the RGBW arrangement to the R pixel, except that R is replaced with B, and the process is the same, except that R is replaced with B.

In the formula (Formula 31), BonG(dirHV) and BonGn are interpolation parameters which the second pixel interpolation parameter calculation unit (RBonGofHV) 204 described above calculates, and are the following parameters which are applied to the process of converting the G pixel on the longitudinal or traverse edge to the B pixel. BonG(H)=(mB'/mW)(w_h), BonG(V)=(mB'/mW)(w_v), BonGn=(mB'/mW)(w_n).

In the above-described formula (Formula 32), BonG (dirAD) is an interpolation parameter which the third pixel interpolation parameter calculation unit (RBonGofAD) 205 described above calculates, and are the following parameters which are applied to the process of converting the G pixel on the gradient direction edge to the R pixel.

$$BonG(A)=(mB'/mW)(w\_a), BonG(D)=(mB'/mW)(w\_d).$$

The above-described formula (Formula 33) is a calculation formula for calculating the final B pixel value (BonG) by blending the B pixel value (BonG_hv) depending on the longitudinal and traverse direction edge, calculated using the formula 31, and the B pixel value (BonG_ad) depending on the gradient direction edge, calculated using the formula 32, according to the longitudinal and traverse direction edge direction weight (weightHV) calculated in step S12.

In the formula (Formula 33), the weight of the B pixel value (BonG_hv) depending on the longitudinal and traverse direction edge calculated using the formula 31 is set to be great, in the case where the longitudinal and traverse direction edge is strong and the value of the longitudinal and traverse direction edge direction weight (weightHV) is great.

Furthermore, the weight of the B pixel value (BonG_ad) depending on the gradient direction edge calculated using the formula 32 is set to be great, in the case where the gradient direction edge is strong and the value of the longitudinal and traverse direction edge direction weight (weightHV) is small.

In this way, the final B pixel value (BonG) is determined by changing the blend ratio according to the edge direction of the conversion object pixel.

Next, the calculation process of calculating the R pixel value (RonB) in the process of converting the B pixel position among the RGBW arrangement to the R pixel is described.

The blend process unit 211 first obtain a longitudinal and traverse direction edge correspondence conversion pixel value (RonB_hv) and a gradient direction edge correspondence conversion pixel value (RonB_ad), according to the following formulae (Formula 41) and (Formula 42).

$$RonB\_hv=(1-\text{weightFlat})\cdot(RonB(dirHV))+(\text{weightFlat})\cdot(RonBn) \quad \text{(Formula 41)},$$

$$RonB\_ad=(RonB(dirAD)) \quad \text{(Formula 42)}$$

Furthermore, the blend process is performed on (RonB_hv) and (RonB_ad) calculated using the above-described formulae (Formula 41) and (Formula 42), according to the following formula (Formula 43), and thus the final R pixel value (RonB) is calculated.

$$RonB=(\text{weight}HV)(RonB\_hv)+(1-\text{weight}HV)RonB\_ad \quad \text{(Formula 43)}$$

In this way, the calculation process of calculating the R pixel value (RonB) is performed in the case where the B pixel position among the RGBW arrangement is converted to the R pixel.

The formulae 41 to 43 is the same formula as the above-described formulae 21 to 23, that is, the formula which is applied to the calculation process of calculating the R pixel value (RonG) at the time of converting the G pixel position among the RGBW arrangement to the R pixel, except that G is replaced with B, and the process is the same, except that G is replaced with B.

In the above-described formula (Formula 41), RonB (dirHV) and RonBn are the interpolation parameters which the fourth pixel interpolation parameter calculation unit (RBonRBofHV) 207 described above calculates, and are the following parameters which are applied to the process of converting the B pixel on the longitudinal or traverse edge to the R pixel.

$$RonB(H)=(mR'/mW)(w\_h),$$

$$RonB(V)=(mR'/mW)(w\_v), RonBn=(mR'/mW)(w\_n)$$

Furthermore, in the above-described formula (Formula 42), RonB(dirAD) is the interpolation parameter which the fifth pixel interpolation parameter calculation unit (RBonRBofAD) 208 calculates, and is the following parameter which is applied to the process of converting the B pixel on the gradient direction edge to the R pixel.

When dirA≤dirD, the R pixel value estimated using the W pixel value (w_a), that is, RonB(dirAD)=RonB(A)=(mR'/mW)(w_a) is selected. Furthermore, when, dirA>dirD, RonB (dirAD)=RonB(D)=(mR'/mG) g is selected.

The above-described formula (Formula 43) is the formula for calculating the final R pixel value (RonB) by blending the R pixel value (RonB_hv) depending on longitudinal and traverse direction edge, calculated using the formula 41, and the R pixel value (RonB_ad) depending on the gradient direction edge, calculated using the formula 42, according to the longitudinal and traverse direction edge direction weight (weightHV) calculated in step S12.

In the formula (Formula 43), the weight of the R pixel value (RonB_hv) depending on the longitudinal and traverse direction edge, calculated using the formula 41 is set to be great, in the case where the longitudinal and traverse direction edge is strong and the value of the longitudinal and traverse direction edge direction weight (weightHV) is great.

Furthermore, the weight of the R pixel value (Rona ad) depending on the gradient direction edge, calculated using the formula 42 is set to be great, in the case where the gradient direction edge is strong and the value of the longitudinal and traverse direction edge direction weight (weightHV) is small.

In this way, the final R pixel value (RonB) is determined by changing the blend ratio according to the edge direction of the conversion object pixel.

Next, the calculation process of calculating the B pixel value (BonR) in the process of converting the R pixel position among the RGBW arrangement to the B pixel is described.

The blend process unit 211 first obtains the longitudinal and traverse direction edge correspondence conversion pixel value (BonR_hv) and the gradient direction edge correspondence conversion pixel value (BonR_ad), according to the following formulae (Formula 51) and (Formula 52).

$$BonR\_hv=(1-\text{weightFlat})\cdot(BonR(dirHV))+(\text{weightFlat})\cdot(BonRn) \quad \text{(Formula 51)}$$

$$BonR\_ad=(BonR(dirAD)) \quad \text{(Formula 52)}$$

Furthermore, the blend process is performed on (BonR_hv) and (BonR_ad) calculated using the above-described formulae (Formula 51) and (Formula 52) according to the following formula (Formula 53), and thus the final B pixel value (BonR) is calculated.

$$BonR = (\text{weight}HV)(BonR\_hv) + (1-\text{weight}HV)BonR\_ad \quad \text{(Formula 53)}$$

In this way, the calculation process of calculating the B pixel value (BonR) is performed in the case where the R pixel position among the RGBW arrangement is converted to the B pixel.

The formulae 51 to 53 is the same as the above-described formulae 41 to 43, that is, the formula which is applied to the calculation process of calculating the R pixel value (RonB) at the time of converting the B pixel position among the RGBW arrangement to the R pixel, except that R and B are exchanged, and the process is the same, except that R and B are exchanged.

In the above-described formula (Formula 51), BonR (dirHV) and BonRn are the interpolation parameters which the fourth pixel interpolation parameter calculation unit (RBonRBofHV) 207 described above calculates, and are the following parameters which are applied to the process of converting the R pixel on the longitudinal or traverse edge to the B pixel.

$$BonR(H) = (mB'/mW)(w\_h),$$

$$BonR(V) = (mB'/mW)(w\_v),$$

$$BonRn = (mB'/mW)(w\_n)$$

Furthermore, in the above-described formula (Formula 52), BonR(dirAD) is the interpolation parameter which the fifth pixel interpolation parameter calculation unit (RBonRBofAD) 208 calculates, and is the following parameter which is applied to the process of converting the R pixel on the gradient direction edge to the B pixel.

When dirA≤dirD, the B pixel value estimated using the W pixel value (w_a), that is, BonR (dirAD)=BonR (A)=(mB'/mW) (w_a) is selected.

Furthermore, when dirA>dirD, BonR(dirAD)=BonR(D)=(mB'/mG) g is selected.

The above-described formula (Formula 53) is the formula for calculating the final B pixel value (BonR) by blending the B pixel value (BonR_hv) depending on the longitudinal and traverse direction edge, calculated using Formula 51, and the B pixel value (BonR_ad) depending on the gradient direction edge, calculated using the Formula 52, according to the longitudinal and traverse direction edge direction weight (weightHV) calculated in step S12.

In the formula (Formula 53), the weight of the B pixel value (BonR_hv) depending on the longitudinal and traverse direction edge, calculated using Formula 51 is set to be great, in the case where the longitudinal and traverse direction edge is strong and the value of the longitudinal and traverse direction edge direction weight (weightHV) is great.

Furthermore, the weight of the B pixel value (BonR_ad) depending on the gradient direction edge, calculated using Formula 52 is set to be great, in the case where the gradient direction edge is strong and the value of the longitudinal and traverse direction edge direction weight (weightHV) is small.

In this way, the final B pixel (BonR) is determined by changing the blend ratio according to the edge direction of the conversion object pixel.

As described above, the blend process unit 211 inputs the pixel interpolation parameters which the first to fifth pixel interpolation parameter calculation unit generate, additionally inputs the edge information which the edge detection unit 209 which detects and the texture information which the texture detection unit 210 detects, and thus calculates the final conversion pixel value. That is, the following conversion pixel value in the process of converting the RGBW arrangement to the RGB arrangement is determined.

G pixel value (GonW) when converting a W pixel position to a G pixel (estimating a G pixel value)
R pixel value (RonG) when converting a G pixel position to an R pixel (estimating an R pixel value)
B pixel value (BonG) when converting a G pixel position to a B pixel (estimating a B pixel value)
B pixel value (RonB) when converting a B pixel position to an R pixel (estimating an R pixel value)
R pixel value (BonR) when converting an R pixel position to a B pixel (estimating a B pixel value)

These five conversion and compensation pixel values are determined.

The blend process unit 211 determines the blend ratio of the pixel interpolation parameters which the first to fifth pixel interpolation parameter calculation units generate, and thus calculates the final pixel value, according to the edge information corresponding to the conversion object pixel, that is, the edge strength and the edge direction. The formulae for calculating each pixel value are shown collectively as follows.

$$GonW = (1-\text{weightFlat}) \cdot (GonW(dirHV)) + (\text{weightFlat}) \cdot (GonWn(dirHV))$$

$$RonG = (\text{weight}HV) \cdot (RonG\_hv) + (1-\text{weight}HV) RonG\_ad$$

$$BonG = (\text{weight}HV) \cdot (BonG\_hv) + (1-\text{weight}HV) BonG\_ad$$

$$RonB = (\text{weight}HV) \cdot (RonB\_hv) + (1-\text{weight}HV) RonB\_ad$$

$$BonR = (\text{weight}HV) \cdot (BonR\_hv) + (1-\text{weight}HV) BonR\_ad$$

[4. Sequence of Re-Mosaic Processes which a Data Conversion Process Unit of the Image Processing Device Performs]

Figure 33:
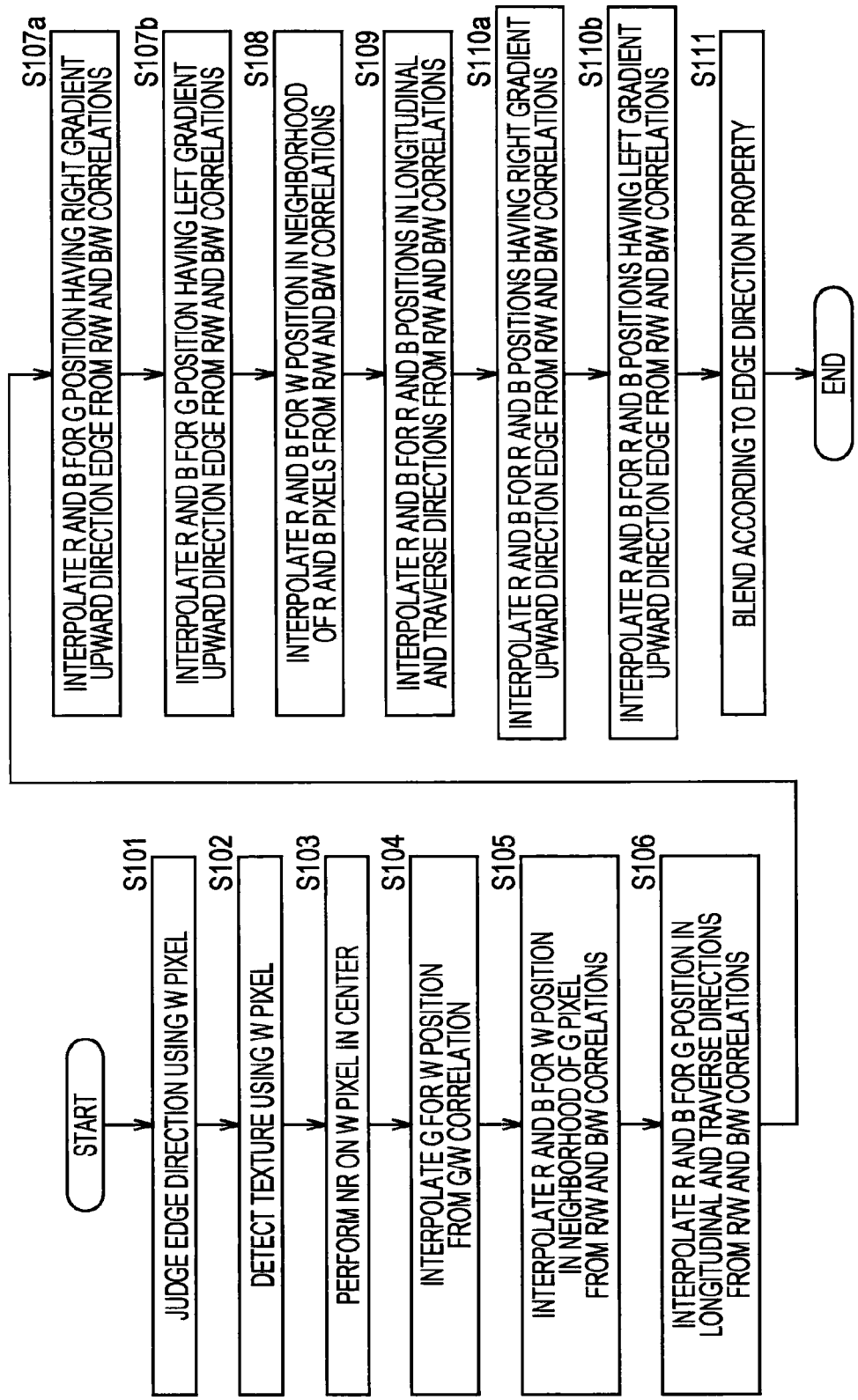
FIG. 33 is a view illustrating a flow chart explaining a sequence of processes which a data conversion process unit 200 as shown in FIG. 6 performs.

A sequence of re-mosaic processes which a data conversion process unit of the image processing device performs is described referring the flow chart shown in FIG. 33. The flow chart shown in FIG. 33 is a flow chart illustrating the conversion processes of converting the RGBW arrangement to the RGB arrangement in the image processing device shown in FIG. 5, that is, a whole sequence of re-mosaic processes. The flow chart illustrates the sequence of all the processes which are described above. Furthermore, the flow shown in FIG. 33 may be caused to be performed, for example, by running a program which the control unit 140 of the image processing device shown in FIG. 5 stores in the memory 130 and controlling each process unit.

Each step of the flow chart shown in FIG. 33 is described.

First, in step S101, the edge direction is determined by applying the W pixel included in the RGBW arrangement.

This process is the process which the edge detection unit 209 shown in FIG. 6 performs. As described above, the edge detection unit 209 determines the edge direction and the edge strength using the White (W) signal among the signals of the RGBW arrangement which are input.

The edge detection unit 209 calculates the edge information (dirH, dirV, dirA, and dirD) corresponding to the pixel by performing the edge detection process, and outputs the result to the blend process unit 211 and the plurality of pixel interpolation parameter calculation units.

Next, in step S102, the texture detection process is performed by applying the W pixel included in the RGBW arrangement.

This process is the process which the texture detection unit 210 shown in FIG. 6 performs. As described above, the texture detection unit 210 calculates the texture information corresponding to the pixel, that is, the flatness weight (weightFlat), using the white (W) signal among the signals of the RGBW arrangement which are input.

$$\text{weightFlat}(x,y) = f_{flat}(W_{TX}(p))$$

$f_{flat}(r)$ is, for example, the linear approximation function as shown in FIG. 14, calculates flatness weight (weightFlat) which is set to r=0 to Th0→$f_{flat}(r)$=0, r=Th0 to Th1→$f_{flat}(r)$=0 to 1.0 (linear change), r=equal to or more than Th1→$f_{flat}(r)$=1, and outputs the result to the blend process unit 211.

Next, in step S103, the noise removal is performed on the W pixel in the center of the input pixel unit.

This process is the process which the noise removal unit 201 shown in FIG. 6 performs. As described above, the noise removal unit 201 performs the noise removal on the W pixel in the center of the input pixel unit.

As described above referring to FIG. 7, the noise removal unit 201 calculates, for example, the noise reduction pixel value $I_{NR}(p)$ according to the above-described formula (Formula 1), in the case where the W pixel is set to the center of the process unit (5×5 pixels of the center of the 7×7 pixels) by applying the bilateral filter. The calculated noise reduction W pixel value ($I_{NR}(p)$) is output to the first pixel interpolation parameter calculation unit (GonW) 202 shown in FIG. 6.

Next, in step S104, the interpolation parameter is calculated which is applied to convert the W pixel among the RGBW arrangement to the G pixel.

This process is the process which the first pixel interpolation parameter calculation unit (GonW) 202 as shown in FIG. 6 performs. The first pixel interpolation parameter calculation unit (GonW) 202, as described above, calculates the following parameter, as the interpolation parameter which is applied to convert the W pixel in RGBW arrangement to the G pixel.

low frequency component mW of the W signal (refer to FIG. 15)

high frequency component w of the W signal (refer to FIG. 16)

low frequency component mG of the G signal (refer to FIG. 17)

Next, in step S105, R and B in the W position in the neighborhood of the G pixel from R/W and B/W correlations are interpolated.

This process is a process which the first temporary pixel setting unit (RBonWaroundG) 203 as shown in FIG. 6 performs.

The first temporary pixel setting unit (RBonWaroundG) 203, as described above referring to FIG. 21, estimates the R pixel value and B pixel value for the W pixel position adjacent to the neighborhood of the conversion object pixel 502 in the center of the input pixel unit 501 of the 7×7 pixels.

The R pixel values ($R_{xy}' = R_{23}'$, $R_{32}'$, $R_{43}'$, and $R_{34}'$) for the W pixel position adjacent to the neighborhood of the conversion object pixel 502 in the center of input pixel unit 501 of the 7×7 pixels shown in FIG. 21 may be estimated as follows.

$$R_{23}'=(mR/mW)w_{23},\ R_{32}'=(mR/mW)w_{32},\ R_{43}'=(mR/mW)w_{43},\ R_{34}'=(mR/mW)w_{34}.$$

Furthermore, $w_{23}$, $w_{32}$, $w_{43}$, and $w_{34}$ are the W pixel values for the W pixel position adjacent to the neighborhood of the conversion object pixel 502 in the center of the input pixel unit 501 of the 7×7 pixels shown in FIG. 21.

Likewise, the B pixel values ($B_{xy}' = B_{23}'$, $B_{32}'$, $B_{43}'$, $B_{34}'$) for the W pixel position adjacent to the neighborhood of the conversion object pixel 502 in the center of the input pixel unit 501 of the 7×7 pixels shown in FIG. 21 may be estimated as follows.

$$B_{23}'=(mB/mW)w_{23},\ B_{32}'=(mB/mW)w_{32},\ B_{43}'=(mB/mW)w_{43},\ B_{34}'=(mB/mW)w_{34}.$$

Furthermore, $w_{23}$, $w_{32}$, $w_{43}$, and $w_{34}$ are the W pixel values for the W pixel position adjacent to the neighborhood of the conversion object pixel 502 in the center of the input pixel unit 501 of the 7×7 pixels shown in FIG. 21.

Furthermore, mW: low frequency component of the W signal of the input pixel unit, w: pixel value of the W pixel in the center of the input pixel unit, mR': low frequency component of the R signal calculated by applying the temporary R pixel (R') set to the W pixel position in the neighborhood of the RB pixels, and mB': low frequency component of the B signal calculated by applying the temporary B pixel (B') set to the W pixel position in the neighborhood of the RB pixels are possible.

Next, in step S106, R and B for the G position in the longitudinal and traverse directions are interpolated using the R/W and B/W correlations.

This process is the process which the second pixel interpolation parameter calculation unit (RBonGofHV) 204 as shown in FIG. 6 performs. The second pixel interpolation parameter calculation unit (RBonGofHV) 204 performs the calculation process of calculating the parameter which is applied to the process of converting the G pixel mainly on the longitudinal edge or on the traverse edge to the R pixel or the B pixel.

The second pixel interpolation parameter calculation unit (RBonGofHV) 204 calculates the parameters which are applied to the process of converting the G pixel on the longitudinal edge, or on the traverse edge to the R pixel or the B pixel, that is, $$RonG(H)=(mR'/mW)(w\_h)$$

$$RonG(V)=(mR'/mW)(w\_v)$$

$$RonGn=(mR'/mW)(w\_n)$$

$$BonG(H)=(mB'/mW)(w\_h)$$

$$BonG(V)=(mB'/mW)(w\_v) \text{ and}$$

$$BonGn=(mB'/mW)(w\_n) \text{ and outputs these parameters to the blend process unit 211.}$$

Furthermore, mR': compensation low frequency component of the R signal of the input pixel unit mB': compensation low frequency component of the BR signal of the input pixel unit mW: low frequency component of the W signal of the input pixel unit(w_h), (w_v), and (w_n), as described referring to FIGS. 22 and 23, are the high frequency component values for the pixel position in the center of the input pixel unit, calculated by applying the filter selected according to the edge direction.

Next, in step S107a, R and B for the G position having the right gradient upward direction edge is interpolated using the R/W and B/W correlations.

This process is the process which the third pixel interpolation parameter calculation unit (RBonGofAD) 205 as shown in FIG. 6 performs. The third pixel interpolation parameter calculation unit (RBonGofAD) 205 performs the calculation process of calculating the parameters which are applied to the process of converting the G pixel on the gradient edge to the R pixel or the B pixel.

The third pixel interpolation parameter calculation unit (RBonGofAD) 205 calculates the parameters which are applied to the process of converting the G pixel having the right gradient upward direction edge to the R pixel or the B pixel, that is, RonG(A)=(mR'/mW) (w_a) and BonG(A)=(mB'/mW)(w_a), and outputs these parameters to the blend process unit 211.

Next, in step S107b, R and B for the G position having the left gradient upward direction edge are interpolated using the R/W and B/W correlations.

This process is the process which the third pixel interpolation parameter calculation unit (RBonGofAD) 205 as shown in FIG. 6 performs. The third pixel interpolation parameter calculation unit (RBonGofAD) 205 performs the calculation process of calculating the parameters which are applied to the process of converting the G pixel on the gradient edge to the R pixel or the B pixel.

The third pixel interpolation parameter calculation unit (RBonGofAD) 205 calculates the parameters which are applied to the process of converting the G pixel having the left gradient upward direction edge to the R pixel or the B pixel, that is, RonG(D)=(mR'/mG) g and BonG(D)=(mB'/mG) g, and outputs these parameters to the blend process unit 211.

Next, in step S108, R and B for the W position in the neighborhood of the R and B pixels are interpolated using the R/W and B/W correlations.

This process is the process which the second temporary pixel setting unit (RBonWaroundRB) 206 as shown in FIG. 6 performs.

Next, the second temporary pixel setting unit (RBonWaroundRB) 206, as described referring to FIG. 28, estimates the R pixel value and the B pixel value for the W pixel position adjacent to the neighborhood of the conversion object pixel 602 in the center of the input pixel unit 601 of the 7×7 pixels.

The R pixel values ($R_{xy}'=R_{23}'$, $R_{32}'$, $R_{43}'$, $R_{34}'$) and the B pixel values ($B_{xy}'=B_{23}'$, $B_{32}'$, $B_{43}'$, $B_{34}'$) for the W pixel position adjacent to the neighborhood of the conversion object pixel in the center of the input pixel unit are calculated as in the process in step S105.

Next, in step S109, R and B for the R and B positions in the longitudinal and traverse direction are interpolated using the R/W and B/W correlations. This process is the process which the fourth pixel interpolation parameter calculation unit (RBonRBofHV) 207 as shown in FIG. 6 performs. The fourth pixel interpolation parameter calculation unit (RBonRBofHV) 207 performs the calculation process of calculating the following parameters, as the parameters which are applied to the process of converting the R pixel on the longitudinal or traverse edge to the B pixel, or the B pixel to the R pixel.

$RonB(H)=(mR'/mW)(w\_h)$ $RonB(V)=(mR'/mW)(w\_v)$ $RonBn=(mR'/mW)(w\_n)$ $BonR(H)=(mB'/mW)(w\_h)$ $BonR(V)=(mB'/mW)(w\_v)$, and $BonRn=(mB'/mW)(w\_n)$, these parameters are calculated and are output to the blend process unit 211.

Next, in step S110a, R and B in the R and B positions having the right gradient upward direction edge are interpolated using the R/W and B/W correlations.

This process is the process which the fifth pixel interpolation parameter calculation unit (RBonRBofAD) 208 as shown in FIG. 6 performs. The fifth pixel interpolation parameter calculation unit (RBonRBofAD) 208 performs the calculation process of calculating the parameters which are applied to the process of converting the R pixel on the gradient edge to the compensated R pixel, or the B pixel to the compensated B pixel.

In this way, the fifth pixel interpolation parameter calculation unit (RBonRBofAD) 208 calculates the parameters which are applied to the process of converting the R pixel on the edge having the right gradient upward direction edge to the compensated R pixel, or the B pixel to the compensated B pixel, that is, RonB(A)=(mR'/mW)(w_a) and BonR(A)=(mB'/mW)(w_a) and outputs these parameters to the blend process unit 211.

Next, in step S110b, R and B for the R and B positions having the left gradient upward direction edge are interpolated using the R/W and B/W correlations.

This process is the process which the fifth pixel interpolation parameter calculation unit (RBonRBofAD) 208 as shown in FIG. 6 performs. The fifth pixel interpolation parameter calculation unit (RBonRBofAD) 208 performs the calculation process of calculating the parameters which are applied to the process of converting the R pixel on the gradient edge to the B pixel, or the B pixel to the R pixel.

The fifth pixel interpolation parameter calculation unit (RBonRBofAD) 208 calculates the parameters which are applied to the process of converting the R pixel having the left gradient upward direction edge to the compensated R pixel, or the B pixel to the compensated B pixel, that is, RonB(D)=(mR'/mG) g and BonR(D)=(mB'/mG) g, and outputs these to the blend process unit 211.

Next, in step S111, the RGB pixel values configuring the RGB arrangement after converting the RGBW arrangement are determined by performing the blend process according to the edge direction property. This process is the process which the blend process unit 211 as shown in FIG. 6 performs.

The blend process unit 211 inputs the pixel interpolation parameters which the first to fifth pixel interpolation parameter calculation units generate, additionally inputs the edge information which the edge detection unit 209 detects and the texture information which the texture detection unit 210 detects, and thus calculates the final conversion pixel values.

The blend process unit 211 determines the blend ratio of the pixel interpolation parameters which the first to fifth pixel interpolation parameter calculation units generate and thus calculates the final pixel values, according to the edge information corresponding to the conversion object pixel, that is, the edge strength and the edge direction. This process is the process which is described referring to the flow shown in FIGS. 30 and 31. The calculation formulae for calculating each conversion pixel value are shown collectively as follows $GonW=(\text{weightFlat})(mG/mW)w+(1-\text{weightFlat})(k(mG/mW)(w-mW)+mG)$ $RonG=(\text{weight}HV)\cdot(RonG\_hv)+(1-\text{weight}HV)RonG\_ad$ $BonG=(\text{weight}HV)\cdot(BonGhv)+(1-\text{weight}HV)BonG\_ad$ $$RonB = (\text{weight}HV) \cdot (RonBhv) + (1 - \text{weight}HV)RonB\_ad$$

$$BonR = (\text{weight}HV) \cdot (BonR\_hv) + (1 - \text{weight}HV)BonR\_ad$$

In this way, in the image processing device according to the present invention, each of the interpolation parameter calculation units performs the interpolation process of changing the application pixel position according to the edge direction corresponding to the conversion pixel, and thus generates the parameters corresponding to the compensation interpolation value. Furthermore, the blend process unit inputs the parameter which each of the parameter calculation units generates, and the edge information and the texture information, and determines the conversion pixel values by performing the blend process by changing the blend ratio of the parameter which the parameter calculation unit calculates and performing the blend process according to the edge information corresponding to the conversion pixel and the texture information. By this process, the RGB arrangement data may be generated which makes it possible to generate a high-quality color image with few false colors.

The present invention is above described referring to the specific embodiments. However, it is obvious that a person with ordinary skill in the art can make modifications to or substitutions for the embodiments within the scope not deviating from the gist of the present invention. That is, because the present invention is disclosed as embodiments, called examples, the present invention should not be interpreted in such a limited manner. To judge the gist of the present invention, claims should be considered.

The sequence of the processes described throughout the specification may be performed by hardware, software, or a multiple configuration combining the two. In a case where the processes by software are performed, a program storing the sequence of processes may be installed on memory built into the dedicated hardware in the computer, or may be installed in a general-purpose computer capable of running a variety of processes, in order to run that program. For example, the program may be stored in advance in a recordable medium. In addition to the program being installed on a computer from the recordable media, the program is received over the LAN (Local Area Network) and the network like the Internet and may be installed on a recordable media such as a built-in hard disk.

Furthermore, the various processes disclosed in the specification is not only sequentially performed as disclosed, but may be also performed in parallel or individually, depending on the capability of an apparatus performing the processes, or when necessary. Furthermore, the system in the present specification is a logical set configuration of a plurality of apparatuses, and the apparatus in each configuration is not limited to one within the same housing.

INDUSTRIAL APPLICABILITY

As described above, in the configuration of one embodiment according to the present invention, the RGB arrangement data for generating a high-quality color image with few false colors by inputting obtainment data obtained by the imaging device (image sensor) having, for example, the RGBW-type color filter, including white (W: White) may be generated. Specifically, the edge detection unit interprets the output signal of the imaging device in the RGBW arrangement, and thus obtains the edge information corresponding to each pixel, and the texture detection unit generates the texture information. Furthermore, the parameter calculation unit generates the parameter corresponding to the interpolation pixel value, by performing the interpolation process of converting the application pixel position corresponding to the edge direction corresponding to the conversion pixel. The blend process unit inputs the parameter which the parameter calculation unit generates and the parameter and the texture information, and changes the blend ratio of the parameter which the parameter calculation unit calculates and the texture information, and determines the conversion pixel value, according to the edge information corresponding to the conversion pixel. By these processes, the RGB arrangement data with which the high-quality color image with few false colors can be generated may be generated.

REFERENCE SIGNS LIST

100 imaging device
105 optical lens
110 imaging device (image sensor)
120 signal process unit
130 memory
140 control unit
181 RGBW arrangement
182 RGB arrangement
183 color image
200 data conversion process unit
201 noise removal unit
202 first pixel interpolation parameter calculation unit (GonW)
203 first temporary pixel setting unit (RBonWaroundG)
204 second pixel interpolation parameter (RBonGofHV)
205 third pixel interpolation parameter calculation unit (RBonGofAD)
206 second temporary pixel setting unit (RBonWaround RB)
207 fourth interpolation parameter calculation unit (RBonRBofHV)
208 fifth pixel interpolation parameter calculation unit (RBonRBofAD)
209 edge detection unit
210 texture detection unit
211 blend process unit

The invention claimed is:

1. An image processing device, comprising:
a data conversion process unit performing pixel conversion by interpreting a two-dimensional RGBW pixel arrangement signal in which pixels which are main components of a brightness signal are arranged in a checkered state, and pixels of a plurality of colors which are color information components are arranged in the remaining region,
wherein the data conversion process unit includes a parameter calculation unit calculating a parameter which is applied to a pixel conversion process by interpreting the two-dimensional RGBW pixel arrangement signal and the parameter calculation process unit performs a calculation process of calculating the parameter using at least of one of first correlation information for a correlation between the pixel which is the main component of the brightness signal included in the two-dimensional pixel RGBW arrangement signal and the color information component of the pixel after conversion, and second correlation information for a correlation between one color information component selected from among the color information components and the color information component of the pixel after the conversion, in the calculation process of the parameters which are applied to the pixel conversion process;

wherein the parameter calculation unit selects which one of first correlation information on a correlation between a white (W) pixel configuring the RGBW pixel arrangement signal and the color information component of the pixel after the conversion and second correlation information on a correlation between a green (G) pixel configuring the RGBW arrangement and the color information component of the pixel after the conversion is used, according to 4 kinds of edge directions, longitudinal, traverse, left gradient upward, and right gradient upward, which an edge detection unit detects.

2. The image processing device according to claim 1, wherein the parameter calculation unit uses the correlation information on a correlation between the color information component having the highest distribution rate among the color information components and the color information component of the pixel after the conversion, as the second correlation information.

3. The imaging processing device according to claim 1 or claim 2,
wherein the data conversion process unit includes an edge detection unit generating edge information by interpreting the two-dimensional pixel arrangement signal, and
the parameter calculation unit performs the calculation process of calculating the parameter by selectively using any of the first correlation information and the second correlation information, according to an edge direction which the edge detection unit detects.

4. The image processing device according to claim 3, wherein a color of the main component of the brightness signal is white, and the color information component of which the distribution rate is the highest is green, and
the parameter calculation unit performs the calculation process of calculating the parameter using any of the first correlation information on a correlation between white and the color information component of the pixel after the conversion and the second correlation information on a correlation between green and the color information component of the pixel after the conversion, according to the edge direction which the edge detection unit detects, in the calculation process of calculating the parameter which is applied to the pixel conversion process.

5. The image processing device according to claim 3 or claim 4,
wherein the data conversion process unit includes
a texture detection unit generating texture information by interpreting the two-dimensional pixel arrangement signal, and
a blend process unit inputting the parameter which the parameter calculation unit calculates, the edge information and the texture information, and determining a conversion pixel value by performing a blend process by changing a blend ratio of the parameter which the parameter calculation unit calculates, according to the edge information and the texture information corresponding to the conversion pixel.

6. The image processing device according to claim 5, wherein the edge detection unit generates the edge information including edge direction and strength information corresponding to each pixel by interpreting an RGBW arrangement signal which is generated from an RGB pixel and a white (W) pixel, the texture detection unit generates texture information indicating texture extent corresponding to each pixel by interpreting the RGBW arrangement signal,
the parameter calculation unit is a parameter calculation unit which calculates a parameter for converting the RGBW arrangement to the RGB arrangement, and generates the parameter corresponding to an interpolation pixel value calculated by an interpolation process of changing an application pixel position according to the edge direction corresponding to the conversion pixel, and
the blend process unit inputs the parameter which the parameter calculation unit calculates, the edge information and the texture information and performs the process of determining the conversion pixel value by performing the blend process by changing the blend ratio of the parameter which the parameter calculation unit calculates, according to the edge information and the texture information corresponding to the conversion pixel.

7. The image processing device according to claim 6, wherein the parameter calculation unit has a configuration which generates the parameter by the interpolation process of defining the pixel position which is applied to the interpolation process as the pixel position which is along the edge direction.

8. The image processing device according to claim 6 or claim 7,
wherein the parameter calculation unit has a configuration which generates the parameter by the interpolation process of using any of a correlation in a local region between the W pixel configuring the RGBW arrangement or the other RGB pixel or a correlation in the local region between the G pixel configuring the RGBW arrangement and the other RGB pixel.

9. The image processing device according to any of claims 6 to 8,
wherein the image processing device further includes a temporary pixel setting unit setting the pixel value of the pixel of any of RGB to a W pixel position by the interpolation process of using the correlation in the local region between the W pixel configuring the RGBW arrangement and the other RGB pixel, and
the parameter calculation unit has a configuration which generates the parameter by the interpolation process of applying temporary pixel setting data.

10. The image processing device according to any of claims 6 to 9,
wherein the parameter calculation unit selects which one of first correlation information on a correlation between the W pixel configuring the RGBW arrangement and the color information component of the pixel after the conversion and second correlation information on a correlation between the G pixel configuring the RGBW arrangement and the color information component of the pixel after the conversion is used, according to 4 kinds of edge directions, longitudinal, traverse, left gradient upward, and right gradient upward, which the edge detection unit detects.

11. The image processing device according to claim 10, wherein the parameter calculation unit generates a plurality of parameters by setting a reference pixel position to the pixel position along the edge direction and using the first correlation information and the second correlation information, and
the blend process unit performs the blend process of changing the blend ratios of the plurality of parameters according to the comparison result, by performing a strength comparison of the 4 kinds of the edge directions, longitudinal, traverse, left gradient upward, and right gradient upward.

12. The image processing device according to claim 11, wherein the blend process unit performs a blend process of calculating an edge direction ratio (ratioFlat) of a longitudinal and traverse direction edge and a gradient direction edge corresponding to the conversion pixel, additionally calculating longitudinal and traverse direction edge direction weight (weightHV) indicating that the greater the value is, the stronger the longitudinal and traverse direction edge is than the gradient direction edge, and the smaller the value is, the stronger the gradient direction edge is than the longitudinal and traverse direction edge, based on the edge direction ratio (ratioFlat), increasing a blend ratio of the parameter calculated by setting the edge direction to the longitudinal or traverse direction in a case where the longitudinal and traverse direction edge corresponding to the conversion pixel is stronger than the gradient direction edge, and increasing the blend ratio of the parameter calculated by setting the edge direction to the gradient direction edge in a case where the longitudinal and traverse direction edge corresponding to the conversion pixel is weaker than the gradient direction edge.

13. The image processing device according to any of claims 6 to 12, wherein the texture detection unit calculates a flatness weight (weightFlat) corresponding to each pixel, indicating a high value for a pixel area of which textures are small in number and of which the flatness is high and a low value for a pixel area of which textures are large in number and of which the flatness is low, as the texture information, the parameter calculation unit calculates a contrast enhancement process application parameter for performing a contrast enhancement process on the interpolation pixel value, and a contrast enhancement process non-application parameter for not performing the contrast enhancement process on the interpolation pixel value, and the blend process unit performs the blend process of setting the blend ratio of the contrast enhancement process non-application parameter to be high for the pixel of which the flatness weight is great, and setting the blend ratio of the contrast enhancement process application parameter to be high for the pixel of which the flatness weight is small.

14. The image processing device according to any of claims 3 to 13, wherein the edge detection unit has a configuration which generates the edge information corresponding to each pixel, by an interpretation process using only the white (W) pixel of the RGBW arrangement signal, and generates the edge information including the edge direction and the strength information corresponding to each pixel by calculating a signal value gradient of the W pixel in the neighborhood of the process object pixel.

15. The image processing device according to any of claims 5 to 14, wherein the texture detection unit generates texture information indicating a texture extent corresponding to each pixel, by the interpretation process using only the white (W) pixel of the RGBW arrangement signal.

16. An image processing method of performing an image signal process in an image processing device comprising:

an edge detection step of enabling an edge detection unit to generate edge information including an edge direction and strength information corresponding to each pixel by interpreting an RGBW arrangement signal which is generated from an RGB pixel and a white (W) pixel;

a texture detection step of enabling a texture detection unit to generate texture information indicating texture extent corresponding to each pixel by interpreting the RGBW arrangement signal;

a parameter calculation step of being a parameter calculation step of enabling a parameter calculation unit to calculate the parameter for converting the RGBW arrangement to an RGB arrangement, and to generate the parameter corresponding to an interpolation pixel value calculated by an interpolation process of changing an application pixel position according to the edge direction corresponding to the conversion pixel; and a blend process step of enabling a blend process unit to input the parameter which the parameter calculation unit calculates and the edge information and the texture information and determine the conversion pixel value by performing the blend process by changing the blend ratio of the parameter which the parameter calculation unit calculates, according to the edge information and the texture information corresponding to the conversion pixel, wherein the parameter calculation step performs the calculation process of calculating the parameter using at least any of first correlation information and second correlation information, the first correlation information on a correlation between the pixel which is the main component of the brightness signal included in the two-dimensional pixel arrangement signal or the color information component of the pixel after conversion, and the second correlation information on a correlation between the color information component of which a distribution rate is the highest among the color information components and the color information component of the pixel after the conversion, in the calculation process of calculating the parameter which are applied to the pixel conversion process;

wherein the parameter calculation unit selects which one of first correlation information on a correlation between the W pixel configuring the RGBW arrangement signal and the color information component of the pixel after the conversion and second correlation information on a correlation between a green (G) pixel configuring the RGBW arrangement and the color information component of the pixel after the conversion is used, according to 4 kinds of edge directions, longitudinal, traverse, left gradient upward, and right gradient upward, which the edge detection unit detects.

17. A non-transitory computer-readable medium storing a program for causing the performing of an image signal process in an image processing device, the image signal process comprising:

an edge detection step of enabling an edge detection unit to generate edge information including an edge direction and strength information corresponding to each pixel by interpreting an RGBW arrangement signal which is generated from an RGB pixel and a white (W) pixel, a texture detection step of enabling a texture detection unit to generate texture information indicating texture extent corresponding to each pixel by interpreting the RGBW arrangement signal, a parameter calculation step of being a parameter calculation step of enabling a parameter calculation unit to calculate the parameter for converting the RGBW arrangement to the RGB arrangement, and to generate the parameter corresponding to an interpolation pixel value calculated by an interpolation process of changing an application pixel position according to the edge direction corresponding to the conversion pixel, and a blend process step of enabling a blend process unit to input the parameter which the parameter calculation unit calculates, the edge information and the texture information and determine the conversion pixel value by performing the blend process by changing the blend ratio of the parameter which the parameter calculation unit calculates, according to the edge information and the texture information corresponding to the conversion pixel, wherein the parameter calculation step is caused to perform the calculation process of calculating the parameter using at least any of first correlation information and second correlation information, the first correlation information on a correlation between the pixel which is the main component of the brightness signal included in the two-dimensional pixel arrangement signal and the color information component of the pixel after conversion, and the second correlation information on a correlation between the color information component of which the distribution rate is the highest among the color information components and the color information component of the pixel after the conversion, in the calculation of calculating the parameter which are applied to the pixel conversion process;

wherein the parameter calculation unit selects which one of first correlation information on a correlation between the W pixel configuring the RGBW arrangement and the color information component of the pixel after the conversion and second correlation information on a correlation between a green (G) pixel configuring the RGBW arrangement and the color information component of the pixel after the conversion is used, according to 4 kinds of edge directions, longitudinal, traverse, left gradient upward, and right gradient upward, which the edge detection unit detects.

* * * * *